(12) United States Patent
Golding et al.

(10) Patent No.: US 8,268,959 B2
(45) Date of Patent: Sep. 18, 2012

(54) ENERGETIC POLYPHOSPHAZENES

(75) Inventors: Peter Golding, Reading (GB); Stephen John Trussell, Reading (GB); Martin Eamon Colclough, Sevenoaks (GB); Javid Hamid, Sevenoaks (GB)

(73) Assignee: The Secretary of State for Defense, Whitehall, London (GB)

( * ) Notice: Subject to any disclaimer, the term of this patent is extended or adjusted under 35 U.S.C. 154(b) by 740 days.

(21) Appl. No.: 11/663,656

(22) PCT Filed: Sep. 21, 2005

(86) PCT No.: PCT/GB2005/003638
§ 371 (c)(1),
(2), (4) Date: Oct. 26, 2007

(87) PCT Pub. No.: WO2006/032882
PCT Pub. Date: Mar. 30, 2006

(65) Prior Publication Data
US 2008/0108784 A1    May 8, 2008

(30) Foreign Application Priority Data
Sep. 23, 2004   (GB) ................... 0421167.8

(51) Int. Cl.
*C08G 79/02* (2006.01)
*C08G 79/00* (2006.01)
*C06B 25/00* (2006.01)
*C06B 43/00* (2006.01)
*C06B 45/00* (2006.01)
*C06B 49/00* (2006.01)

(52) U.S. Cl. ......... 528/399; 528/398; 528/422; 528/425
(58) Field of Classification Search .................. 528/399, 528/398, 422, 425
See application file for complete search history.

(56) References Cited

U.S. PATENT DOCUMENTS

| | | | |
|---|---|---|---|
| 3,888,800 A | 6/1975 | Allcock |
| 4,182,835 A | 1/1980 | Hergenrother et al. |
| 4,221,900 A | 9/1980 | Hergenrother et al. |
| 5,762,746 A | 6/1998 | Hartwell |
| 6,232,479 B1 | 5/2001 | Forohar et al. |

OTHER PUBLICATIONS

Chapman et al., "Polyalkoxphosphazenes by Room-Temperature Polymerization of an Electronegative Phosphoranimine Monomer", Journal of Inorganic and Organometallic Polymers, vol. 6, No. 3, pp. 267-275 (1996).
Allcock et al., "Side Group Exchange in Poly(organophosphazenes) with Fluoroalkxy Substituents", Macromolecules, vol. 36, pp. 5566-5572 (2003).
Allcock et al., "Azidophosphazenes as Functionalized Intermediates", Inorg. Chem., vol. 38, pp. 5535-5544 (1999).
Allcock et al, "Azidophosphazenes as Functional Intermediates", Inorg. Chem. 1999, 38, 5535-5544; XP-002359434.

*Primary Examiner* — Duc Truong
(74) *Attorney, Agent, or Firm* — Nixon & Vanderhye P.C.

(57) ABSTRACT

This invention describes the synthesis and use of novel energetic poly(phosphazene) materials suitable for binding high explosives. These materials may also be used as explosives in their own right. The materials possess high energy density and are highly amenable to chemical modification thereby allowing for modification to the physical properties of the material. In particular the tacky and rubbery nature of these materials makes them ideal for use as binder and co-binder materials.

3 Claims, 32 Drawing Sheets

1-Methylimidazole (catalyst)

1-Methylimidazole (catalyst)

PCl₅ (catalyst)

Graph 1

Graph 2

Graph 3

Graph 4

Graph 5

Graph 6

Graph 7

Graph 8

ENERGETIC POLYPHOSPHAZENES

This application is the US national phase of international application PCT/GB2005/003638 filed 21 Sep. 2005 which designated the U.S. and claims benefit of GB 0421167.8, dated 23 Sep. 2004, the entire content of which is hereby incorporated by reference.

The present invention relates to the synthesis of novel energetic polyphosphazenes.

High energy density explosives such as RDX (1,3,5-trinitro-1,3,5-triazacyclohexane) and HMX (1,3,5,7-tetranitro-1,3,5,7-tetraazacyclooctane) are crystalline in morphology and possess a high melting point, which renders them difficult to shape for use in explosive charges. The crystallinity of these materials coupled with their high energy density makes them sensitive to shock and other mechanical stimuli, thus diminishing their handling utility and general safety in manufacturing and service environments.

In the art attempts have been made to retain the high explosive nature of these materials whilst countering the above adverse effects through the use of polymeric binders (see Energetic Polymers as Binders in Composite Propellants and Explosives, M. Eamon Colclough et al., Polymers for Advanced Technologies, Vol 5. pp. 544-560). Polymeric binders may be energetically inert such as estane or polybutadiene or energy rich. In the latter instance it is known that energetic polymeric binders such as polyNIMMO (poly-3-methyl-3-nitratomethyloxetane) and polyGLYN (polyglycidyl nitrate) may be used in conjunction with a high explosive, such that the energy of the explosive itself is not overly diminished by the presence of the binder in the combined material.

The difficulty with this approach is in obtaining energetic polymers that when used as binders have an adequate combination of both desirable physical properties such as malleability and shock insensitivity, in addition to high energy density. For example, even the best energetic binders have energy densities that are significantly lower than that of the crystalline explosive material for which they are required to bind. This has the effect of reducing the energetic performance of the explosive. In an attempt to solve this problem current practice is to use a high loading of explosive relative to binder, but this in turn diminishes the desirable physical properties of the binder/explosive mixture.

Polyphosphazenes are a known class of macromolecules comprising an inorganic phosphorus nitrogen backbone with each phosphorus atom bearing two pendant side groups (see Allcock H. R. et al. Inorg. Chem. 1966, 5, 1709-1715). It is known that poly(organophosphazene)s may be synthesised by side group exchange with fluoroalkoxy substituents (see Macromolecules 2003, 36, 5566-5572) or chloro substituents (see Allcock H. R. Inorganic and Organometallic Polymers, ACS Symposium Series: Denver, 1994; Vol. 572, pp 208). Energetic poly(organophosphazene)s have hitherto not been produced using these methods.

The polyphosphazene system is synthetically flexible and polyphosphazenes possessing a wide range of structures and physical properties are known (see R. Allcock, Chemistry and Applications of Polyphosphazenes, Wiley-Interscience, 2003). There are some examples in the literature of the synthesis of small molecule (trimeric) cyclic phosphazenes functionalised with energetic substituents (see R. Allcock et al. Inorganic Chemistry, 5535-5544, Vol. 38, No. 24, 1999, and see Forohar et al. U.S. Pat. No. 6,218,554 B1). However, even the preparation of small molecule energetic phosphazenes can be problematical (see M. Eamon Colclough et al. Studies on the Synthesis of Energetic Phophazenes, International Symposium on Energetic Materials Technology, 1995, Phoenix) and hitherto in the art there has been a significant barrier to the production of energetic polyphosphazenes. Only one literature reference describes the synthesis of a material in this category using anionic polymerisation (see Robert D. Chapman et al. Journal of Inorganic and Organometallic Polymers, 267-275, Vol. 6, No. 3, 1996). Chapman et al. describe the synthesis of energetic linear oligomeric phosphazenes of n=3 and state the purported isolation of higher chain polyphosphazenes (n=22) from the mix based on nmr spectroscopy alone and as a minor side product although no yield is provided nor any further confirmatory information as to structure, molecular weight or purity. There is no suggestion in their publication that these materials could be used as binders.

In the published literature polyphosphazenes have not found application as binders for energetic systems. Nor have suitable energised polyphosphazenes been synthesised for such application. This reflects not only a difficulty in synthesising such polyphosphazene systems but also a fundamental absence of products offering suitable physical characteristics for such energetic systems. Thus, hitherto no polyphosphazene binders possessing high energy densities have been known and furthermore some 'inert' polyphosphazenes, which may have superficially attractive properties, cannot be used to effectively formulate explosives ingredients because they do not bind adequately to the surface of the energetic crystalline ingredients.

There is therefore a need to develop binder materials which confer desirable handling characteristics to high explosive materials, but which at the same time do not excessively diminish the explosive performance of the explosive material itself.

Accordingly there is provided random mixed substituent polyphosphazene compounds of Formula A comprising of a combination of n units having one or more of the structures (i) to (iii) but not exclusively (i):

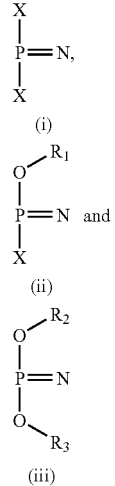

Formula A and wherein:

$R_1$, $R_2$ and $R_3$ are alkyl, alkyl ether or carbohydrate based side chains which contain energetic functionalities including nitro, nitramine, nitrate ester, or azide.

X=a C1 to C20 fluoroalkoxy group, or a C1 to C20 fluoroalkoxy ether.

$3 \leq n \leq 10000$

100% substituted polyphosphazenes can be provided for. These 100% substituted polyphosphazenes are known as polyphosphazene homopolymers. Accordingly there is provided for polyphosphazene homopolymer compounds of the Formula B comprising n units of structure (iii):

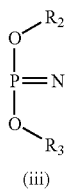

Formula B (iii)

and wherein $R_2$, $R_3$ $3 \leq n \leq 10000$

In a preferred embodiment for random mixed substituent polyphosphazene compounds of Formula A:

$R_1$ is $C_{1-18}(alkyl)CH(ONO_2)CH_2(ONO_2)$; $C_{1-18}(alkyl)CH(N_3)CH_2(N_3)$; $C_{1-19}(alkyl)CH_2(ONO_2)$; $C_{1-19}(alkyl)CH_2(N_3)$; $CH_2C(CH_3)(CH_2ONO_2)_2$. $R_2$ is $C_{1-18}(alkyl)CH(ONO_2)CH_2(ONO_2)$; $C_{1-18}(alkyl)CH(N_3)CH_2(N_3)$; $C_{1-19}(alkyl)CH_2(ONO_2)$; $C_{1-19}(alkyl)CH_2(N_3)$; $CH_2C(CH_3)(CH_2ONO_2)_2$. $R_3$ is $C_{1-18}(alkyl)CH(ONO_2)CH_2(ONO_2)$; $C_{1-18}(alkyl)CH(N_3)CH_2(N_3)$; $C_{1-19}(alkyl)CH_2(ONO_2)$; $C_{1-19}(alkyl)CH_2(N_3)$; $CH_2C(CH_3)(CH_2ONO_2)_2$. X is $OCH_2CF_3$; $OCH_2CF_2CF_3$; $OCH_2(CF_2)_3CF_3$ $5 \leq n \leq 300$ In a preferred embodiment for the 100% substituted polyphosphazene homopolymer compounds of Formula B:

$R^2$ is $C_{1-18}(alkyl)CH(ONO_2)CH_2(ONO_2)$; $C_{1-18}(alkyl)CH(N_3)CH_2(N_3)$; $C_{1-19}(alkyl)CH_2(ONO_2)$; $C_{1-19}(alkyl)CH_2(N_3)$; $CH_2C(CH_3)(CH_2ONO_2)_2$. $R^3$ is $C_{1-18}(alkyl)CH(ONO_2)CH_2(ONO_2)$; $C_{1-18}(alkyl)CH(N_3)CH_2(N_3)$; $C_{1-19}(alkyl)CH_2(ONO_2)$; $C_{1-19}(alkyl)CH_2(N_3)$; $CH_2C(CH_3)(CH_2ONO_2)_2$.

$5 \leq n \leq 300$

As a matter of chemical notation only and for explanatory and clarity purposes polyphosphazenes of the preferred embodiments could equally be represented by the following chemical formula:

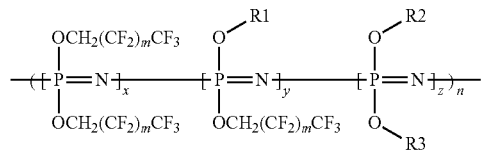

where m=0, 1 or 3 wherein x, y and z refer to stoichiometric values and may be 0.0 to 1.0 (but not x=1.0) provided always that x+y+z=1.0 and all other notation and values equate to those referred to in the preferred embodiment and should be construed accordingly.

Specific embodiments synthesised by the applicants have given rise to values of x from 0.0 to 0.95, values of y from 0 to 1.0, and values of z from 0 to 1.0; wherein in each instance x+y+z=1.0. The skilled man will appreciate that values of x, y and z varying independently from 0.0 to 1.0 (wherein x+y+z=1.0) would be expected by experiment through variation of the reaction conditions. Polyphosphazene homopolymers of Formula B will give rise to a value of z=1.0 and x+y=0.0.

In specific embodiments random mixed substituent polyphosphazene compounds of Formula A have been prepared, consisting of: —

(a) a random mixed substituent polymer of trifluoroethoxy/2,3-dinitratopropan-1-oxy polyphosphazene (PZ8)

(b) a random mixed substituent polymer of trifluoroethoxy/3,4-dinitratobutan-1-oxy polyphosphazene (PZ9)

(c) a random mixed substituent polymer of trifluoroethoxy/5,6-dinitratohexan-1-oxy polyphosphazene (PZ10)

(d) a random mixed substituent polymer of trifluoroethoxy/2-nitratoethoxy polyphosphazene (PZ11)

(e) random mixed substituent polymer of trifluoroethoxy/2-methyl-3-nitrooxy-2-nitrooxymethyl-propan-1-oxy polyphosphazene (PZ12)

(f) a random mixed substituent polymer of 1H,1H-perfluoropropan-1-oxy/2,3-dinitratopropan-1-oxy polyphosphazene (PZ13)

(g) a random mixed substituent polymer of 1H,1H-perfluoropentan-1-oxy/2,3-dinitratopropan-1-oxy polyphosphazene (PZ14)

(h) a random mixed substituent polymer of trifluoroethoxy/6-azidohexan-1-oxy polyphosphazene (PZ15)

(i) a random mixed substituent polymer of trifluoroethoxy/5,6-diazidohexan-1-oxy polyphosphazene (PZ16)

In specific embodiments polyphosphazene homopolymer compounds of Formula B have been prepared, consisting of:

(j) a poly(phosphazene) homopolymer of poly[bis-(2-nitratoethoxy)phosphazene] (PZ20)

(k) a poly(phosphazene) homopolymer of poly[bis-(2,3-dinitratopropan-1-oxy)phosphazene] (PZ21)

(l) a poly(phosphazene) homopolymer of poly[bis-(3,4-dinitratobutan-1-oxy)phosphazene] (PZ22)

(m) a poly(phosphazene) homopolymer of poly[bis-(3-azidopropan-1-oxy)phosphazene] (PZ23)

(n) a poly(phosphazene) homopolymer of poly[bis-(6-azidohexan-1-oxy)phosphazene] (PZ24)

The applicants have developed a novel synthetic pathway to these new energetic materials. This synthetic pathway comprises the use of novel polymeric alkoxy substituted precursors that enable energetic linear polyphosphazenes to be synthesised rather than through the use of direct attachment of energetically substituted pendant side groups.

Accordingly there is provided a method for the synthesis of random mixed substituent energetic polyphosphazenes of Formula A comprising the steps of: —

Step (1)[a] Generating a substitutable poly(phosphazene) precursor with pendant fluoroalkoxy or fluoroalkoxyether groups OR Step (1) [b] generating a substitutable poly(phosphazene) precursor with pendant chloro groups Step 2 Generating a $C_2$-$C_{20}$ pendant group precursor possessing either an energetic functionality or a precursor to an energetic functionality or a protected energetic precursor Step (3)[a] Chemically attaching the $C_2$-$C_{20}$ pendant group of the precursor described in Step (2), to the poly(phosphazene) backbone using its alkoxide derivative to achieve random nucleophilic substitution of fluoroalkoxy or fluoroalkoxyether groups in the appropriately substituted polyphosphazene OR Step (3) [b] Chemically attaching the $C_2$-$C_{20}$ pendant group of the precursor described in Step (2) using either the free alcohol or its alkoxide derivative to achieve partial replacement of chloro groups in the chloro substituted polyphosphazene, followed by subsequent substitution of the remaining chloro groups with a fluoroalcohol or its alkoxide derivative or vice versa i.e. chemically attaching the fluoroalcohol, by means of the free alcohol or its alkoxide derivative, to the polyphosphazene backbone via partial replacement of chloro groups, followed by subsequent substitution of the remaining chloro groups with the $C_2$-$C_{20}$ pendant group of the precursor described in Step (2) by means of the free alcohol or its alkoxide (eg as for PZ13 and PZ14);

wherein Steps (1) and (2) are not sequence specific but Step (3) follows either Step (1) or Step (2), and wherein where Step (1)[a] is used Step (3)[a] is used and where Step (1)[b] is used Step (3)[b] is used, and, Step (4) Generating a nitrate ester derivative by nitration, where the alkoxide precursor described at Step (2) above possesses a protected hydroxyl group (e.g. pyranyloxy, as for PZ11), a protected 1,2-diol (e.g. cyclic ketal, as for PZ8-10) or a nitratable energetic precursor (e.g. (3-methyl-oxetan-3-yl)-methoxy functionality, as for PZ12)

The skilled man will appreciate that other base resistant protecting groups for hydroxy and 1,2-diol functionalities would be equally effective as desirable protecting groups prior to nitration where the nitrate ester derivative is desired. (see Chapter 2 in 'Protective Groups in Organic Synthesis' $3^{rd}$ Edition, 1999, T. W. Greene and P. G. M. Wuts, Wiley Interscience)

Employing Step (1)[b], Step (2), Step (3)[b] such that all the chloro groups are replaced by the $C_2$-$C_{20}$ pendant groups of the precursor described in Step (2) and Step 4 will result in poly(phosphazene) homopolymers of the Formula B. Accordingly there is provided a method for the synthesis of energetic polyphosphazene homopolymers of Formula B.

In a preferred embodiment the pendant fluoroalkoxy group referred to at Step (1)[a] comprises a trifluoroethoxy group. In a further preferred embodiment the pendant fluoroalkoxy group referred to at Step (1)[a] comprises a 1H,1H-perfluoropropan-1-oxy group. In a further preferred embodiment the pendant fluoroalkoxy group referred to at Step (1)[a] comprises a 1H,1H-perfluoropentan-1-oxy group.

In a preferred embodiment the replaceable group in Step (1)[b] comprises chlorine.

In a preferred embodiment the attachment of Step 3 is undertaken via random nucleophilic substitution of trifluoroethoxy groups.

In a specific embodiment the attachment of Step 3 is undertaken via displacement of chloro groups.

Accordingly there is provided random mixed substitutent energetic polyphosphazenes of Formula A obtainable by the above method where:

Preferably the substitutable polyphosphazene precursor used in Step (1)[a] comprises poly[bis(trifluoroethoxy)phosphazene].

Preferably the substitutable polyphosphazene precursor used in Step (1)[b] comprises poly(dichlorophosphazene).

Where the polyphosphazene precursor used in Step (1)[a] comprises poly[bis(trifluoroethoxy)phosphazene]: —

Preferably the substitutable pendant group precursor used in Step (2) comprises (2,2-dimethyl-[1,3]-dioxolan-4-yl)-methanol.

Preferably the substitutable pendant group precursor used in Step (2) comprises (2,2-dimethyl-[1,3]-dioxolan-4-yl)-ethanol.

Preferably the substitutable pendant group precursor used in Step (2) comprises (2,2-dimethyl-[1,3]-dioxolan-4-yl)-butanol.

Preferably the substitutable pendant group precursor used in Step (2) comprises 2-pyranyloxy ethanol.

Preferably the substitutable pendant group precursor used in Step (2) comprises (3-methyl-oxetan-3-yl)-methanol.

Preferably the substitutable pendant group precursor used in Step (2) comprises 6-azidohexan-1-ol.

Preferably the substitutable pendant group precursor used in Step (2) comprises 5,6-diazidohexan-1-ol.

Where the polyphosphazene precursor used in Step (1)[b] comprises poly(dichlorophosphazene): —

Preferably the substitutable pendant group precursors used in Step (2) comprise (2,2-dimethyl-[1,3]-dioxolan-4-yl)-methanol followed by 1H, 1H-perfluoropropanol.

Preferably the substitutable pendant group precursors used in Step (2) comprise (2,2-dimethyl-[1,3]-dioxolan-4-yl)-methanol and followed by 1H,1H-perfluoropentanol.

Accordingly there is provided polyphosphazene homopolymers of Formula B obtainable by the above method where:

Preferably the substitutable poly(phosphazene) precursor used in Step (1) comprises poly(dichlorophosphazene).

Preferably the substitutable pendant group precursor used in Step (2) comprises (2,2-dimethyl-[1,3]-dioxolan-4-yl)-methanol.

Preferably the substitutable pendant group precursor used in Step (2) comprises (2,2-dimethyl-[1,3]-dioxolan-4-yl)-ethanol.

Preferably the substitutable pendant group precursor used in Step (2) comprises 2-pyranyloxy ethanol.

Preferably the substitutable pendant group precursor used in Step (2) comprises 6-azidohexan-1-ol.

Preferably the substitutable pendant group precursor used in Step (2) comprises 3-azidopropan-1-ol.

Preferably the nitrating medium used in Step (4) is 95% nitric acid, which has been found to give a particularly clean product. The skilled man will appreciate that other concentrations of nitric acid and other nitrating media can be used, including $N_2O_5$, mixed sulphuric/nitric acid and nitric acid/acetic anhydride.

By varying the degree of substitution of the polymer chain by energetic side groups it is possible to modify the energy content of the polyphosphazene and through the judicious selection of different chain lengths and substitution patterns, other parameters such as density and glass transition temperature can be manipulated. The disclosed synthetic method therefore makes it possible to optimise the desired characteristics of a particular polyphosphazene for a given application.

The degree of substitution of energetic side groups can be modified by increasing the degree of substitution (a) of the alkoxide precursor prior to nitration and (b) of the azidated side chains.

Accordingly there is provided a method for varying the degree of substitution (i.e. the proportion of substitutable pendant side-groups relative to fluoroalkoxy or fluoroalkoxyether groups) of the random mixed substituent polyphosphazenes (Step (3) above). Variation can be effected by one or more of the following:

(a)(i) Step 3[a]—the relative proportion of alkoxide [of the substitutable pendant group precursor described in Step (2) above] to poly[bis(fluoroalkoxy)-phosphazene] or poly[bis(fluoroalkoxyether)-phosphazene]

(ii) Step 3[b]—the relative proportion of alkoxide [of the first substitutable pendant group precursor described in Step (2) above, that is the first group referred to in step 3b] to poly(dichlorophosphazene). It is found that by increasing the relative proportion of alkoxide to polymer precursor as above increases the relative degree of substitution.

(b) the length of reaction time. It is found that increasing the reaction time increases the relative degree of substitution of the fluoroalkoxy groups in the precursor and the chloro groups in the precursor, by the first alkoxide (or free alcohol), in Steps (3)[a] and (3)[b] respectively.

(c) the cation of the alkoxide salt. It is found that by increasing the radius of the cation of the alkoxide salt increases the relative degree of substitution into the fluoroalkoxy/fluoroalkoxyether precursor. That is the sodium cation is more effective than the lithium cation.

(d) the temperature of the reaction. It is found that by increasing the reaction temperature this also has the effect of increasing the relative degree of substitution of the fluoroalkoxy groups in the precursor.

(e) modification of the fluoroalkoxy side groups of the fluoroalkoxy precursor.

The degree of substitution of the polymer and the nature of the substituting pendant side groups themselves modify the physical properties of the polymer.

Accordingly there is provided a method for varying the physical properties of the polyphosphazene products of Formula A and Formula B. Variation of the physical properties of the polymer can be effected by variation of one or more of the following:
(i) the degree of substitution according to (a)-(e) above (i.e. through the modification of the relative proportion of energetic side-groups to fluoroalkoxy or fluoroalkoxyether side groups); (ii) the carbon chain length of the substitutable pendant side-groups containing the energetic functionalities; (iii) the number of energetic functionalities attached to the substituted pendant side-groups; (iv) attaching more than one type of substituted pendant side-group to the polymer backbone and (v) the type of energetic functionality attached to the substituted pendant side-group (vi) changing the molecular weight of the substitutable polyphosphazene precursor As to (i) the energy and energy density can be increased by increasing the degree of substitution (i.e. by increasing the number of energetic side groups); the glass transition temperature and density can be varied by varying the degree of substitution.

As to (ii) the energy, density, energy density and glass transition temperature can be varied by varying the length of the carbon chain of the substitutable pendant side-groups.

As to (iii) the energy and energy density can be increased by increasing the number of energetic functionalities attached to the substituted pendant side-groups; the glass transition temperature and density can be varied by varying the number of energetic functionalities attached to the substituted pendant side groups.

As to (iv) the energy, density, energy density, glass transition temperature and thermal stability can be varied by attaching more than one type of substituted pendant side-group to the polymer backbone.

As to (v) the energy, density, energy density, glass transition temperature and thermal stability can be varied by varying the type of energetic functionality attached to the substituted pendant side-group.

Physical data of selected polyphosphazene products of Formula A and Formula B are summarised in Table 1, along with data for commercially available energetic polymers for comparison.

TABLE 1

| Material | % Energetic side-groups | Density (g/cm$^3$) | T$_g$ (° C.) | Decomposition Energy* (J/g) | Energy Density (J/cm$^3$) |
| --- | --- | --- | --- | --- | --- |
| PZ8 | 72 | 1.65 | −25.0 | 2020 | 3333 |
| PZ9 | 68 | 1.60 | −13.0 | 2370 | 3792 |

TABLE 1-continued

| Material | % Energetic side-groups | Density (g/cm$^3$) | T$_g$ (° C.) | Decomposition Energy* (J/g) | Energy Density (J/cm$^3$) |
| --- | --- | --- | --- | --- | --- |
| PZ10 | 77 | 1.52 | −55.0 | 2430 | 3694 |
| PZ11 | 74 | 1.61 | −35.0 | 1936 | 3117 |
| PZ12 | 59 | 1.55 | −6.5 | 2037 | 3157 |
| PZ13 | 65 | 1.61 | −31.6 | 1913 | 3080 |
| PZ14 | 28 | 1.80 | −35.6 | 961 | 1730 |
| PZ15 | 65 | 1.23 | — | 1185 | 1458 |
| PZ16 | 44 | 1.43 | −59.0 | 1500 | 2145 |
| PZ20 | 100 | 1.60 | −44.6 | 2540 | 4060 |
| PZ21 | 100 | 1.69 | −32.5 | 2690 | 4550 |
| PZ22 | 100 | 1.65 | −23.8 | 2880 | 4750 |
| PZ23 | 100 | 1.35 | −73.4 | 1825 | 2465 |
| PZ24 | 100 | 1.16 | −99.5 | 1665 | 1930 |
| PolyGLYN | — | 1.38 | −30.0 | 2000 | 2760 |
| PolyNIMMO | — | 1.26 | −33.0 | 1300 | 1638 |

*decomposition energy data recorded using Differential Scanning Calorimetry (DSC)

Table 1: Variation of physical properties with percentage energetic side groups for PZ8-16 and PZ20-24 and comparison of these properties with those of polyGLYN and polyNIMMO.

The data of Table 1 demonstrate that high energy densities are achievable for the energetic polyphosphazenes of Formula A and Formula B and in some cases these exceed those of commercially available energetic polymers. In addition, some of the listed values approximate to those of some current explosives. This promotes improved detonation performance over other known polymeric binders.

The polyphosphazene compounds of Formula A and Formula B offer a range of glass transition temperatures including desirable low glass transition temperatures, whilst at the same time retaining high relative energy-density.

The possession of low glass transition temperatures minimises or negates the need to add either plasticisers or energetic plasticisers to a formulation for low temperature use. This is an advantage because, over time plasticisers can migrate out of formulations, potentially compromising the mechanical properties of a formulation, particularly at low temperature. Thus, the use of unplasticised or marginally plasticized polyphosphazene binders will lead to enhanced ageing performance of the bound explosive. The possession of a low glass transition temperature (T$_g$) coupled with high energy density confers the significant advantage that when these compounds are used as binders, the bound explosive may be shaped and used over a wide temperature range, whilst the whole material retains its high explosive power.

As described in the examples, the energetic polyphosphazenes of the present invention unexpectedly act as very effective binders for energetic materials using a solvent paste process; however, they are not chemically curable. Nevertheless, we have established that some of the polyphosphazenes described herein are miscible with certain commercial energetic polymers such as polyGLYN and polyNIMMO, which are curable in their own right (using standard isocyanate technology) and that the mixed binder may itself be isocyanate cured.

In the case of polyGLYN the mixed binder has a glass transition temperature intermediate between that of the two individual binders, dependent upon the proportions. Thus, polyphosphazenes of the present invention, when employed as co-binders, can be valuable not only for enhancing the energy-density of the complementary binder, but also for depressing its glass transition temperature. The rubber produced for example by polyGLYN/polyphosphazene co-binders is soft, extensible and possesses very 'high tack' making it adhere effectively to many crystalline energetic fillers. The term co-binder refers to use of these polyphosphazenes as binders in conjunction with other binder materials.

Accordingly the polyphosphazene compounds of Formula A and Formula B may be used as binders and/or co-binders and/or ingredients in explosive compositions as well as in pyrotechnic compositions.

The skilled man will appreciate that the polyphosphazene compounds of Formula A and Formula B could also equally be used as binders and/or co-binder ingredients for propellant compositions without further experiment to determine this embodiment. This is evident from the observed hissing and effervescent nature of the combustion of these compounds.

Embodiments of the invention will now be described with reference to the figures and examples below and wherein:

FIG. 1: is a schematic for the synthesis of the precursor polymer poly[bis-(trifluoroethoxy)phosphazene]

FIG. 2: is a schematic for the synthesis of the precursor polymer poly(dichlorophosphazene)

FIG. 3: is a schematic for the synthesis of the alkoxide precursors (1) (2,2-dimethyl-[1,3]-dioxolan-4-yl)-ethanol, (2) (2,2-dimethyl-[1,3]-dioxolan-4-yl)-butanol, and (3) 2-pyranyloxy ethanol.

FIG. 4: is a schematic for the synthesis of trifluoroethoxy/(2,2-dimethyl-[1,3]-dioxolan-4-yl)-methoxy polyphosphazene (PZ1).

FIG. 5: is a schematic for the synthesis of trifluoroethoxy/(2,2-dimethyl-[1,3]-dioxolan-4-yl)-ethoxy polyphosphazene (PZ2).

FIG. 6: is a schematic for the synthesis of trifluoroethoxy/(2,2-dimethyl-[1,3]-dioxolan-4-yl)-butan-1-oxy polyphosphazene (PZ3).

FIG. 7: is a schematic for the synthesis of trifluoroethoxy/2-pyranyloxy-ethoxy polyphosphazene (PZ4).

FIG. 8: is a schematic for the synthesis of trifluoroethoxy/(3-methyl-oxetan-3-yl)-methoxy polyphosphazene (PZ5).

FIG. 9: is a schematic for the synthesis of 1H,1H-perfluoropropan-1-oxy/(2,2-dimethyl-[1,3]-dioxolan-4-yl)-methoxy polyphosphazene (PZ6).

FIG. 10: is a schematic for the synthesis of 1H,1H-perfluoropentan-1-oxy/(2,2-dimethyl-[1,3]-dioxolan-4-yl)-methoxy polyphosphazene (PZ7).

FIG. 11: is a schematic for the synthesis of trifluoroethoxy/2,3-dinitratopropan-1-oxy polyphosphazene (PZ8).

FIG. 12: is a schematic for the synthesis of trifluoroethoxy/3,4-dinitratobutan-1-oxy polyphosphazene (PZ9).

FIG. 13: is a schematic for the synthesis of trifluoroethoxy/5,6-dinitratohexan-1-oxy polyphosphazene (PZ10).

FIG. 14: is a schematic for the synthesis of trifluoroethoxy/2-nitratoethoxy polyphosphazene (PZ11).

FIG. 15: is a schematic for the synthesis of trifluoroethoxy/2-methyl-3-nitrooxy-2-nitrooxymethyl-propan-1-oxypolyphosphazene (PZ12).

FIG. 16: is a schematic for the synthesis of 1H,1H-perfluoropropan-1-oxy/2,3-dinitratopropan-1-oxy polyphosphazene (PZ13).

FIG. 17: is a schematic for the synthesis of 1H,1H-perfluoropentan-1-oxy/2,3-dinitratopropan-1-oxy polyphosphazene (PZ14).

FIG. 18: is a schematic for the synthesis of the precursors (1) 3-azidopropan-1-ol, shown on the left of the page, and (2) 6-azidohexan-1-ol, shown on the right of the page.

FIG. 19: is a schematic for the synthesis of the precursor 5,6-diazidohexan-1-ol.

FIG. 20: is a schematic for the synthesis of trifluoroethoxy/6-azidohexan-1-oxy polyphosphazene (PZ15).

FIG. 21: is a schematic for the synthesis of trifluoroethoxy/5,6-diazidohexan-1-oxy polyphosphazene (PZ16).

FIG. 22: is a schematic for the synthesis of poly[bis-(2-nitratoethoxy)phosphazene] (PZ20)

FIG. 23: is a schematic for the synthesis of poly[bis-(2,3-dinitratopropan-1-oxy)phosphazene] (PZ21)

FIG. 24: is a schematic for the synthesis of poly[bis-(3,4-dinitratobutan-1-oxy)phosphazene] (PZ22)

FIG. 25: is a schematic for the synthesis of poly[bis-(3-azidopropan-1-oxy)phosphazene] (PZ23)

FIG. 26 is a schematic for the synthesis of poly[bis-(6-azidohexan-1-oxy)phosphazene] (PZ24)

FIG. 27: is a schematic describing the nomenclature of pendant side-groups for NMR spectroscopic characterisation.

FIG. 28: shows two graphs demonstrating the effect of percentage energetic side groups on decomposition energy (Graph 1) and density (Graph 2) for PZ8-10 and PZ21-22.

FIG. 29: shows two graphs demonstrating the effect of percentage energetic side groups on energy density (Graph 3) and glass transition temperature (Graph 4) for PZ8-10 and PZ21-22.

EXAMPLE 1

Figure 1:
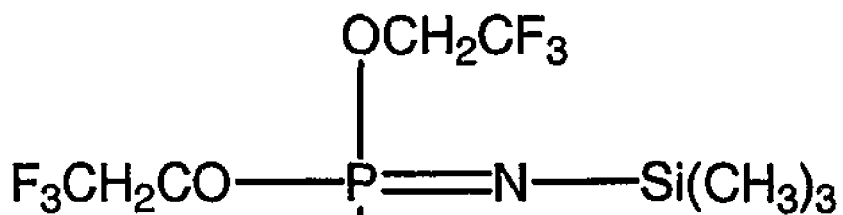
Figure 1:
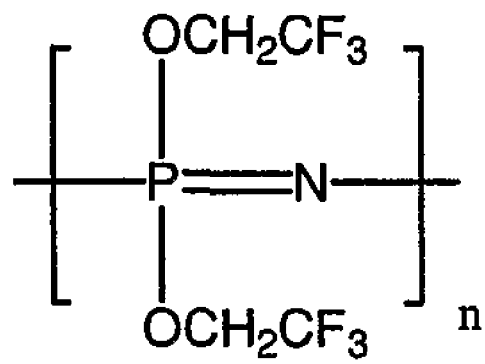
Figure 2:
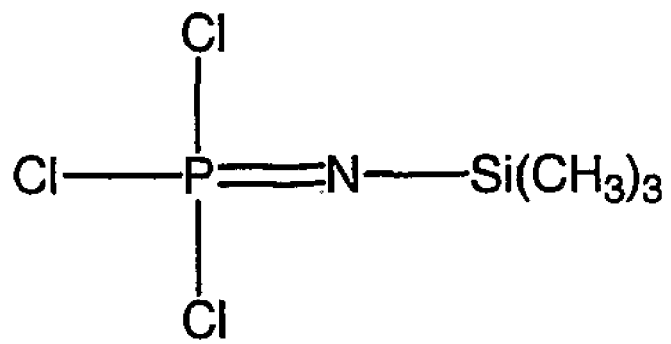
Figure 2:
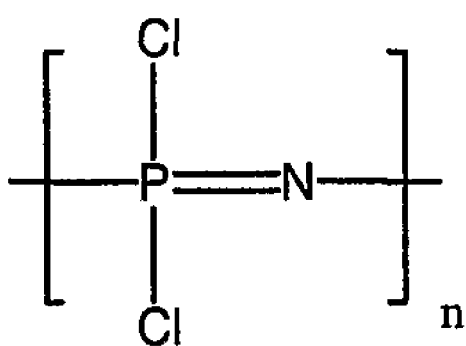
Figure 3:
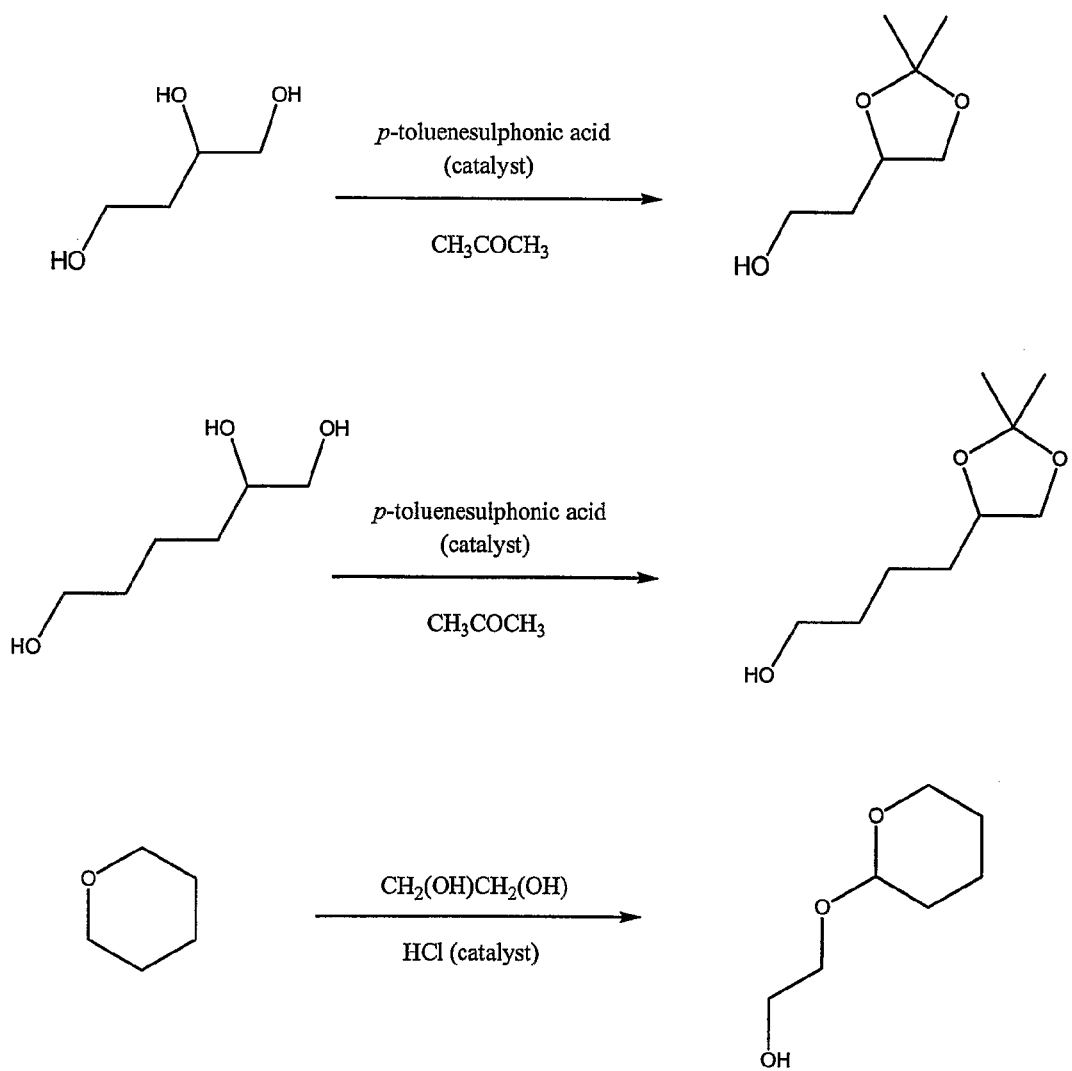
Figure 4:
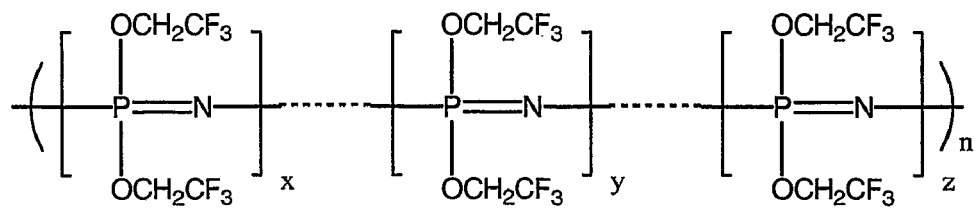
Figure 4:
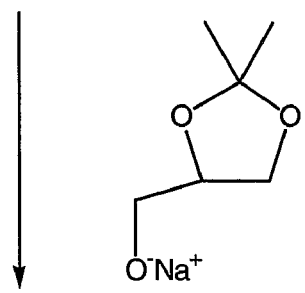
Figure 4:
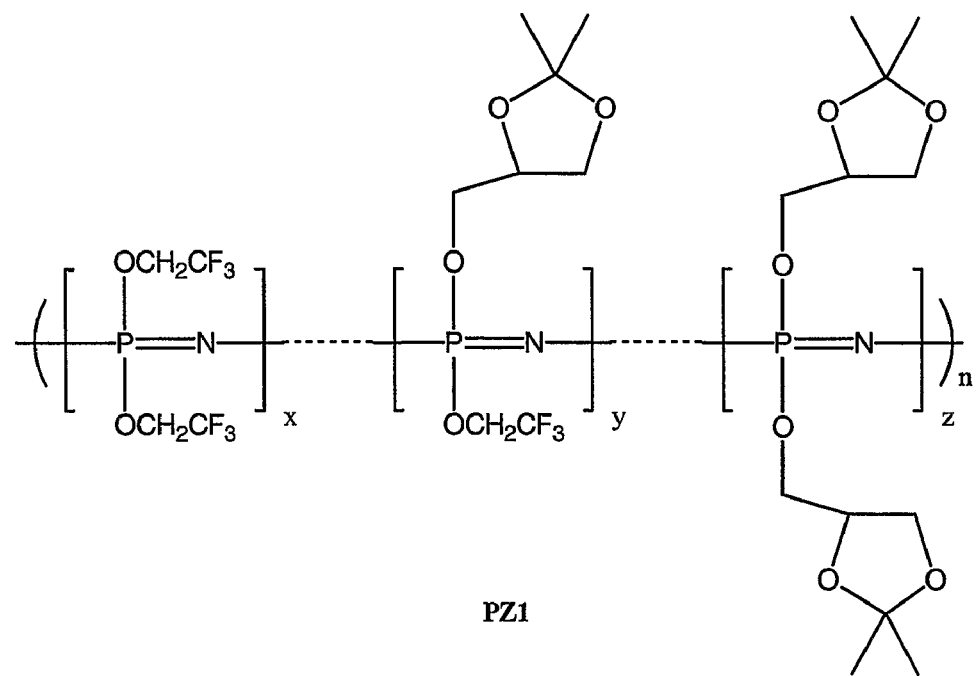
Figure 5:
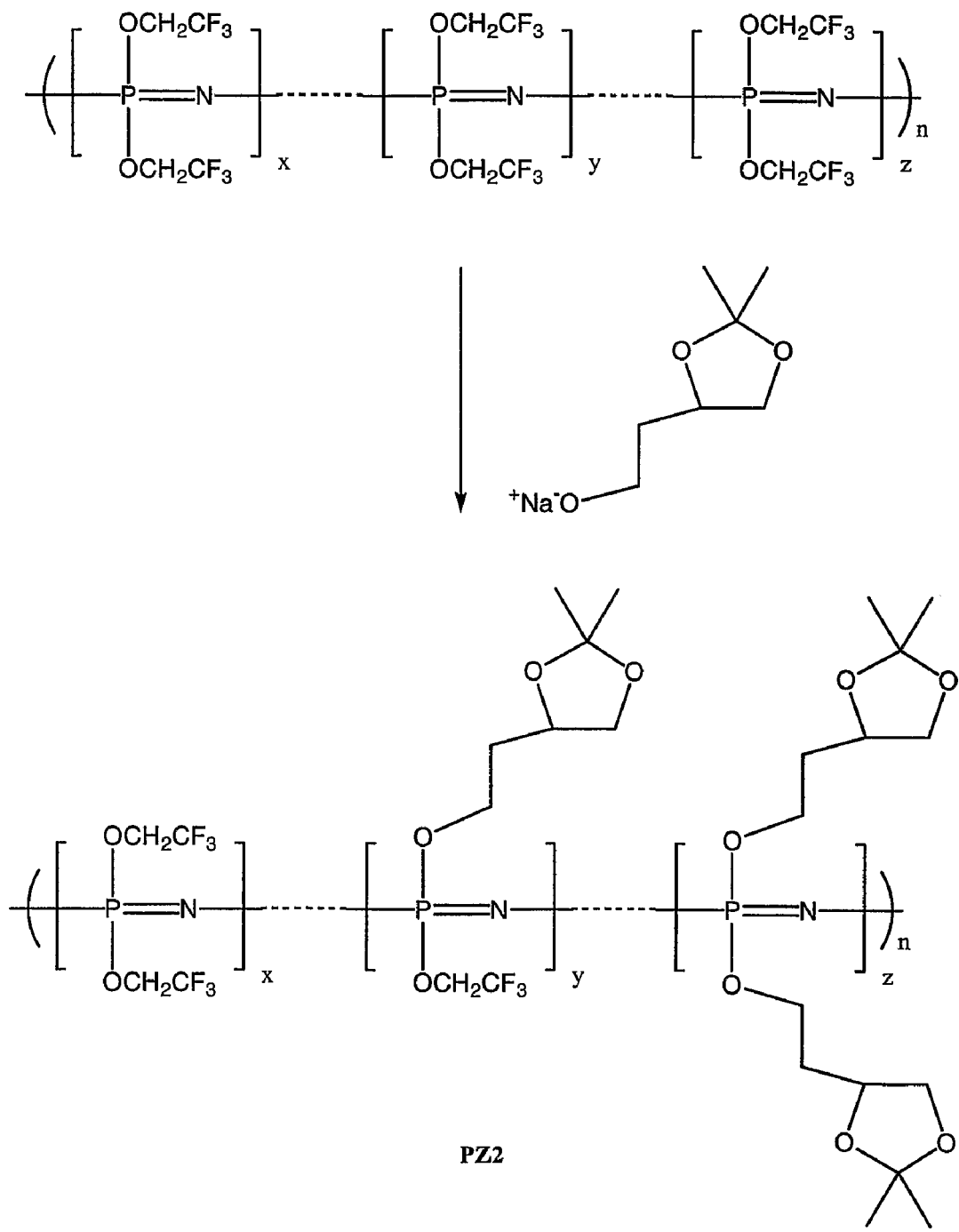
Figure 6:
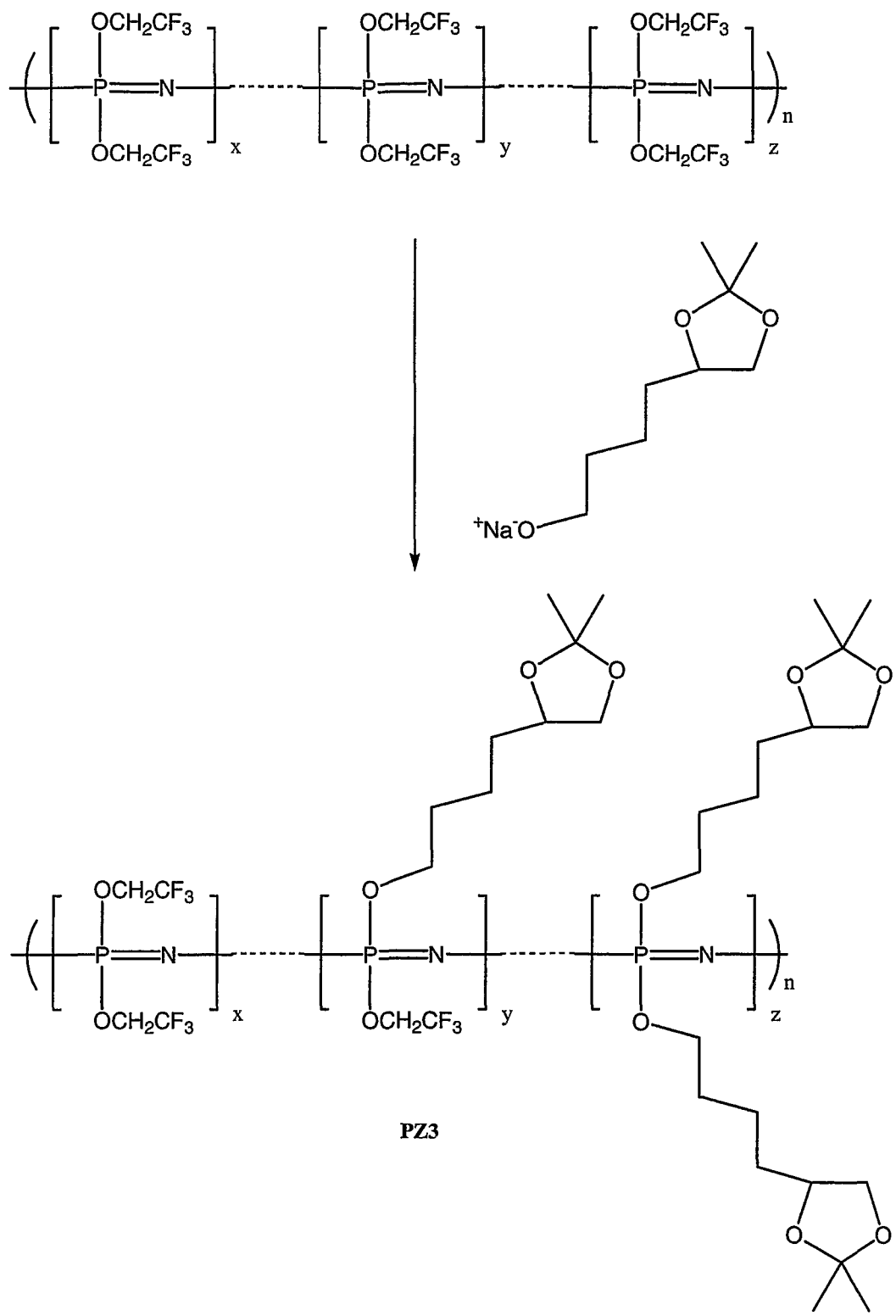
Figure 7:
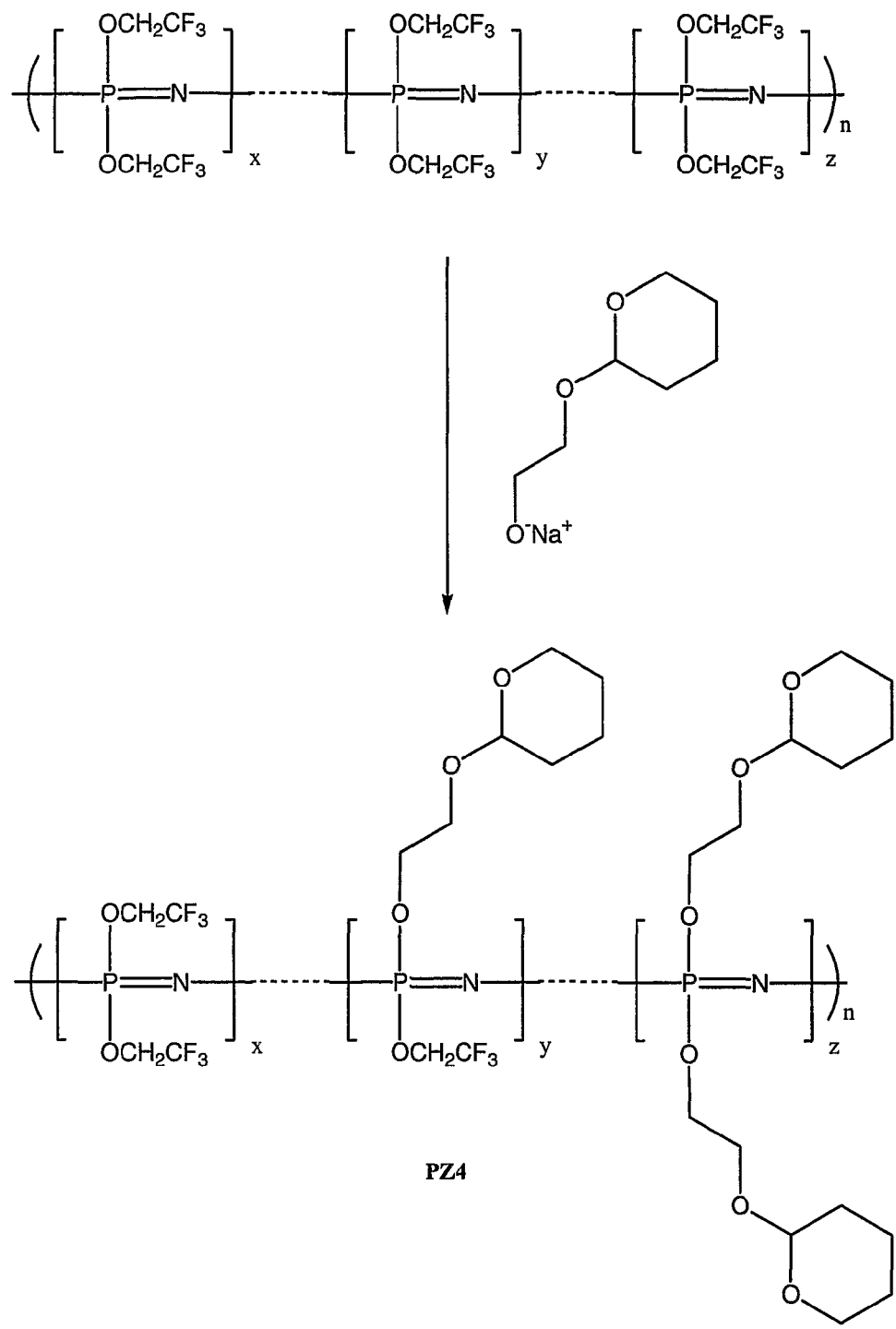
Figure 8:
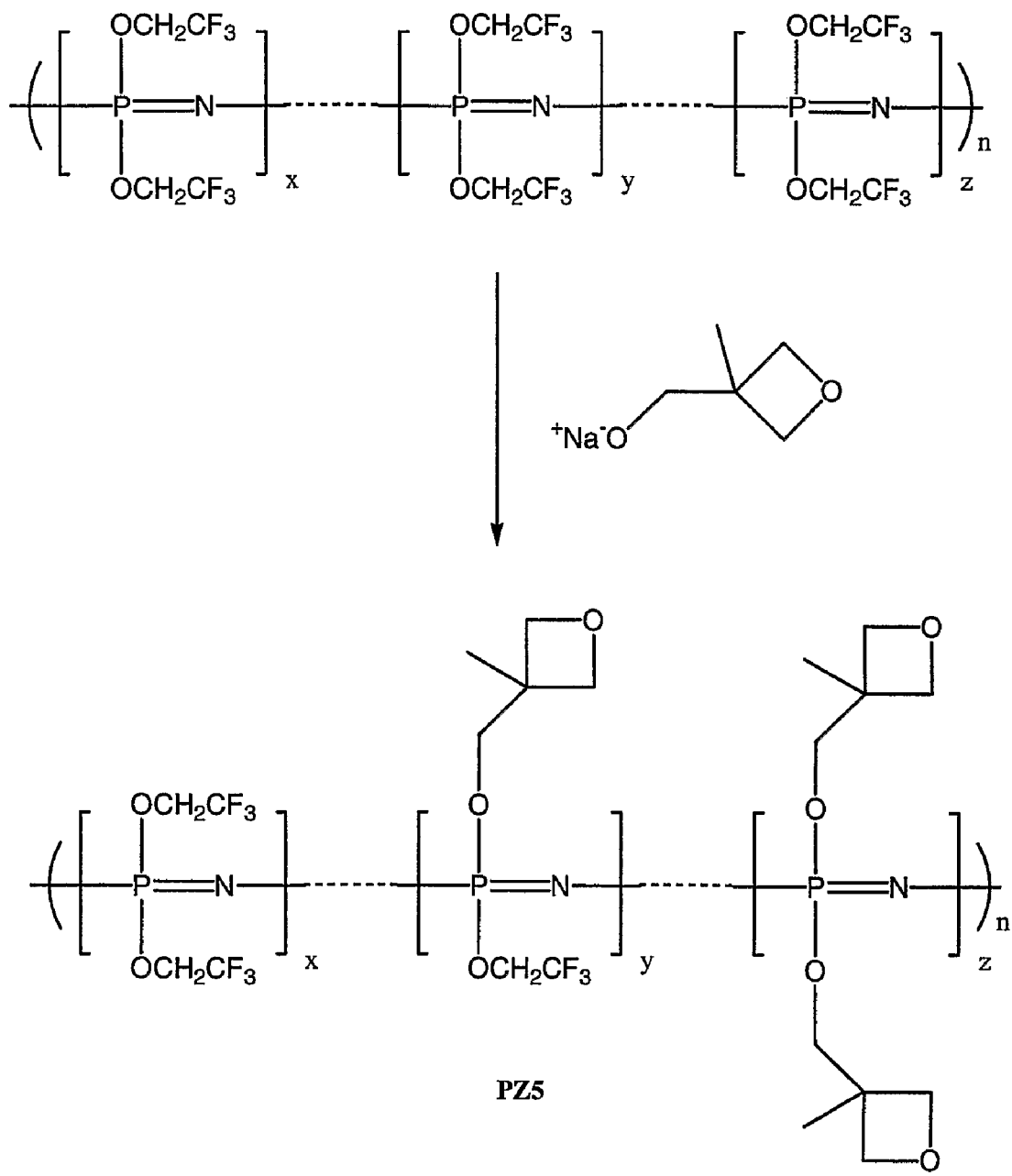
Figure 9:
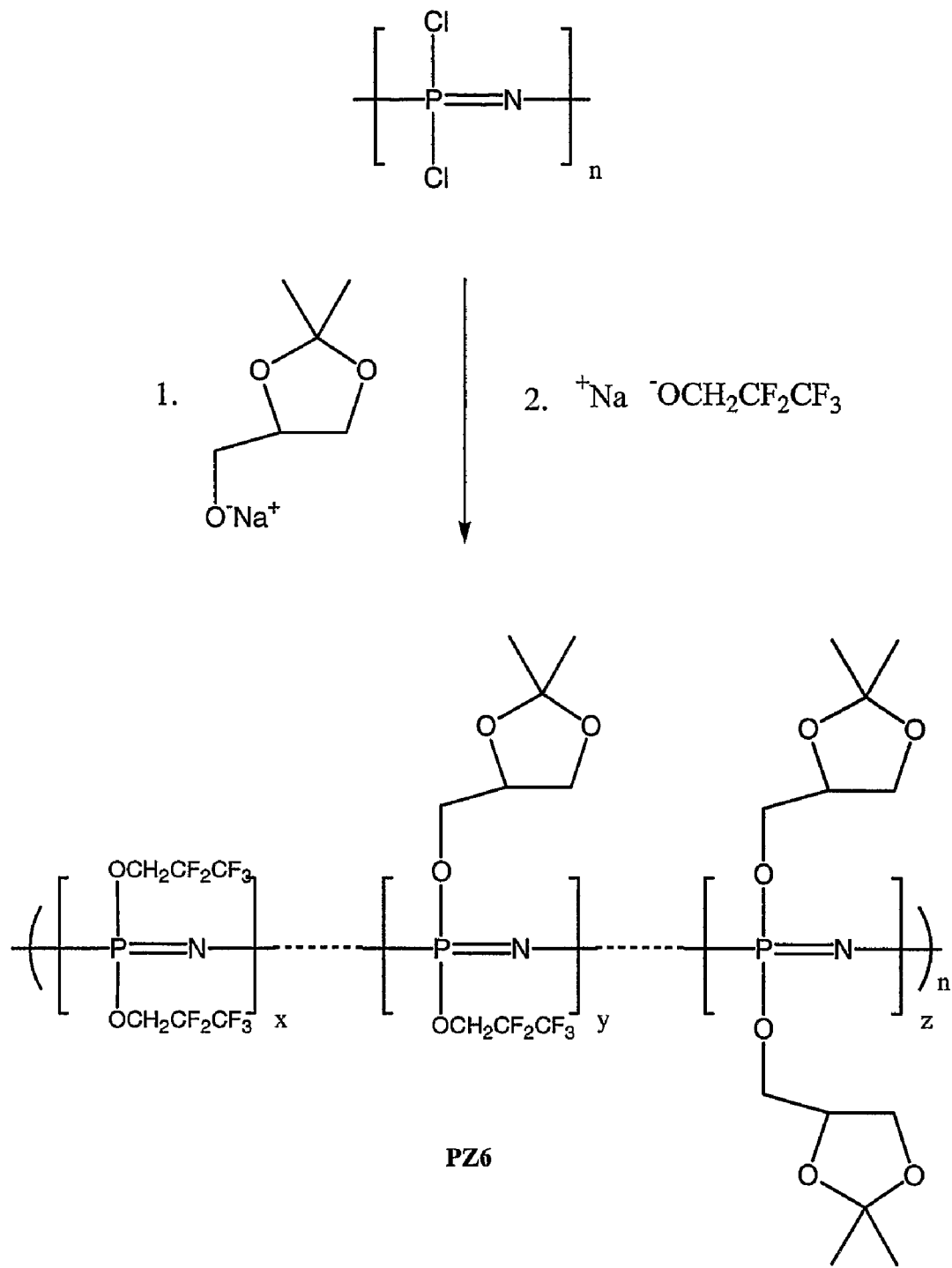
Figure 10:
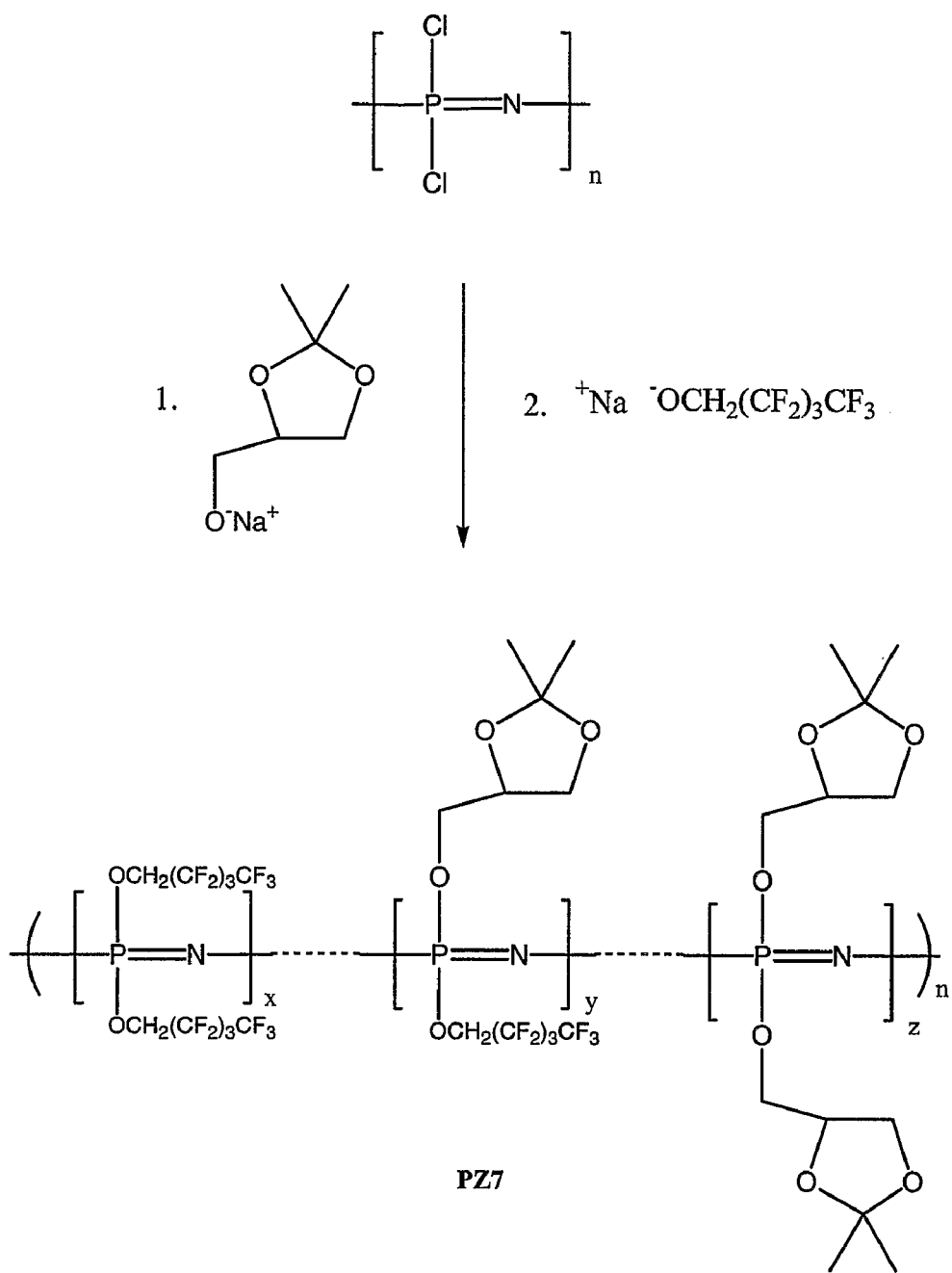
Figure 11:
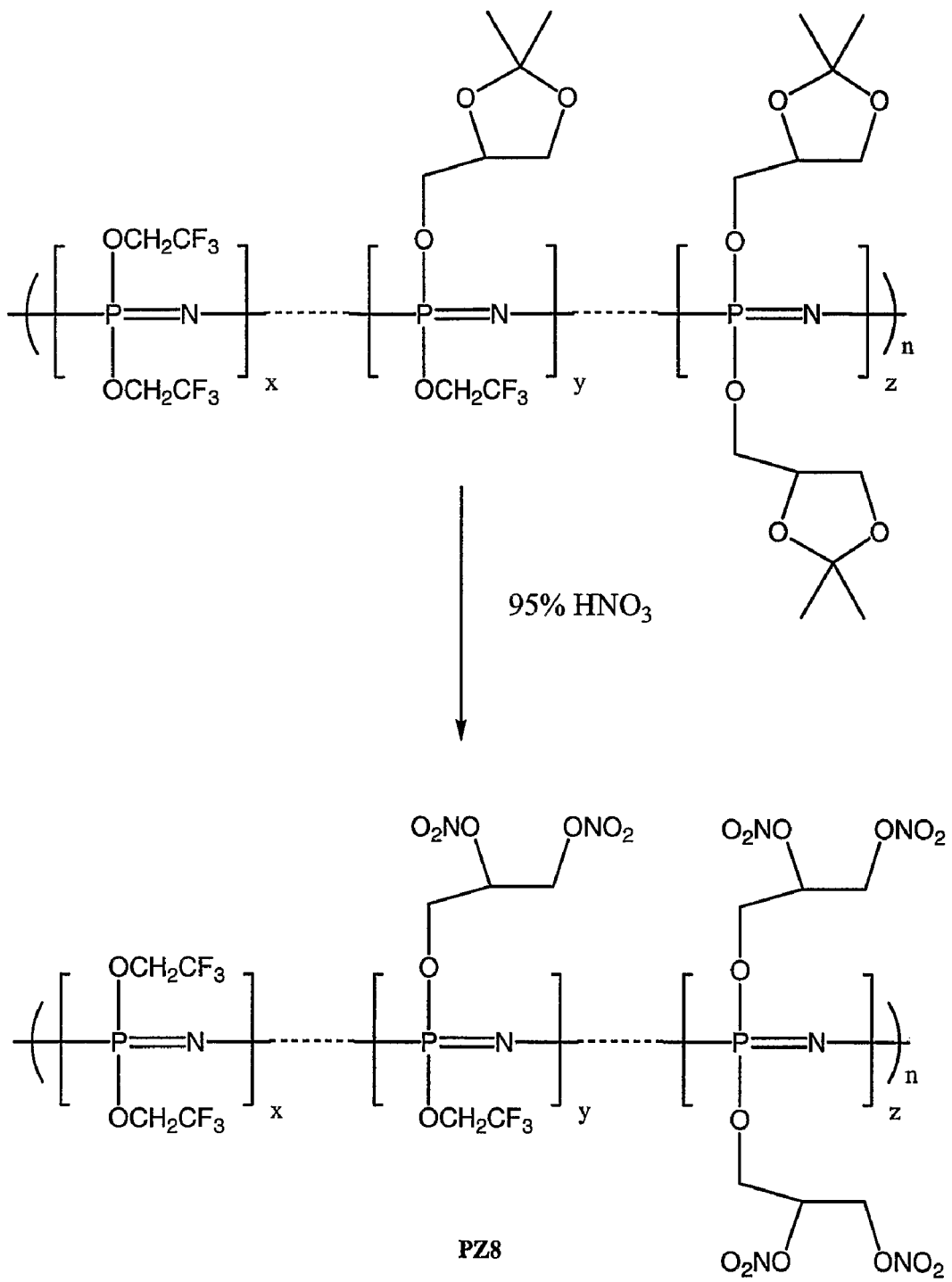
Figure 12:
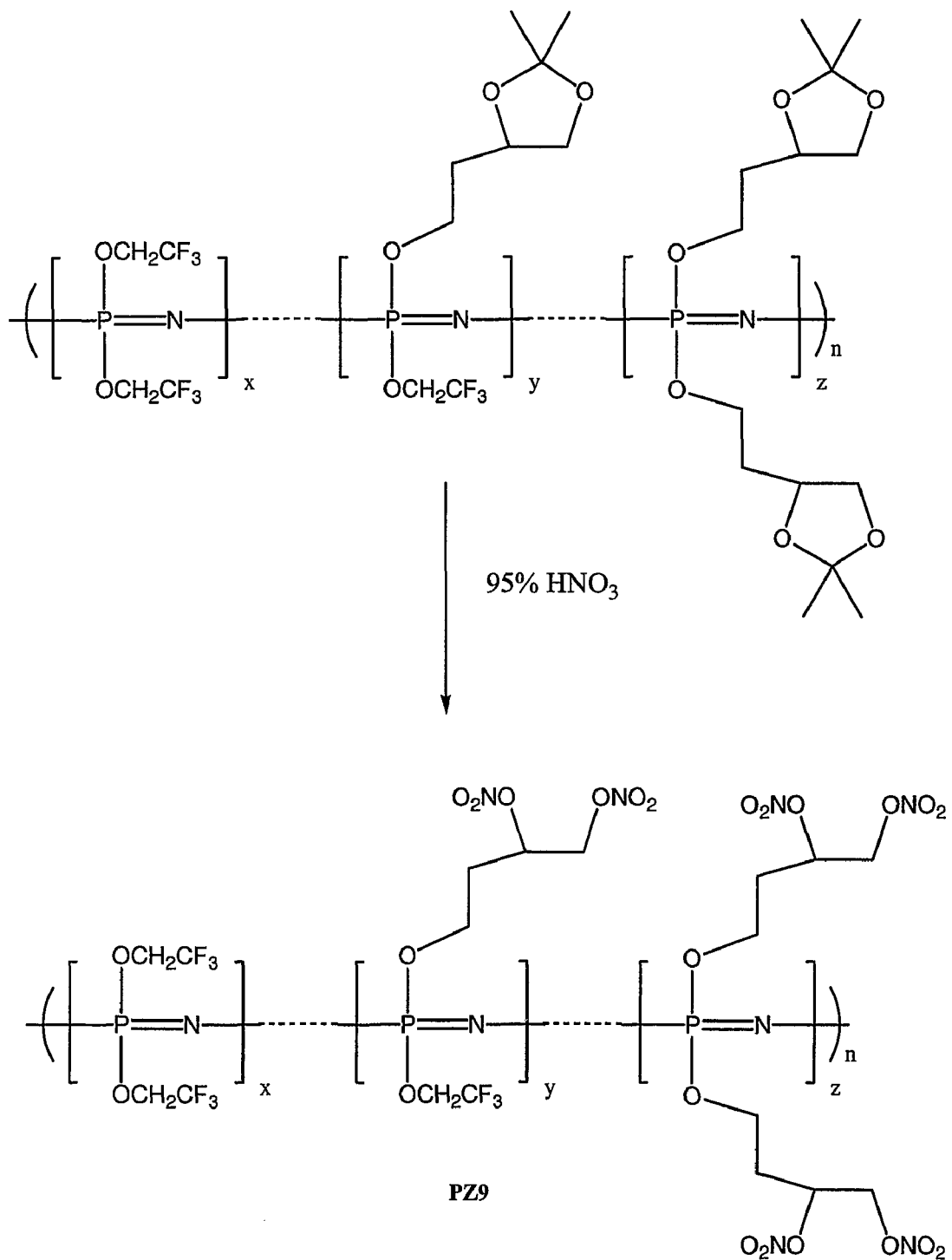
Figure 13:
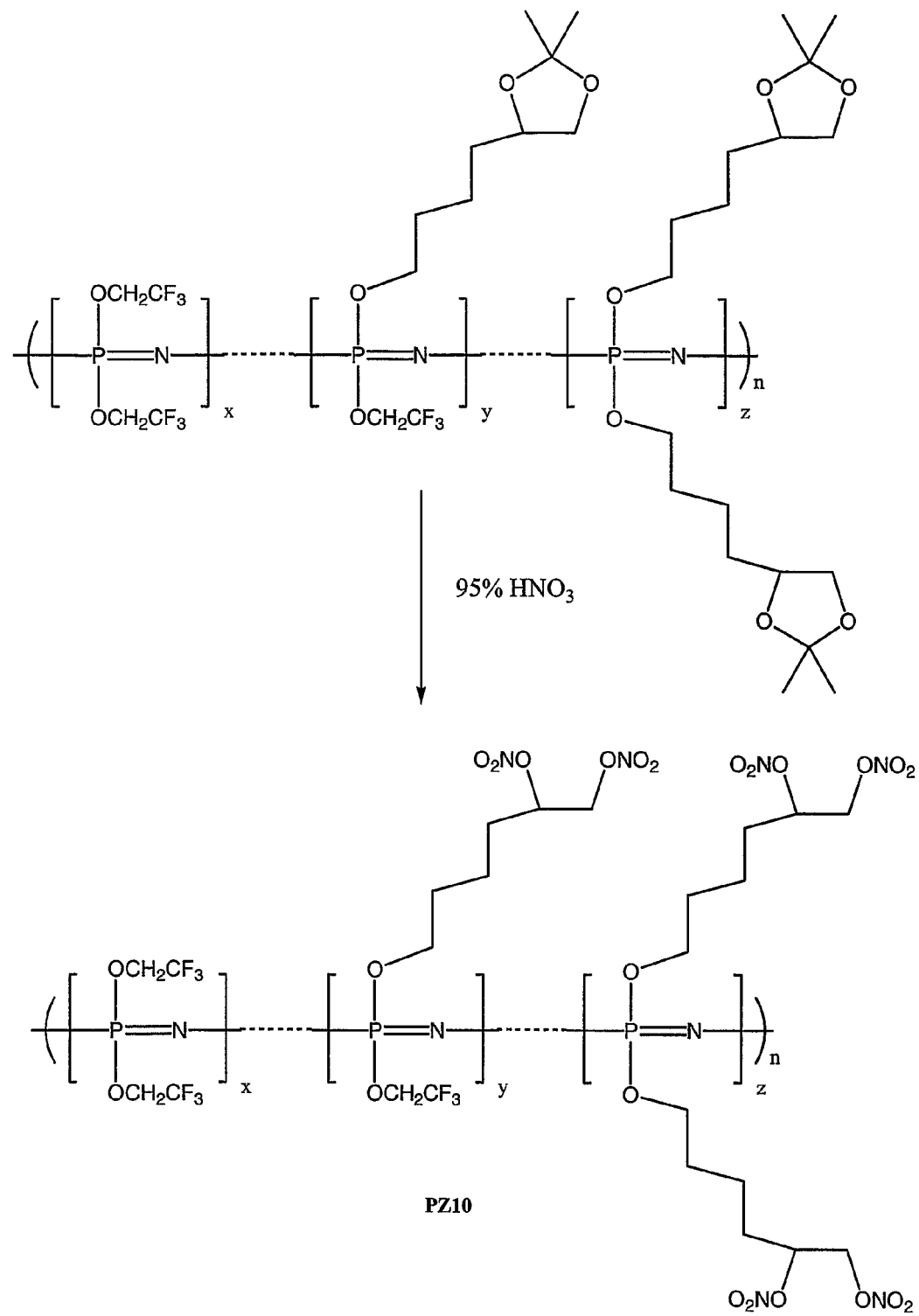
Figure 14:
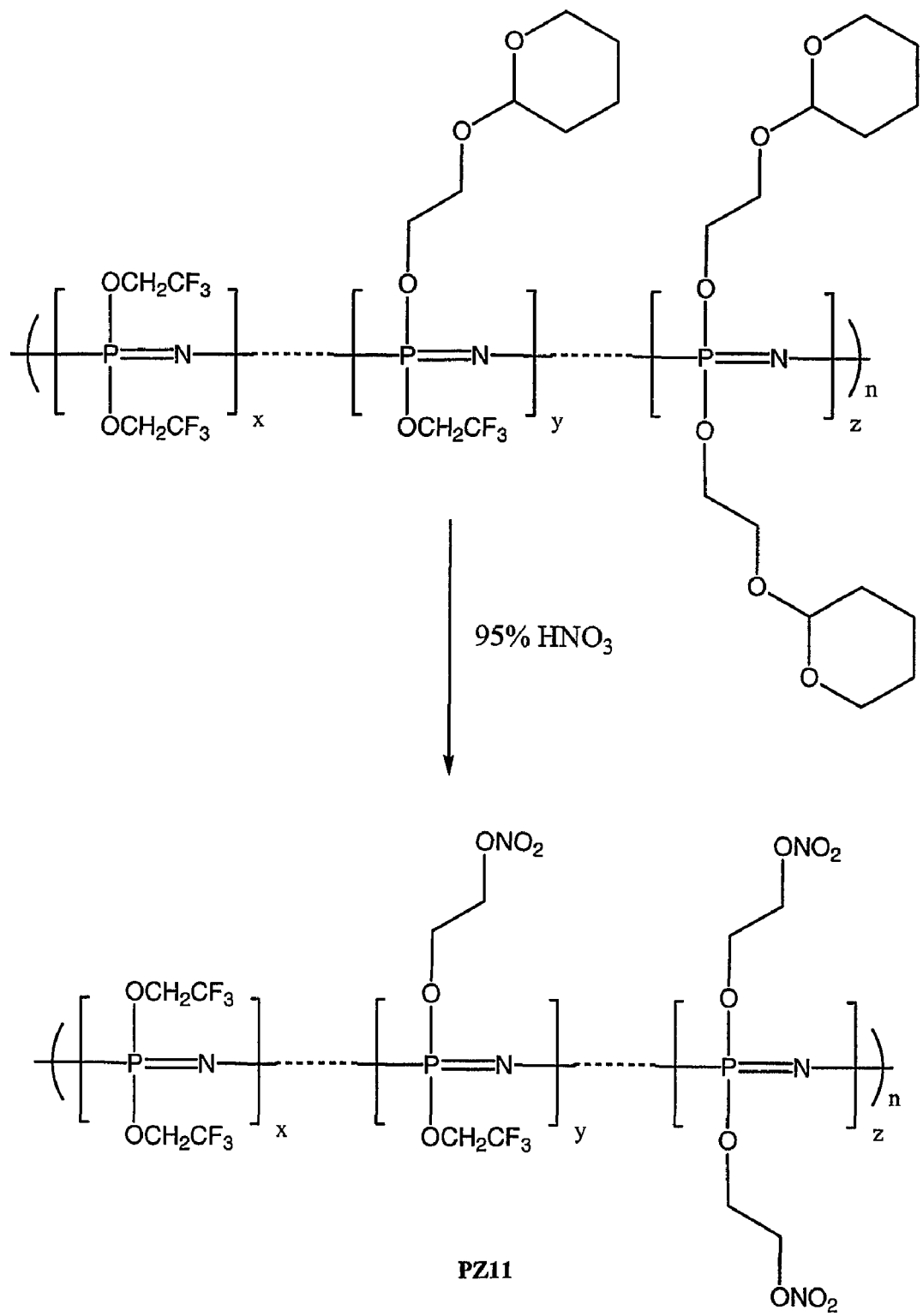
Figure 15:
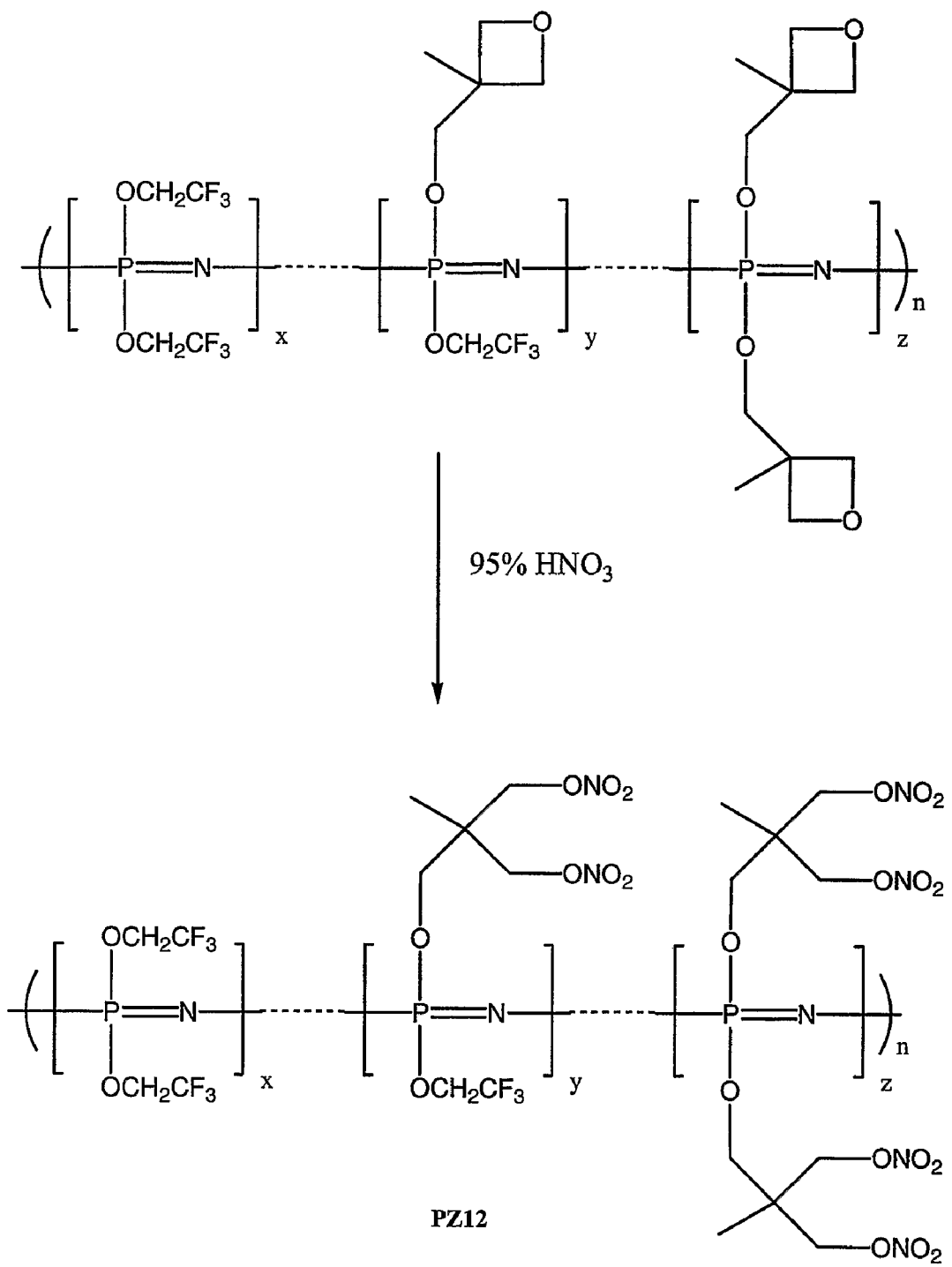
Figure 16:
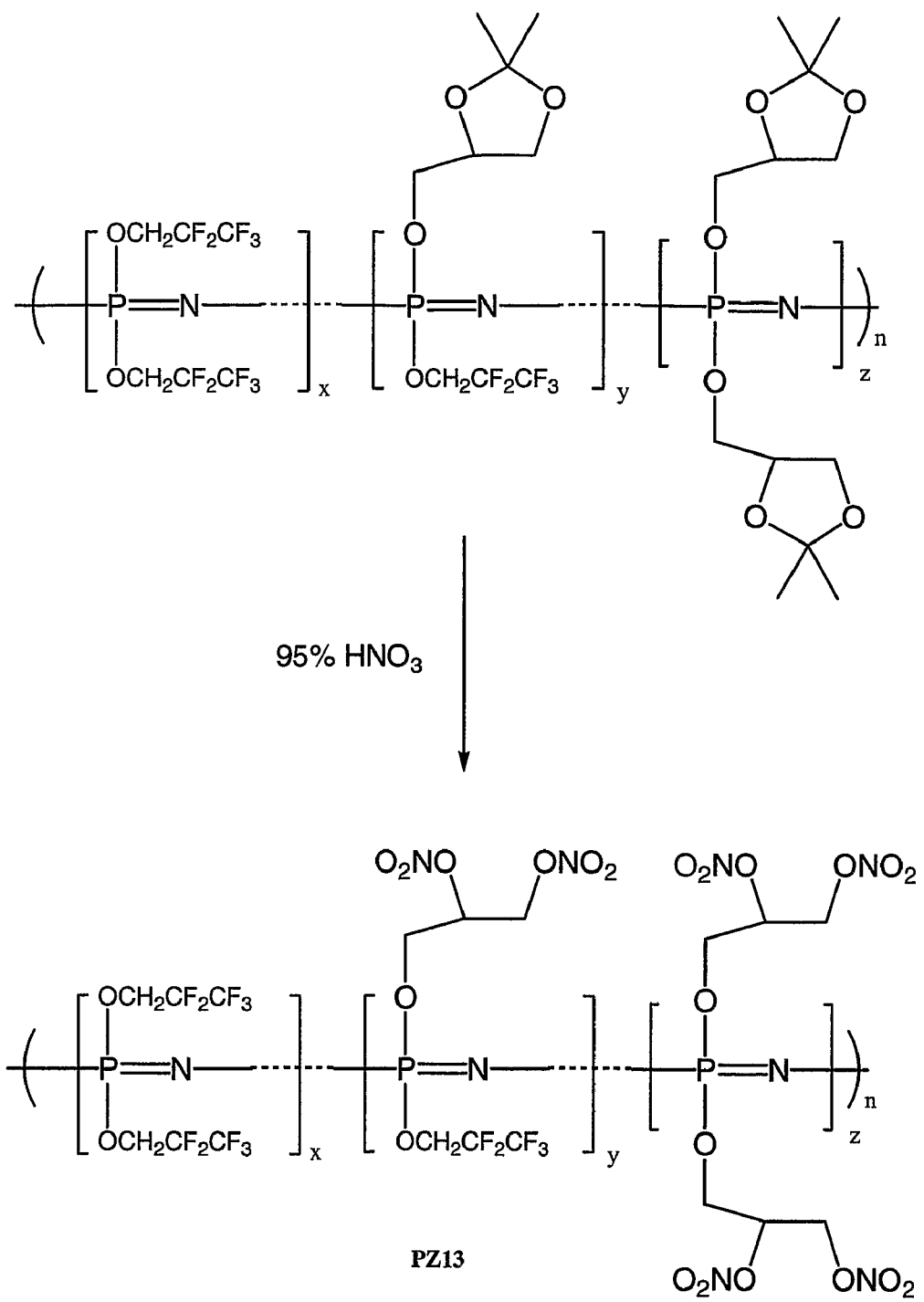
Figure 17:
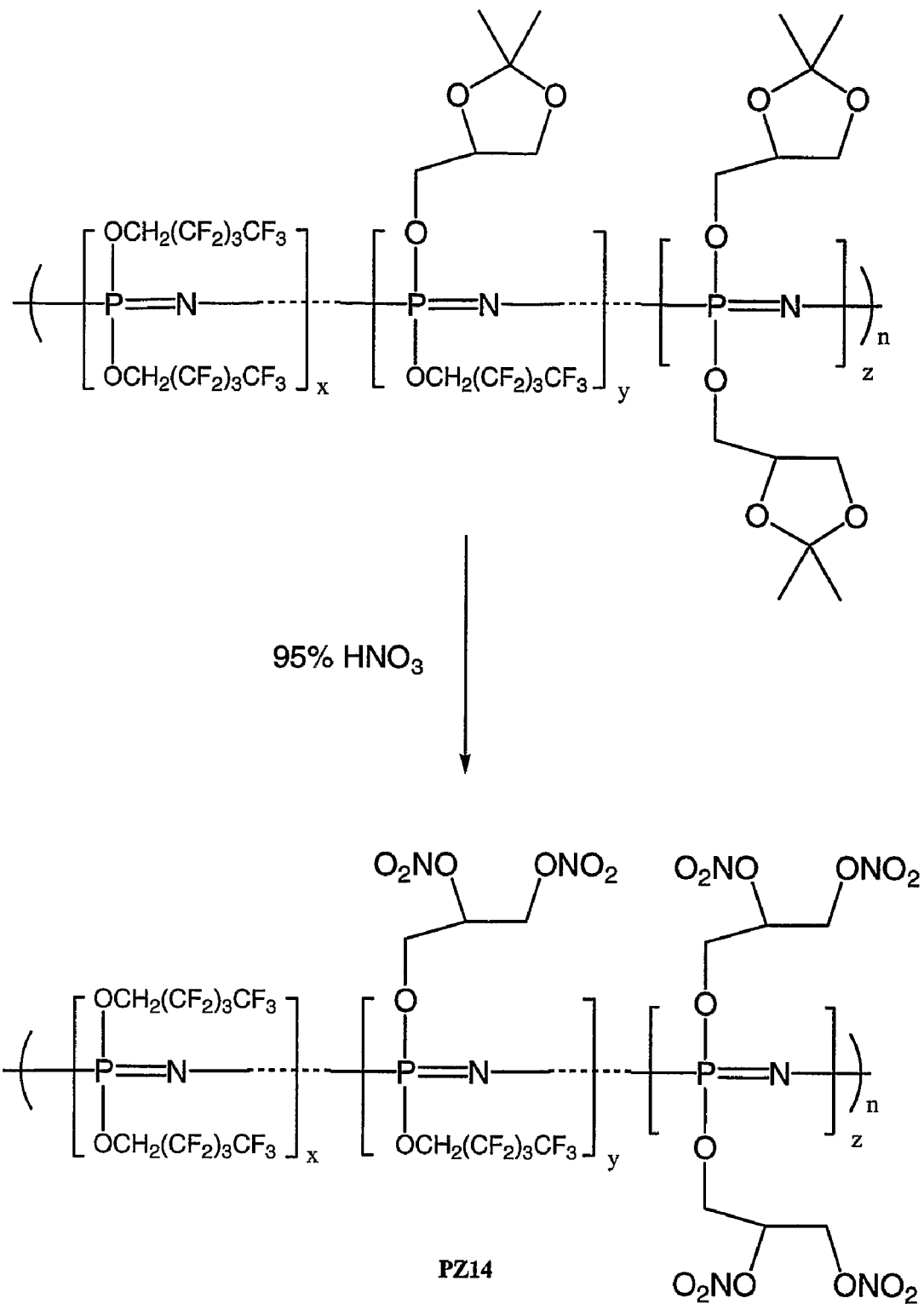
Figure 18:
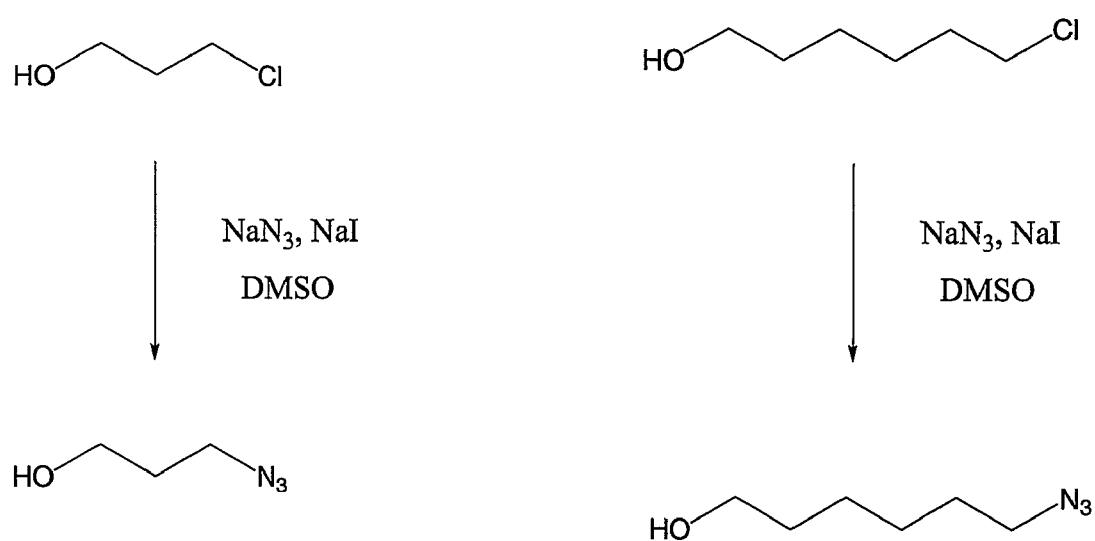
Figure 19:
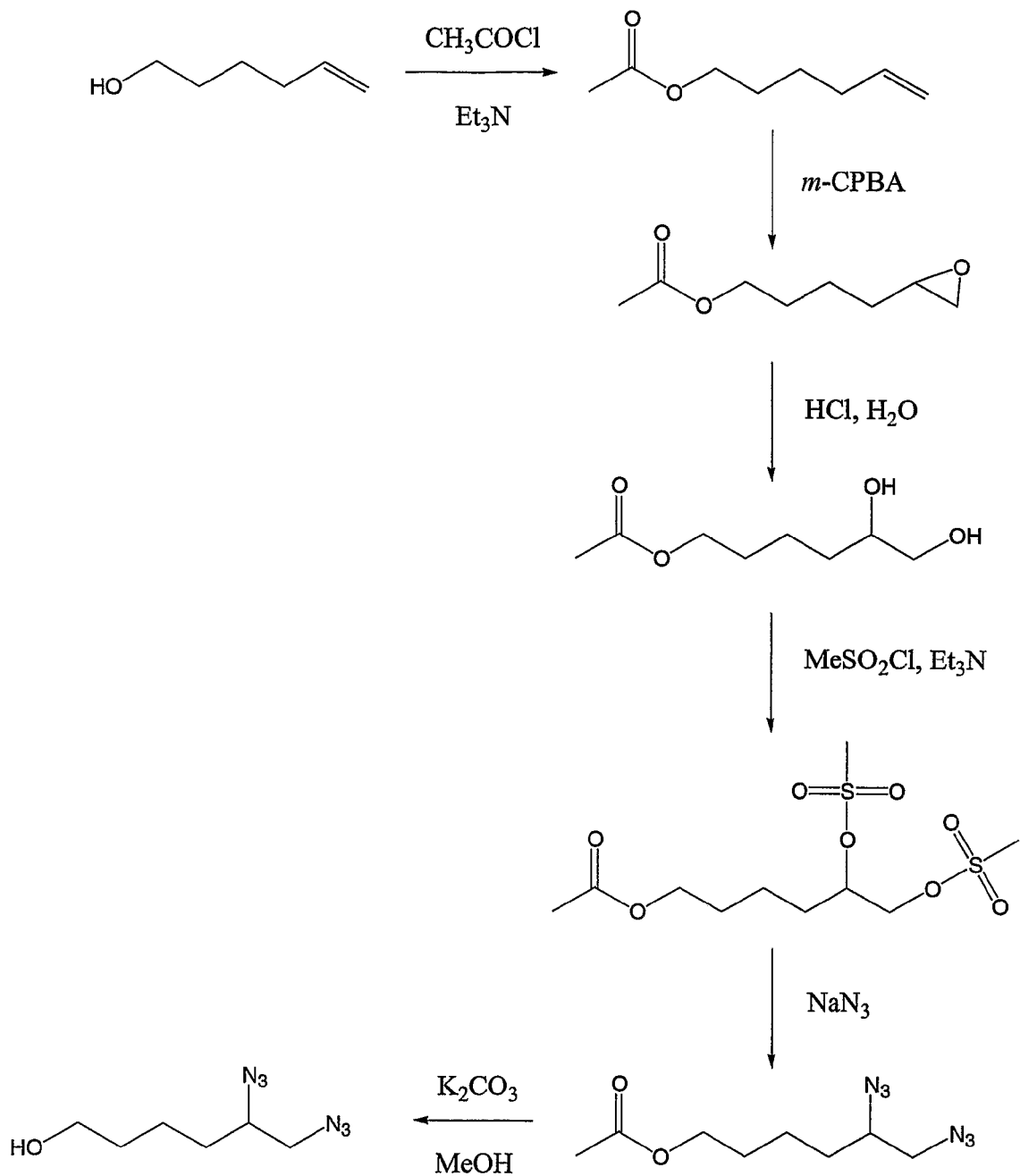
Figure 20:
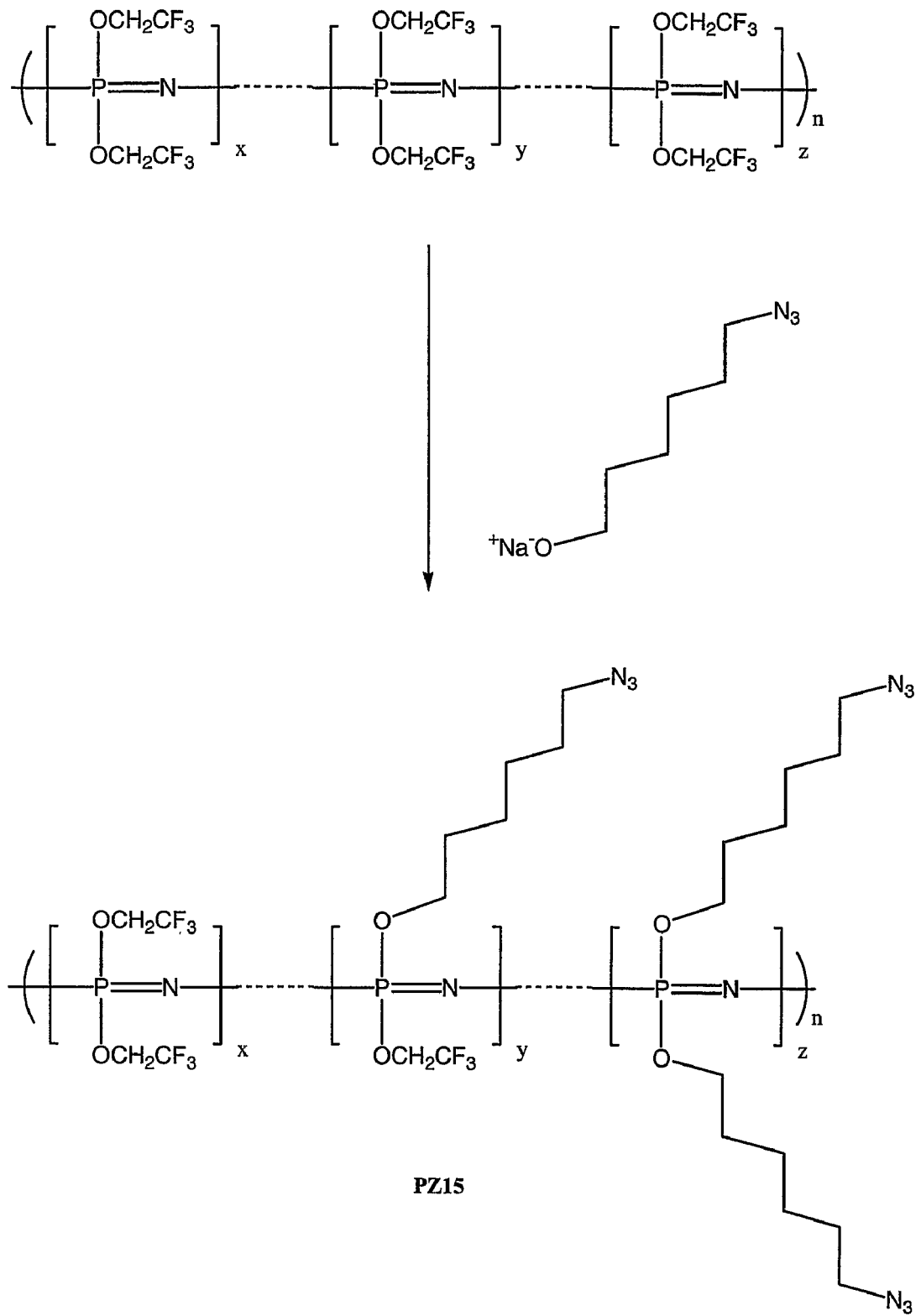
Figure 21:
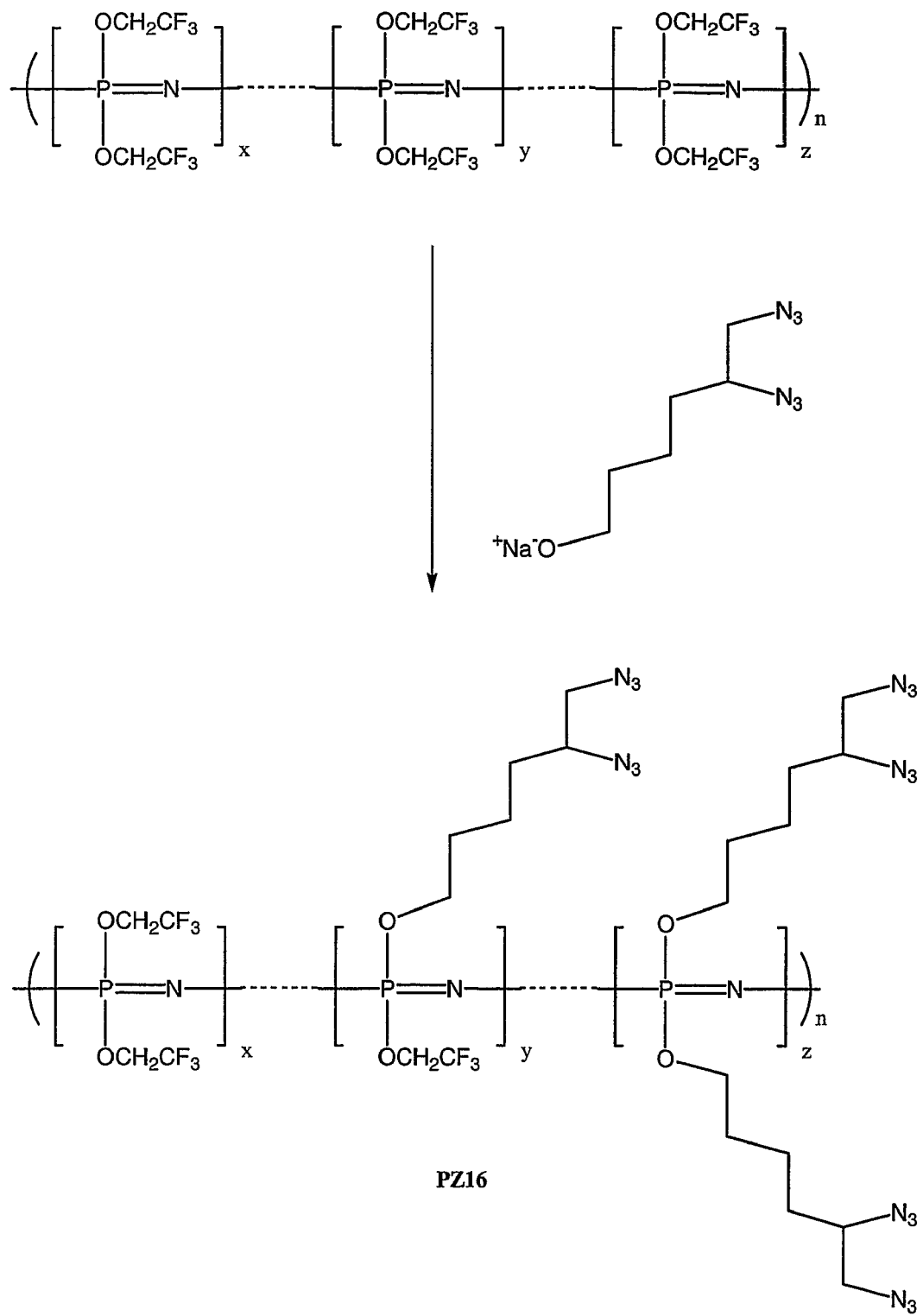
Figure 22:
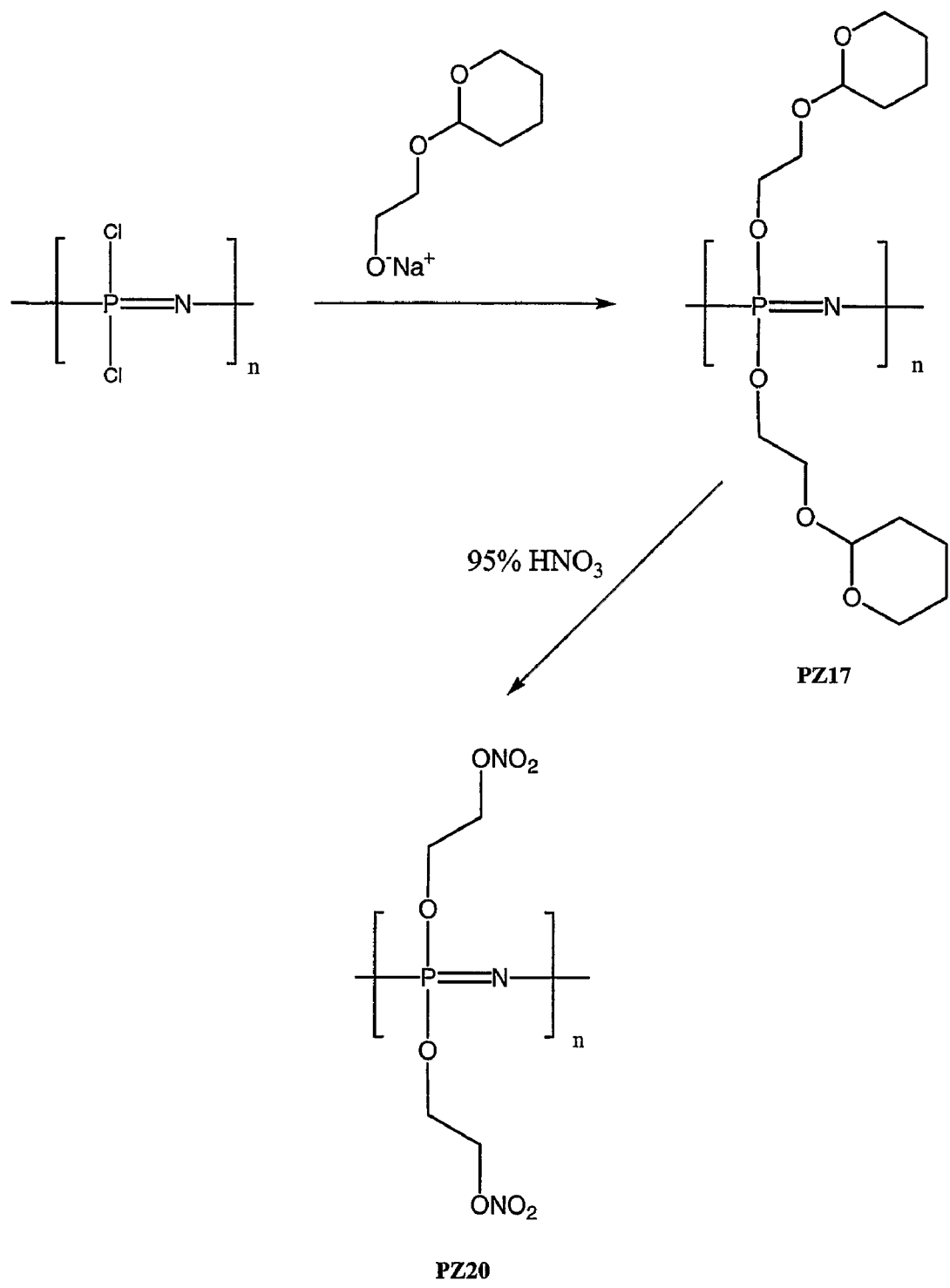
Figure 23:
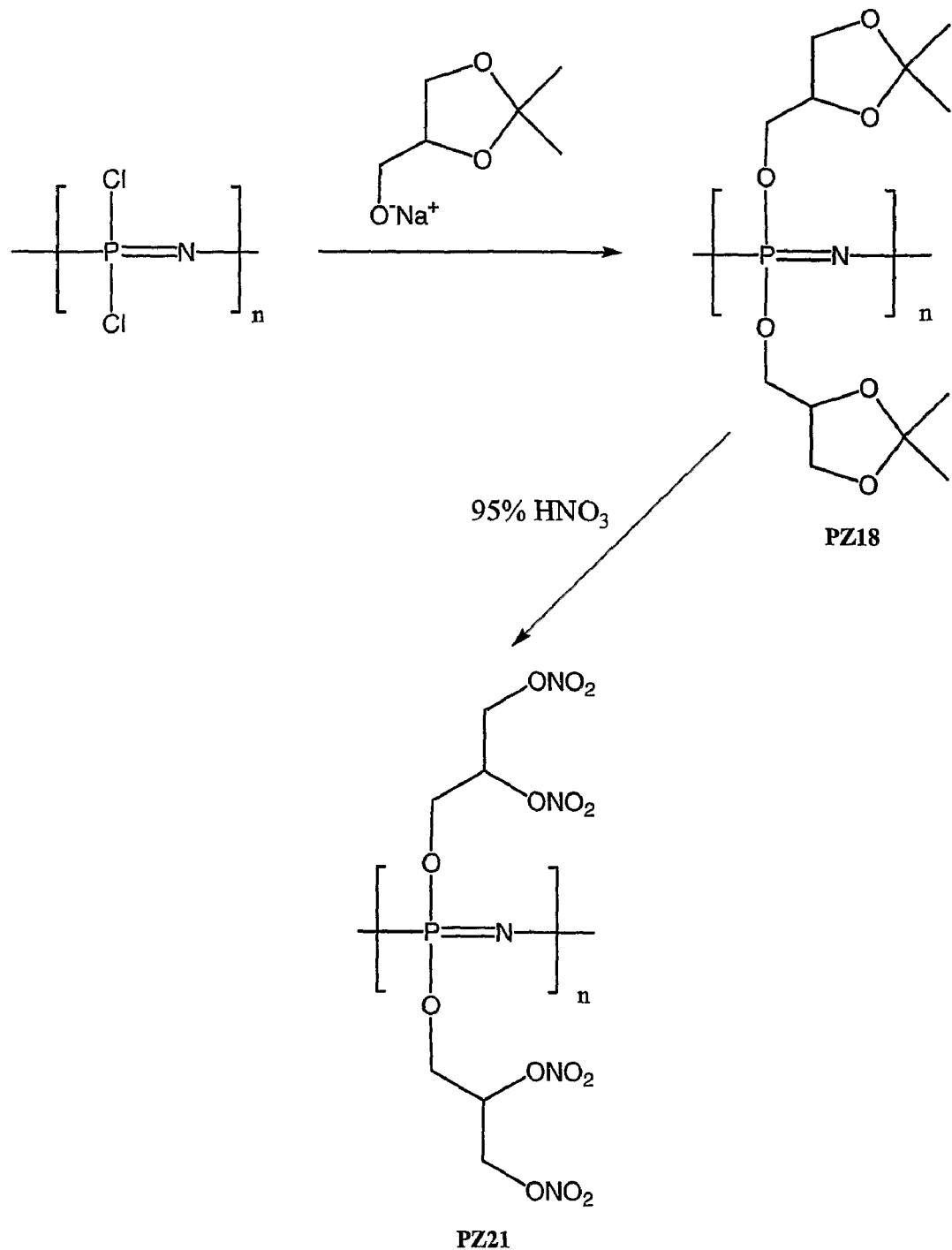
Figure 24:
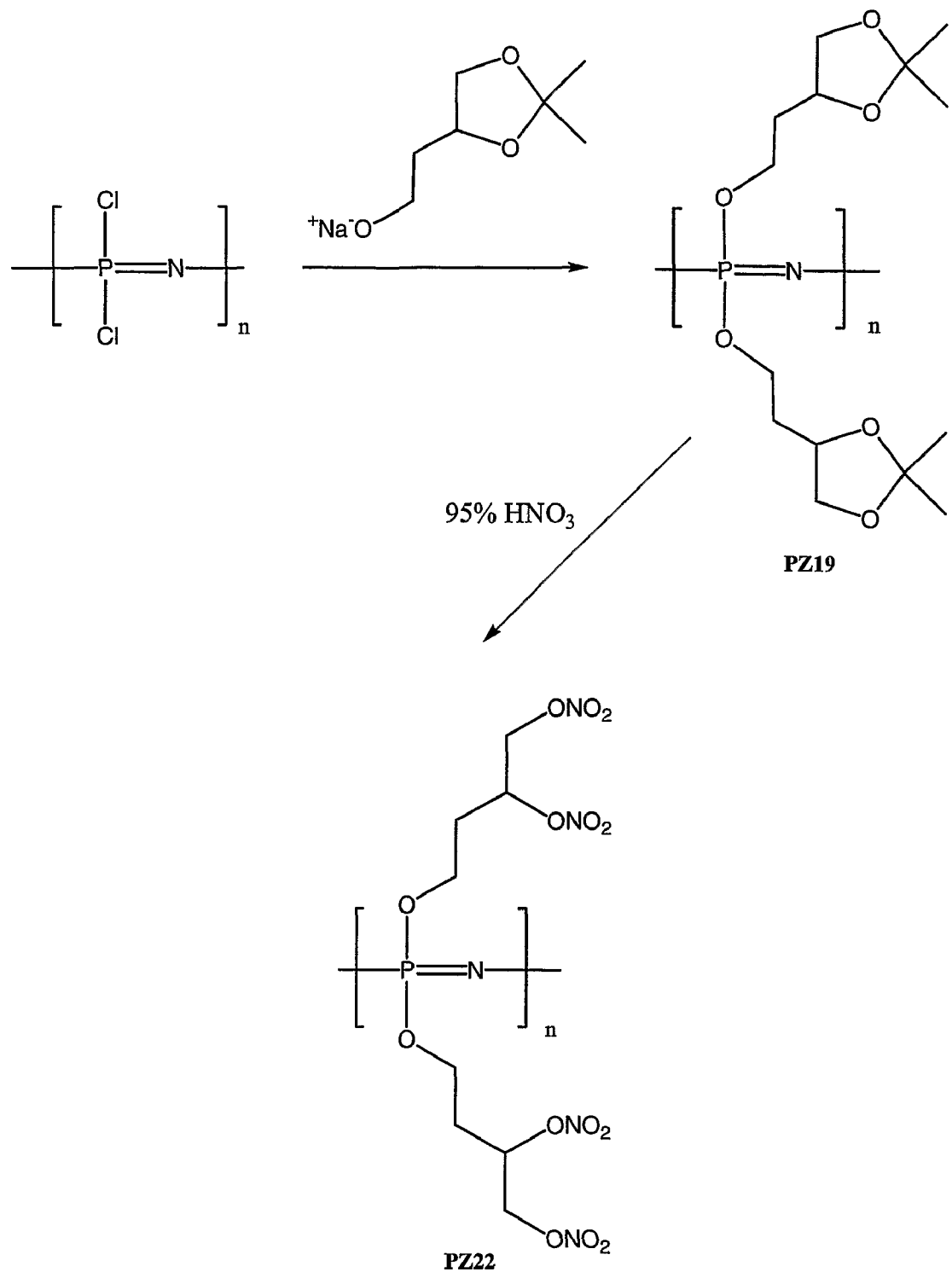
Figure 25:
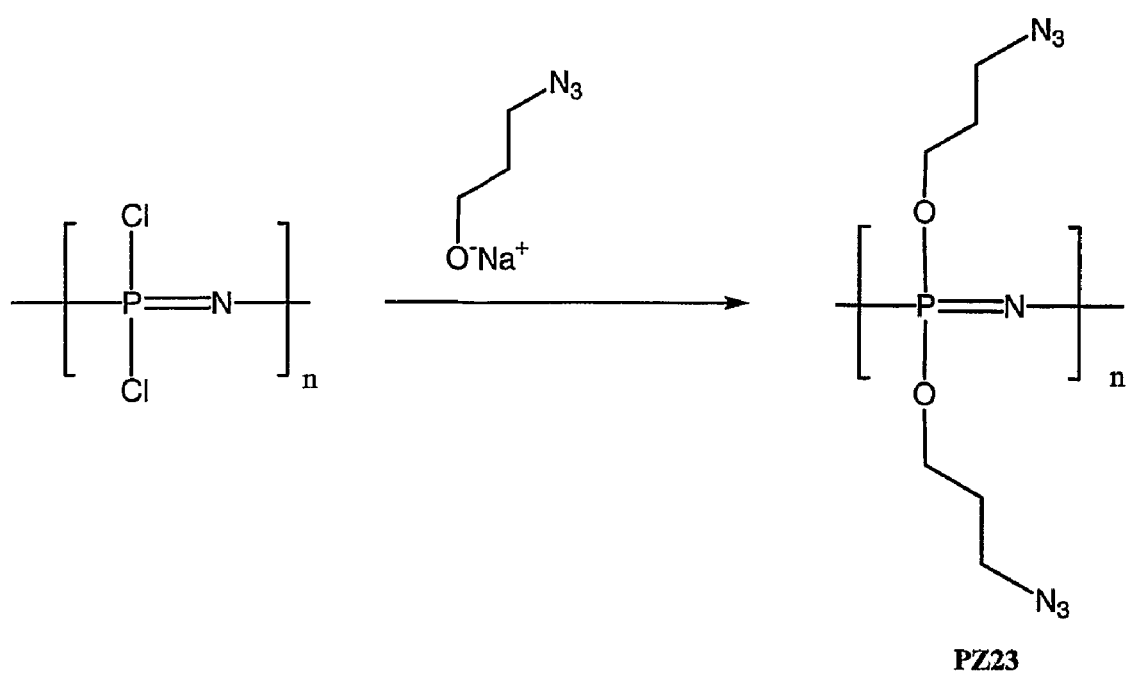
Figure 26:
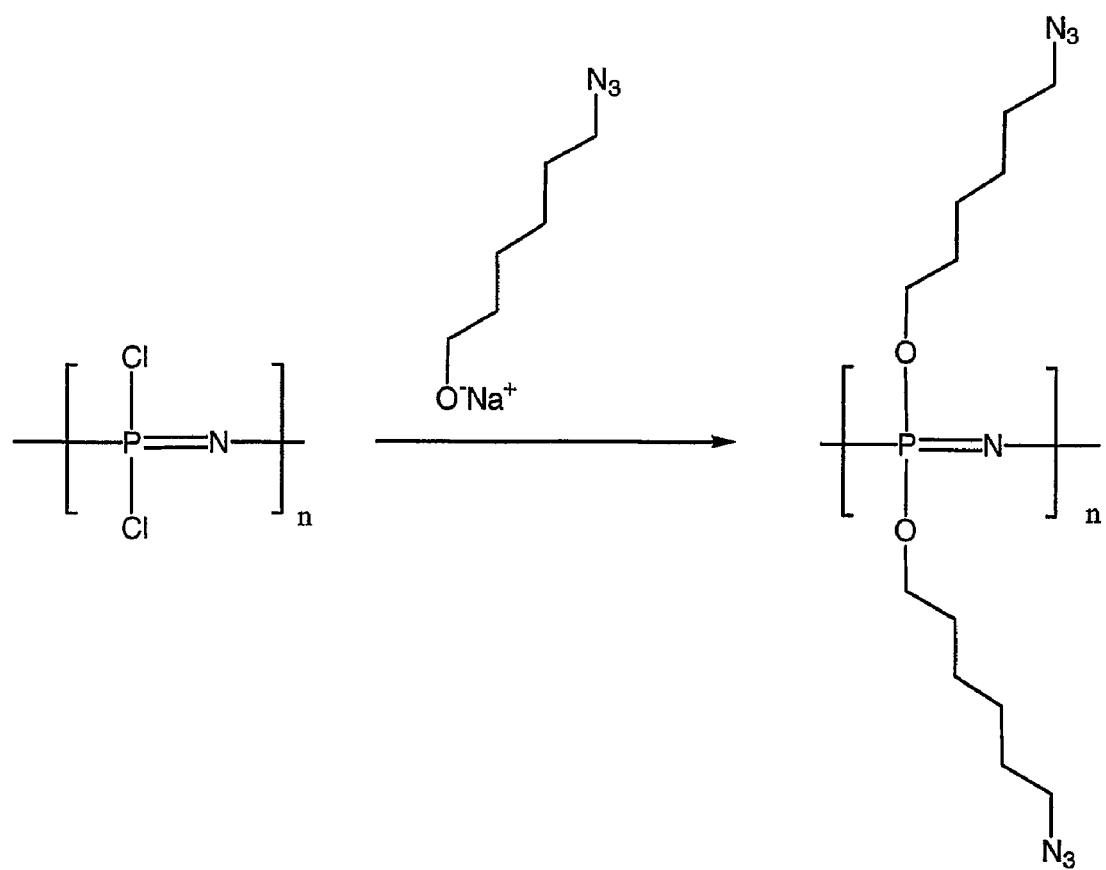
Figure 27:
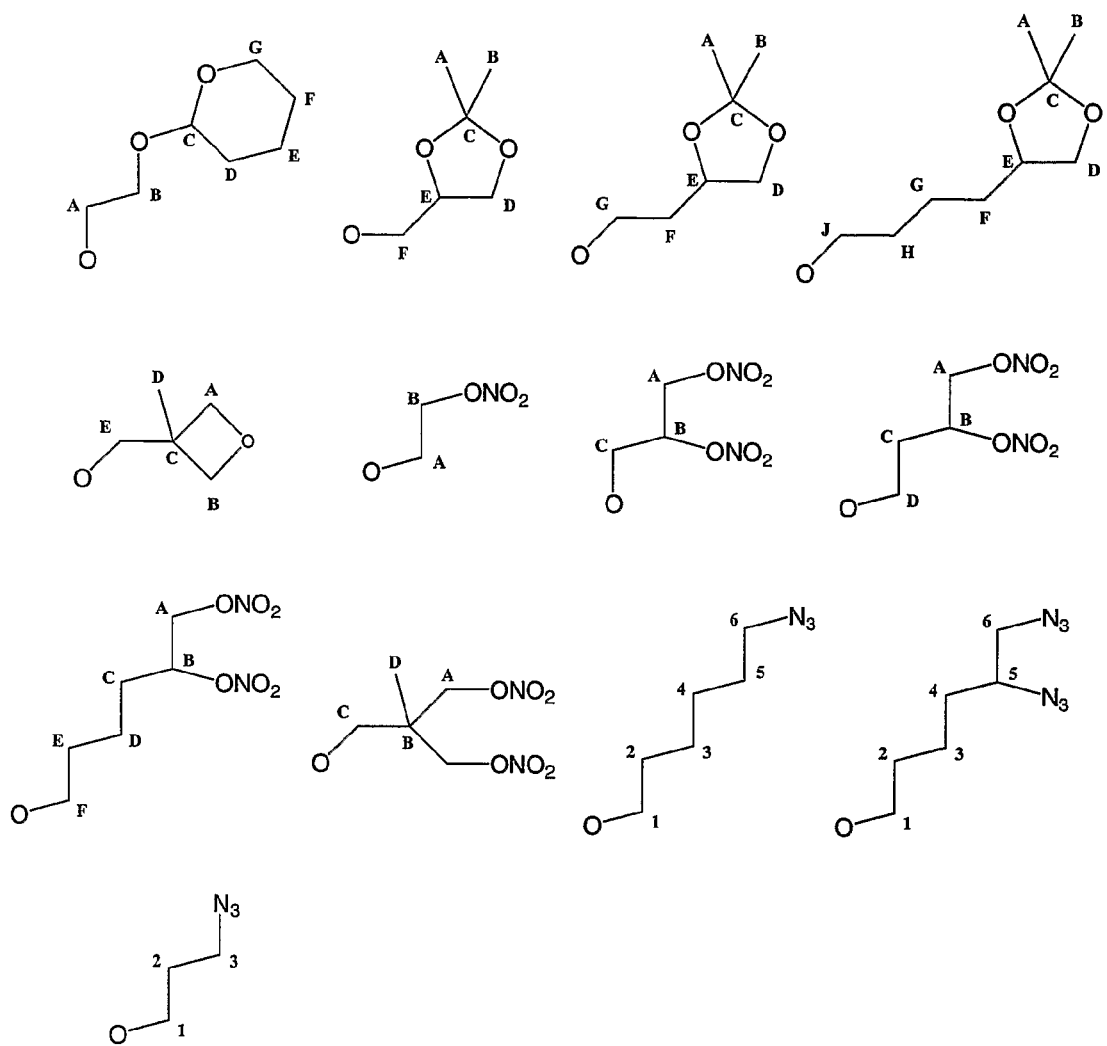

Detailed Syntheses of Polyphosphazene Compounds of Formula A and Formula B and their Precursors Nitrate Ester Functionalised Polyphosphazenes
(A-D) Precursor Synthesis (A1) Synthesis of Tris(trifluoroethoxy)-N-(trimethylsilyl)phosphoranimine Azidotrimethylsilane (10.54 g, 91.4 mmol) was added, with stirring, to 2,2,2-tris-trifluoroethylphosphite (10.0 g, 30.5 mmol) under an inert gas atmosphere. The mixture was heated to reflux (ca. 110° C.) and the reaction monitored by $^{31}P\{^{1}H\}$NMR spectroscopy. After all phosphite had been consumed (after approx. 72 hours), the reaction was allowed to cool to room temperature, yielding a pale yellow liquid. The pure phosphoranimine product was isolated from the crude mixture via vacuum distillation, to yield a colourless liquid. Yield=12.7 g (55%).

$\delta_H$ ($d_6$-acetone): 0.09 ppm (s) [Si(CH$_3$)$_3$]; 4.59 ('q') [CH$_2$CF$_3$]

$\delta_C$ ($d_6$-acetone): 2.67 ppm (s) [Si(CH$_3$)$_3$]; 63.21 (dq, $^2J_{C-F}$=37 Hz, $^2J_{C-P}$=5 Hz) [CH$_2$CF$_3$]; 123.94 (dq, $^1J_{C-F}$=276 Hz, $^3J_{C-P}$=11 Hz) [CH$_2$CF$_3$]

$\delta_P$ ($d_6$-acetone): −10.48 ppm (bs)

(A2) Synthesis of Poly[(bis-trifluoroethoxy)phosphazene]

Method 1
To a stirred solution of tris(trifluoroethoxy)-N-(trimethylsilyl)phosphoranimine (38.7 g, 93.0 mmol) in diglyme (45 ml), under an inert gas atmosphere, was added 1-methylimidazole (~2 mol %) and water (ca. 0.5 ml). The mixture was heated to 125° C. for 8 hours, yielding a pale yellow liquid. The crude mixture was decanted into a flask containing chloroform (150 ml), cooled to ca. −10° C. The polyphosphazene product appeared immediately as a white solid precipitate. This was filtered and washed thoroughly with portions of chloroform and hexane, before drying in vacuo for several hours. Yield=18.5 g (82%).

Method 2

Step 1—Freshly sublimed hexachlorocyclotriphosphazene (17 g) was placed in a dry pyrex tube and sealed under vacuum. The tube was placed in an oven and heated to 255° C. for 1 hour and then at 250° C. for 16 hours (with rotation of the tube) after which time, the molten material inside the tube almost ceased to flow. The tube was allowed to cool to room temperature, broken open inside an inert atmosphere glovebox and the contents dissolved in a minimum amount of anhydrous toluene. The product, consisting of poly(dichlorophosphazene), was isolated as a colourless rubbery material upon precipitation into an excess of anhydrous hexane.

Step 2—Sodium trifluoroethoxide was prepared by adding a solution of trifluoroethanol (5.0 g, 0.05 mol) in THF (32 ml) to a stirred suspension of sodium hydride (1.20 g, 0.05 mol) in THF (20 ml) under an inert atmosphere. To the resultant solution was added TBAB (tetra-n-butylammonium bromide, 0.1 g) and an anhydrous toluene solution of poly(dichlorophosphazene) (16 ml, 0.021 mol) via syringe. The reaction mixture was heated to reflux for 6 hours before adding to water, resulting in precipitation of a white solid consisting of poly[(bis-trifluoroethoxy)phosphazene]. The product was purified by precipitation as an acetone solution into toluene.

$v_{max}$(neat)/cm$^{-1}$: 1292, 1168, 1080, 962, 897, 845, 662

$\delta_H$ (d$_6$-acetone): 4.55 ppm (m) [CH$_2$CF$_3$]

$\delta_C$ (d$_6$-acetone): 64.12 ppm (q, $^2J_{C-F}$=37 Hz) [CH$_2$CF$_3$]; 123.92 (q, $^2J_{C-F}$=278 Hz) [CH$_2$CF$_3$]

$\delta_P$ (d$_6$-acetone): −6.28 ppm (bs)

(A3) Synthesis of Poly(dichlorophosphazene)

(i) Tris(chloro)-N-(trimethylsilyl)phosphoranimine

Diethyl ether (250 ml) was added with stirring to a flask cooled in an ice/water bath containing lithium bis(trimethylsilyl)amide (27.7 g, 0.17 mol). Phosphorus trichloride (14.5 ml, 0.17 mol) was then added and the mixture stirred for a further 5-10 minutes before removing the ice water bath. Stirring was continued at ambient temperature for a further 1-2 hours. The reaction flask was then cooled again in an ice/water bath and sulfuryl chloride (13.3 ml, 0.17 mol) added. The mixture was stirred for a further 10-15 minutes before removing the ice/water bath and stirring at ambient for a further 1-2 hours or until the reaction was complete, as indicated by $^{31}$P {$^1$H} NMR spectroscopy. The product was isolated in pure form via vacuum distillation.

Yield=76%

$\delta_H$ (CDCl$_3$): 1.26 ppm (s) [Si—CH$_3$]

$\delta_P$ (CDCl$_3$): −57.2 ppm (s)

(ii) Poly(dichlorophosphazene)

To a stirred solution of PCl$_5$ (37.0 mg, 0.178 mmol) in dichloromethane (10 ml) was added tris(chloro)-N-(trimethylsilyl)phosphoranimine (1.0 g, 4.45 mmol). Stirring was maintained at ambient temperature for 2-6 hours or until the reaction was complete, as indicated by $^{31}$P {$^1$H} NMR spectroscopy. Dichloromethane was removed in vacuo to yield the product as a colourless, tacky viscous liquid.

Yield=100%

$\delta_P$ (CDCl$_3$): −17.4 ppm (s)

[NB. Poly(dichlorophosphazene) may also be prepared via Method 2 (Step 1) of process A2 above].

(A4) Synthesis of (2,2-dimethyl-[1,3]-dioxolan-4-yl)-butanol

To a stirred solution of 1,2,6-hexanetriol (10.0 g, 74.6 mmol) in acetone (50 ml) was added dichloromethane (50 ml), p-toluene sulphonic acid (1 mol %, catalyst) and anhydrous magnesium sulphate (50 g). The mixture was allowed to stir at ambient temperature for 24 hours. The MgSO$_4$ was then removed via filtration and the acetone/dichloromethane solution washed with saturated sodium bicarbonate solution (1×30 ml) and water (2×30 ml). The organic solution was then dried over anhydrous MgSO$_4$, filtered and solvent removed in vacuo, to yield the product as a colourless liquid. Yield=13.0 g (79%).

$v_{max}$ (neat)/cm$^{-1}$: 3419 (O—H stretch), 2985, 2937, 2866, 1379, 1370, 1247, 1215, 1156, 1057, 853

$\delta_H$ (d$_6$-acetone): 1.26 ppm (s), 1.30 (s) [H$_A$, H$_B$]; 1.30-1.70 (m) [H$_F$, H$_G$, H$_H$]; 3.43 (m), 3.99 (m) [H$_D$, H$_{D'}$]; 3.52 (m) [H$_J$]; 4.01 (m) [H$_E$].

$\delta_C$ (d$_6$-acetone): 22.76 ppm (s) [C$_G$]; 25.90 (s), 27.18 (s) [C$_A$, C$_B$]; 33.35 (s), 34.02 (s) [C$_F$, C$_H$]; 62.08 (s) [C$_J$]; 69.79 (s) [C$_D$]; 76.54 (s) [C$_E$]; 108.73 (s) [C$_C$].

(A5) Synthesis of (2,2-dimethyl-[1,3]-dioxolan-4-yl)-ethanol

A similar procedure as described in A4 was followed, using 1,2,4-butanetriol (10.0 g, 94.3 mmol). The product was isolated as a colourless liquid. Yield=7.6 g (55%)

$v_{max}$ (neat)/cm$^{-1}$: 3426 (O—H stretch), 2987, 2938, 2878, 1472, 1456, 1379, 1370, 1244, 1216, 1159, 1059, 856

$\delta_H$ (d$_6$-acetone): 1.25 ppm (s), 1.30 (s) [H$_A$, H$_B$]; 1.72 (m) [H$_F$]; 3.49 (m), 4.01 (m) [H$_D$, H$_{D'}$]; 3.61 (m) [H$_G$]; 4.15 (m) [H$_E$].

$\delta_C$ (d$_6$-acetone): 25.34 ppm (s), 26.56 (s) [C$_A$, C$_B$]; 36.58 (s) [C$_F$]; 58.74 (s) [C$_G$]; 69.35 (s) [C$_D$]; 73.77 (s) [C$_E$]; 108.13 (s) [C$_C$].

[(2,2-dimethyl-[1,3]-dioxolan-4-yl)-methanol is a commercially available material and was purchased from Aldrich].

(A6) Synthesis of 2-Pyranyloxy ethanol 3,4-Dihydro-2H-pyran (30.0 g, 0.36 mol), ethylene glycol (310.0 cm$^3$, 5.36 mol) and p-toluene sulphonic acid (ca. 1 mol %, catalyst) were added to dichloromethane (100 cm$^3$) and the mixture stirred at ambient temperature for 18 hours under an inert gas atmosphere. Water (ca. 150 cm$^3$) was then added, resulting in a biphasic mixture. The organic phase (containing the desired product) was collected and the aqueous phase (containing excess ethylene glycol) extracted with further portions of dichloromethane (3×50 cm$^3$). The combined organic phase and washings were dried over anhydrous magnesium sulphate, filtered and solvent removed in vacuo to yield the crude product containing, almost exclusively, the mono-protected alcohol. The desired product was isolated via flash column chromatography (using silica gel 60 and a 3:1 ratio of hexane:ethyl acetate as eluant). Yield=9.10 g (17.3%).

$v_{max}$ (neat)/cm$^{-1}$: 3425 (broad, O—H stretch), 2943, 2872, 1455, 1443, 1385, 1351, 1202, 1138, 1124, 1072, 1033, 986, 926, 905, 871, 812.

$\delta_H$ (d$_6$-acetone): 1.31 ppm (m) [H$_E$, H$_F$]; 1.40-1.70 (m) [H$_D$]; 3.20-3.70 (m) [H$_A$, H$_B$, H$_G$]; 4.36 (m) [H$_C$].

$\delta_C$ (d$_6$-acetone): 19.81 ppm [C$_E$]; 25.22 [C$_F$]; 30.65 [C$_D$]; 61.88 [C$_G$]; 62.95 [C$_A$]; 70.18 [C$_B$]; 99.81 [C$_C$].

(B) General Procedure for Synthesis of Li Salts of (2,2-dimethyl-[1,3]-dioxolan-4-yl-methanol, (2,2-dimethyl-[1,3]-dioxolan-4-yl)-ethanol (2,2-dimethyl-[1,3]-dioxolan-4-yl)-butanol and 2-pyranyloxy ethanol and (3-methyl-oxetan-3-yl)-methanol To a stirred solution of the appropriate alcohol in THF (under an inert gas atmosphere) was added, dropwise, an equimolar amount of n-BuLi (as a 1.8M solution in hexanes), at ambient temperature. During addition, warming of the reaction flask was noticeable. The solution was left to stir at ambient temperature for 1-2 hours, yielding a pale yellow solution of the Li salt in THF (quantitative conversion).

(C) General Procedure for Synthesis of Na Salts (2,2-dimethyl-[1,3]-dioxolan-4-yl-methanol, (2,2-dimethyl-[1,3]-dioxolan-4-yl)-ethanol, (2,2-dimethyl-[1,3]-dioxolan-4-yl)-butanol, 2-pyranyloxy ethanol and (3-methyl-oxetan-3-yl)-methanol A suspension of sodium hydride in THF (under an inert gas atmosphere) was prepared. An equimolar amount of the appropriate alcohol, as a solution in THF, was added dropwise at ambient temperature. The mixture was allowed to stir for several hours at ambient, yielding the Na-salt as a suspension in THF (quantitative conversion).

(D1) General Method for the Synthesis of Trifluoroethoxy/(2,2-dimethyl-[1,3]-dioxolan-4-yl)-methoxy polyphosphazene (PZ1)

To a stirred solution of poly[(bis-trifluoroethoxy)phosphazene] (1.0 g, 4.12 mmol) in THF (20 ml), under an inert gas atmosphere, was added a solution of the Li salt of (2,2-dimethyl-[1,3]-dioxolan-4-yl)-methanol in THF (10 ml) [Alternatively, a solution poly[(bis-trifluoroethoxy)phosphazene] can be added to a stirred suspension of the sodium salt in THF]. The mixture was heated to reflux and stirred for 18 hours. Upon cooling to ambient temperature, the THF was reduced and a concentrated solution/suspension of the crude product was added to water dropwise, with stirring. The aqueous mixture was then acidified (to ca. pH 5-6), resulting in precipitation of the polymeric product. The aqueous solution was decanted and the polymer redissolved in dichloromethane (ca 50 ml) if soluble (otherwise dried in vacuo at 50° C. for several hours). The organic solution was then extracted with saturated sodium chloride solution (2×30 ml) and finally with water 1×30 ml) before drying over anhydrous MgSO$_4$ (alternatively multiple precipitations into water can be used followed by disolution in dichloromethane and drying over MgSO$_4$. After filtration and removal of solvent in vacuo, the product was dissolved in a minimum quantity of acetone and precipitated into hexane (ca 100 ml). The hexane was decanted and the product dried in vacuo (precipitation into hexane was repeated until the product was pure, via $^1$H NMR). The polymeric product was isolated as a pale yellow viscous liquid. Yield=ca. 60-90%.

$\nu_{max}$(neat)/cm$^{-1}$: 2990, 2969, 1281, 1255, 1171, 1084, 964, 879, 843, 660, 562

$\delta_H$ (d$_6$-acetone): 1.29 (s), 1.36 (s) ppm [H$_A$, H$_B$]; 3.81 (b), 4.09 (b), 4.36 (b) [H$_D$, H$_E$, H$_F$]; 4.55 (b) [CH$_2$CF$_3$].

$\delta_C$ (d$_6$-acetone): 24.59 ppm (s), 26.19 (s) [C$_A$, C$_B$]; 62.77 (q, $^2$J$_{C-F}$=37 Hz) [CH$_2$CF$_3$]; 65.69 (b) [C$_D$]; 67.92 [C$_F$]; 74.11 (s) [C$_E$]; 109.54 (s) [C$_C$]; 123.17 (q, $^2$J$_{C-F}$=276 Hz) [CH$_2$CF$_3$].

$\delta_P$ (d$_6$-acetone): ~-7.0 ppm (b)

(D2) General Method for the Synthesis of Trifluoroethoxy/(2,2-dimethyl-[1,3]-dioxolan-4-yl)-ethoxy polyphosphazene (PZ2)

A similar procedure as described in (D1) was followed, using the Na or Li alkoxide salt of (2,2-dimethyl-[1,3]-dioxolan-4-yl)-ethanol. The product was isolated as a pale yellow viscous liquid. Yield=ca. 60-90%.

$\nu_{max}$(neat)/cm$^{-1}$: 2990, 2967, 1419, 1373, 1282, 1170, 1089, 964, 862

$\delta_H$ (d$_6$-acetone): 1.28 ppm (s), 1.33 (s) ppm [H$_A$, H$_B$]; 1.92 (b,m) [H$_F$]; 3.57 (b,m) [H$_D$]; 4.00-4.30 (b,m) [H$_D$, H$_E$, H$_G$]; 4.55 (m) [CH$_2$CF$_3$].

$\delta_C$ (d$_6$-acetone): 25.09 (s), 26.41 (s) [C$_A$, C$_B$]; 34.27 (b) [C$_F$]; 63.28 (q, $^2$J$_{C-F}$=38 Hz) [CH$_2$CF$_3$]; 69.03 (s) [C$_D$]; 72.94 (s) [C$_E$]; 108.49 (s) [C$_C$]; 123.12 (q, $^1$J$_{C-F}$=277 Hz) [CH$_2$CF$_3$].

$\delta_P$ (d$_6$-acetone): -7.23 ppm (b)

(D3) General Method for the Synthesis of Trifluoroethoxy/(2,2-dimethyl-[1,3]-dioxolan-4-yl)-butan-1-oxy polyphosphazene (PZ3)

A similar procedure as described in (D1) was followed, using the Na or Li alkoxide salt of (2,2-dimethyl-[1,3]-dioxolan-4-yl)-butanol. The product was isolated as a pale yellow viscous liquid. Yield=ca. 60-90%.

$\nu_{max}$(neat)/cm$^{-1}$: 2986, 2939, 2868, 1379, 1370, 1283, 1245, 1164, 1087, 1063, 964, 852

$\delta_H$ (d$_6$-acetone): 1.26 ppm (s), 1.31 (s) ppm [H$_A$, H$_B$]; 1.35-1.80 (b,m) [H$_F$, H$_G$, H$_H$]; 3.45 (b,m) [H$_D$]; 3.95-4.20 (b,m) [H$_D$, H$_E$, H$_I$]; 4.55 (m) [CH$_2$CF$_3$]

$\delta_C$ (d$_6$-acetone):: 21.90 ppm (b) [C$_G$]; 25.14 (s), 26.46 (s) [C$_A$, C$_B$]; 30.10 (b) [C$_H$]; 33.24 (b) [C$_F$]; 63.30 (q, $^2$J$_{C-F}$=37 Hz) [CH$_2$CF$_3$]; ~67.0 [C$_J$]; 69.15 (s) [C$_D$]; 75.75 (s) [C$_E$]; 108.24 (s) [C$_C$]; 123.12 (q, $^1$J$_{C-F}$=277 Hz) [CH$_2$CF$_3$].

$\delta_P$ (d$_6$-acetone):: -7.20 ppm (b)

(D4) General Method for the Synthesis of Trifluoroethoxy/2-Pyranyloxy Ethoxy Polyphosphazene (PZ4)

A similar procedure as described in (D1) was followed, using the Na or Li alkoxide salt of 2-pyranyloxy ethanol. The product was isolated as a pale yellow viscous liquid. Yield=ca. 60-90%.

$\nu_{max}$(neat)/cm$^{-1}$: 2944, 2873, 1283, 1245, 1204, 1165, 1126, 1071, 1035, 988, 965, 872

$\delta_H$ (d$_6$-acetone): 1.50-1.80 ppm (bm) [H$_D$, H$_E$, H$_F$]; 3.46 (b), 3.66 (b), 3.87 (b), 4.21 (b) [H$_A$, H$_B$, H$_G$]; 4.51 (b) [CH$_2$CF$_3$]; 4.66 (b) [H$_C$].

$\delta_C$ (d$_6$-acetone): 19.42 ppm [C$_E$]; 25.46 [C$_F$]; 30.35 [C$_D$]; 61.50-67.00 [C$_A$, C$_B$, C$_G$]; 63.17 (q, $^2$J$_{C-F}$=36 Hz) [CH$_2$CF$_3$]; 98.55 [C$_C$]; 123.29 (q, $^1$J$_{C-F}$=275 Hz) [CH$_2$CF$_3$].

$\delta_P$ (d$_6$-acetone): -7.57 ppm, -6.59, -3.07 (vb), -1.03 (vb)

(D5) General Method for the Synthesis of Trifluoroethoxy/(3-methyl-oxetan-3-yl)-Methoxy Polyphosphazene (PZ5)

A similar procedure as described in (D1) was followed, using the Na alkoxide salt of (3-methyl-oxetan-3-yl)-methanol. The product was isolated as a pale yellow viscous liquid. Yield=ca. 60-90%.

$\delta_H$ (d$_6$-acetone): 1.31 ppm (s) [H$_D$]; 4.16 (s) [H$_E$]; 4.49 (m) [CH$_2$CF$_3$]; 4.29 & 4.51 (dd) [H$_A$, H$_B$].

$\delta_C$ (d$_6$-acetone): 20.9 ppm [C$_D$]; 40.5 [C$_C$]; 30.35 [C$_D$]; 63.7 [CH$_2$CF$_3$]; 72.3 [C$_E$]; 124.3 [CH$_2$CF$_3$].

$\delta_P$ (d$_6$-acetone): −6.30 & −7.40 ppm (D6) General Method for the Synthesis of 1H,1H-Perfluoropropan-1-oxy/(2,2-dimeth-[1,3]-dioxolan-4-yl)-ethoxy polyphosphazene (PZ6)

To a stirred suspension of the Na salt of (2,2-dimethyl-[1,3]-dioxolan-4-yl)-methanol (solketal) in THF (100 ml) was added a solution of poly(dichlorophosphazene) (1.19 g, 10.30 mmol) in THF (30 ml) under an inert gas atmosphere. The mixture was stirred at ambient temperature for 2 hours after which time, a solution of the Na salt of 1H,1H-perfluoropropanol (25.75 mmol) in THF (50 ml) was added. The mixture was then heated to reflux and stirred for a further 18 hours. Upon cooling to ambient temperature, the resulting NaCl by-product was removed via filtration and the resulting solution concentrated to ca. 20 ml. An excess of water (ca. 150 ml) was then added with stirring, followed by acidification (to ca. pH 5-6) using dilute HCl, resulting in precipitation of the polymeric product as a viscous oil. The aqueous layer was decanted and the polymer washed with further portions of water (3×50 ml). The product was then dried in vacuo for several hours at 50° C. before redissolving in a minimum quantity of acetone and precipitating into hexane (ca 100 ml). The hexane was decanted and the product dried in vacuo yielding a pale yellow, highly viscous, tacky liquid.

Recovered Yield=1.23 g, 43%

$\nu_{max}$(neat)/cm$^{-1}$: 2988, 1372, 1243, 1197, 1152, 1018, 933, 836, 723, 651, 619, 599

$\delta_H$ (d$_6$-acetone): 1.31 (s), 1.38 (s) ppm [H$_A$, H$_B$]; 3.83 (b), 4.07 (b), 4.36 (b) [H$_D$, H$_E$, H$_F$]; 4.56 (b) [CH$_2$CF$_3$].

$\delta_C$ (d$_6$-acetone): 24.73 ppm (s), 26.34 (s) [C$_A$, C$_B$]; 62.01 (m) [CH$_2$CF$_3$]; 66.14 (b) [C$_D$]; 67.22 [C$_F$]; 74.28 (s) [C$_E$]; 109.31 (s) [C$_C$]; 112-125 (m) [CH$_2$CF$_2$CF$_3$ region].

$\delta_P$ (d$_6$-acetone): −7.34 ppm (b)

(D7) General Method for the Synthesis of 1H,1H-Perfluoropentan-1-oxy/(2,2-dimethyl-[1,3]-dioxolan-4-yl)-ethoxy polyphosphazene (PZ7)

A similar procedure as described for (D6) was followed, using the Na salt of perfluoropentanol. The product was isolated as a pale yellow, highly viscous, tacky liquid.

$\delta_H$ (d$_6$-acetone): 1.29 (s), 1.36 (s) ppm [H$_A$, H$_B$]; 3.82 (b), 4.07 (b), 4.35 (b) [H$_D$, H$_E$, H$_F$]; 4.60 (b) [—OCH$_2$CF$_2$—].

$\delta_C$ (d$_6$-acetone): 24.49 ppm (s), 26.02 (s) [C$_A$, C$_B$]; 62.34 (m) [—OCH$_2$CF$_2$—]; 65.83 (b) [C$_D$]; 67.74 [C$_F$]; 74.09 (s) [C$_E$]; 109.46 (s) [C$_C$]; 103-125 (m) [—OCH$_2$CF$_2$CF$_2$CF$_3$ region].

$\delta_P$ (d$_6$-acetone): −6.87 ppm (b)

(D8) Poly[bis-(2-Pyranloxy ethoxy)phosphazene](PZ17)

A solution of poly(dichlorophosphazene) (2.0 g, 17.24 mmol) in THF (20 ml) was added to a stirred suspension of the Na salt of 2-pyranyloxy ethanol (51.72 mmol) in THF (20 ml). The mixture was heated to reflux for 18 hours. Upon cooling to ambient temperature, the THF was reduced and a concentrated solution/suspension of the crude product was added to water dropwise, with stirring. The aqueous mixture was then acidified (to ca. pH 5-6), resulting in precipitation of the polymeric product. The aqueous solution was decanted and the polymer redissolved in dichloromethane (ca 200 ml) (or dried in vacuo for several hours at 50° C.). The organic solution was then dried over anhydrous MgSO$_4$. After filtration and removal of solvent in vacuo, the product was dissolved in a minimum quantity of acetone and precipitated into hexane (ca 100 ml). The hexane was decanted and the product dried in vacuo (precipitation into hexane was repeated until the product was pure, as indicated by $^1$H NMR Spectroscopy). The polymeric product was isolated as a pale yellow, tacky, highly viscous liquid.

$\nu_{max}$(neat)/cm$^{-1}$: 2939, 2869, 1441, 1384, 1321, 1231, 1201, 1183, 1167, 1123, 1.029, 985, 958, 906, 870, 812, 760

$\delta_H$ (d$_6$-acetone): 1.50-1.90 ppm (bm) [H$_D$, H$_E$, H$_F$]; 3.49 (bm), 3.70 (bm), 3.88 (bm), 4.21 (b) [H$_A$, H$_B$, H$_G$]; 4.70 (b) [H$_C$].

$\delta_C$ (d$_6$-acetone): 19.37 ppm [C$_E$]; 25.59 [C$_F$]; 30.58 [C$_D$]; 61.34, 65.05, 66.55 [C$_A$, C$_B$, C$_G$]; 98.39 [C$_C$].

$\delta_P$ (d$_6$-acetone): −7.10 ppm (D9) Poly[bis-((2,2-dimethyl-[1,3]-dioxolan-4-yl)-methoxy)polyphosphazene](PZ18)

A similar procedure as described in (D8) was followed, using poly(dichlorophosphazene) and the sodium salt of (2,2-dimethyl-[1,3]-dioxolan-4-yl)-methanol. The product was isolated as a colourless, tacky, highly viscous liquid.

$\nu_{max}$ (neat)/cm$^{-1}$: 2985, 2937, 2885, 1456, 1370, 1211, 1157, 1018, 884, 834, 789, 647

$\delta_H$ (d$_6$-acetone): 1.31 (s), 1.40 (s) ppm [H$_A$, H$_B$]; 3.87 (m), 3.97 (m), 4.08 (m) [H$_D$, H$_E$, H$_F$]; 4.34 (m) [H$_D$].

$\delta_C$ (d$_6$-acetone): 25.04 ppm, 26.63 [C$_A$, C$_B$]; 66.57, 66.68 [C$_D$, C$_F$]; 74.48 [C$_E$]; 109.12 [C$_C$].

$\delta_P$ (d$_6$-acetone): −6.63 ppm (D10) Poly[bis-((2,2-dimethyl-[1,3]-dioxolan-4-yl)-ethoxy)polyphosphazene](PZ19)

A similar procedure as described in (D8) was followed, using poly(dichlorophosphazene) and the sodium salt of (2,2-dimethyl-[1,3]-dioxolan-4-yl)-ethanol. The product was isolated as a pale yellow, tacky, highly viscous liquid.

$\nu_{max}$ (neat)/cm$^{-1}$: 2984, 2937, 2873, 1368, 1227, 1159, 1035, 974, 916, 850, 795

$\delta_H$ (d$_6$-acetone): 1.33 ppm (s), 1.37 (s) ppm [H$_A$, H$_B$]; 1.98 (m) [H$_F$]; 3.61 (m) [H$_D$]; 4.15 (m), 4.24 (m) [H$_D$, H$_E$, H$_G$].

$\delta_C$ (d$_6$-acetone): 25.59 (s), 26.76 (s) [C$_A$, C$_B$]; 34.81 (b) [C$_F$]; 63.06 [C$_G$]; 69.48 (s) [C$_D$]; 73.50 (s) [C$_E$]; 108.25 (s) [C$_C$].

$\delta_P$ (d$_6$-acetone): −7.06 ppm (E) Synthesis of Energetic Polyphosphazenes (PZ8-14, 20-22)

(E1) General Method for the Synthesis of Trifluoroethoxy/2,3-Dinitratopropan-1-oxy Polyphosphazene (PZ8)

95% nitric acid (5 ml) was cooled, with stirring, to between 0-5° C. in an ice/water bath. Trifluoroethoxy/(2,2-di methyl-[1,3]-dioxolan-4-yl)-methoxy polyphosphazene (200 mg) was added (neat or dropwise as a solution in DCM) and the reaction mixture stirred for 15 minutes, maintaining the temperature below 5° C. The solution was then added dropwise, with stirring, to cooled, distilled water (~60 ml), yielding the nitrated product as a white, oily solid precipitate. Excess water (i.e. dilute acid) was decanted, the precipitate washed with several aliquots of distilled water and dried in vacuo at 50° C. for 2-3 hours. The pure product was isolated as a pale yellow viscous liquid. Yield=ca. 80-90%.

$\nu_{max}$ (neat)/cm$^{-1}$: 2966, 2910, 1647 (NO$_2$ asym. stretch), 1273, 1174, 1086, 1005, 964, 843 (O—N stretch), 752, 703, 561

$\delta_H$ (d$_6$-acetone): 4.55 ppm (b,m) [CH$_2$CF$_3$]; 4.91 (b), 5.10 (b) [H$_A$, H$_C$]; 5.77 (b) [H$_B$].

$\delta_C$ (d$_6$-acetone): 63.29 ppm (q, $^2J_{C-F}$=37 Hz) [CH$_2$CF$_3$]; 69.20 (b) [C$_C$]; 71.28 (b) [C$_A$]; 77.72 (b) [C$_B$]; 123.11 (q, $^1J_{C-F}$=277 Hz) [CH$_2$CF$_3$].

$\delta_P$ (d$_6$-acetone): −6.35 ppm (b)

(E2) General Method for the Synthesis of Trifluoroethoxy/3,4-Dinitratobutan-1-oxy Polyphosphazene (PZ9)

A similar procedure as described for (E1) was followed, using Trifluoroethoxy/(2,2-dimethyl-[1,3]-dioxolan-4-yl)-ethoxy polyphosphazene. The pure product was isolated as a pale yellow viscous liquid. Yield=ca. 80-90%.

$\nu_{max}$(neat)/cm$^{-1}$: 2968, 2916, 1652 (NO$_2$ asym. stretch), 1420, 1275, 1171, 1083, 963, 845 (O—N stretch)

$\delta_H$ (d$_6$-acetone): 2.26 ppm (b) [H$_C$]; 4.30 (b,m) [H$_D$]; 4.55 (m) [CH$_2$CF$_3$]; 4.76 (b,m), 5.04 (b,m) [H$_A$, H$_{A'}$]; 5.64 (b,m) [H$_B$].

$\delta_C$ (d$_6$-acetone): 63.29 ppm (q, $^2J_{C-F}$=37 Hz) [CH$_2$CF$_3$]; 71.68 (b) [C$_A$]; 76.93 (b) [C$_B$]; 123.25 (q, $^1J_{C-F}$=277 Hz) [CH$_2$CF$_3$]; [C$_C$ and C$_D$ resonances thought to be obscured by d-acetone and CH$_2$CF$_3$ respectively]

$\delta_P$ (d$_6$-acetone): −7.10 ppm (b)

(E3) General Method for the Synthesis of Trifluoroethoxy/5,6-Dinitratohexan-1-oxy Polyphosphazene (PZ10)

A similar procedure as described for (E1) was followed, using Trifluoroethoxy/(2,2-dimethyl-[1,3]-dioxolan-4-yl)-butan-1-oxy polyphosphazene. The pure product was isolated as a pale yellow viscous liquid. Yield=ca. 80-90%.

$\nu_{max}$(neat)/cm$^{-1}$: 2960, 2901, 2876, 1638 (NO$_2$ asym. stretch), 1286, 1272, 1169, 1082, 1061, 1036, 1006, 965, 853, 754, 696

$\delta_H$ (d$_6$-acetone): 1.50-1.95 ppm (b,m) [H$_C$, H$_D$, H$_E$]; 4.13 (b,m) [H$_F$]; 4.55 (m) [CH$_2$CF$_3$]; 4.70 (b,m), 4.98 (b,m) [H$_A$, H$_{A'}$]; 5.48 (b,m) [H$_B$].

$\delta_C$ (d$_6$-acetone): 21.16 ppm (s) [C$_D$]; 28.52 (obscured by d-acetone) [C$_E$]; ~29.7 (obscured by d-acetone) [C$_C$]; 63.25 (q, $^2J_{C-F}$=33 Hz) [CH$_2$CF$_3$]; 66.78 (b) [C$_F$]; 71.86 (s) [C$_A$]; 80.05 (s) [C$_B$]; 123.17 (q, $^1J_{C-F}$=273 Hz) [CH$_2$CF$_3$].

$\delta_P$ (d$_6$-acetone): −7.23 ppm (b)

(E4) General Method for the Synthesis of Trifluoroethoxy/2-Nitratoethoxy polyphosphazene (PZ11)

A similar procedure as described for (E1) was followed, using trifluoroethoxy/2-pyranyloxy ethoxy polyphosphazene. The pure product was isolated as a pale yellow viscous liquid. Yield=ca. 80-90%.

$\nu_{max}$ (neat)/cm$^{-1}$: 2965, 2904, 1638, 1423, 1373, 1282, 1172, 1073, 965, 904, 853, 758, 705, 654

$\delta_H$ (d$_6$-acetone): 4.46 ppm (b), 4.84 (b) [H$_A$, H$_B$]; 4.50 (b) [CH$_2$CF$_3$]

$\delta_C$ (d$_6$-acetone): ~63.2 ppm (b, obscured) [C$_A$]; 63.24 (q, $^2J_{C-F}$=36 Hz) [CH$_2$CF$_3$]; 71.89 [C$_B$]; 123.23 (q, $^1J_{C-F}$=278 Hz) [CH$_2$CF$_3$].

$\delta_P$ (d$_6$-acetone): −7.25 ppm, −6.70, −3.07 (vb), ca. −2.0 (vb)

(E5) General Method for the Synthesis of Trifluoroethoxy/2-methyl-3-nitrooxy-2-nitrooxymethyl-propan-1-oxypolyphosphazene (PZ12)

A similar procedure as described for (E1) was followed, using Trifluoroethoxy/(3-methyl-oxetan-3-yl)-methoxy polyphosphazene. The pure product was isolated as a pale yellow viscous liquid. Yield=ca. 80-90%.

$\nu_{max}$(neat)/cm$^{-1}$: 1644, 1280, 1251, 1173, 1084, 965, 863

$\delta_H$(d$_6$-acetone): 1.06 ppm (s) [H$_D$]; 4.17 (s) [H$_C$]; 4.53 (m) [CH$_2$CF$_3$]; 4.61 (dd) [H$_A$].

$\delta_C$ (d$_6$-acetone): 16.9 ppm [C$_D$]; 40.0 [C$_B$]; 63.7 [CH$_2$CF$_3$]; 69.3 [C$_C$]; 74.4 [C$_A$]; 124.3 [CH$_2$CF$_3$].

$\delta_P$ (d$_6$-acetone): −6.50 & −6.90 ppm (E6) General Method for the Synthesis of 1H,1H-Perfluoropropan-1-oxy/2,3-Dinitratopropan-1-oxy Polyphosphazene (PZ13)

A similar procedure as described for (E1) was followed, using 1H,1H-Perfluorpropan-1-oxy/(2,2-dimethyl-[1,3]-dioxolan-4-yl)-ethoxy polyphosphazene. The pure product was isolated as a pale yellow viscous liquid.

Yield=ca. 80-90%

$\nu_{max}$(neat)/cm$^{-1}$: 2963, 1638, 1198, 1161, 1059, 1022, 899, 826, 750, 701, 619

$\delta_H$ (d$_6$-acetone): 4.53 ppm (b,m) [CH$_2$CF$_3$]; 4.89 (b), 5.07 (b) [H$_A$, H$_C$]; 5.76 (b) [H$_B$]

$\delta_C$ (d$_6$-acetone): 62.21 ppm (m) [CH$_2$CF$_3$]; 64.16 (b) [C$_A$]; 69.20 (b) [C$_C$]; 77.59 (b)[C$_B$]; 108-125 (m) [CF$_2$CF$_3$].

$\delta_P$ (d$_6$-acetone): −7.81 ppm (b)

(E7) General Method for the Synthesis of 1H,1H-Perfluoropentan-1-oxy/2,3-Dinitratopropan-1-oxy Polyphosphazene (PZ14)

A similar procedure as described for (E1) was followed, using 1H-1H-Perfluorpentan-1-oxy/(2,2-dimethyl-[1,3]-dioxolan-4-yl)-ethoxy polyphosphazene. The pure product was isolated as a pale yellow viscous liquid.

Yield=ca. 80-90%

$\nu_{max}$(neat)/cm$^{-1}$: 2967, 1650, 1270, 1225, 1134, 1082, 1025, 977, 957, 881, 835, 750, 736, 642

$\delta_H$ (d$_6$-acetone): 4.60 ppm (b,m) [CH$_2$CF$_3$]; 4.87 (b), 5.06 (b) [H$_A$, H$_C$]; 5.75 (b) [H$_B$].

$\delta_C$ (d$_6$-acetone): 62.60 ppm (m) [CH$_2$CF$_3$]; 64.22 (b) [C$_C$]; 69.40 (b) [C$_A$]; 77.68 (b) [C$_B$]; 103-125 (m) [—OCH$_2$CF$_2$CF$_2$CF$_2$CF$_3$ region].

$\delta_P$ (d$_6$-acetone): −7.13 ppm (b)

(E8) Poly[bis-(2-nitratoethoxy-phosphazene](PZ20)

A similar procedure as described for (E1) was followed, using poly[bis-(2-Pyranyloxy ethoxy)phosphazene]. The pure product was isolated as a pale yellow, tacky viscous liquid.

Yield=ca. 80-90%

$\nu_{max}$ (neat)/cm$^{-1}$: 2960, 1621, 1453, 1426, 1371, 1273, 1119, 1059, 958, 897, 843, 800, 754, 704, 650

$\delta_H$ (d$_6$-acetone): 4.43 ppm (b), 4.85 (b) [H$_A$, H$_B$]

$\delta_C$ (d$_6$-acetone): 62.74 ppm [C$_A$]; 72.53 [C$_B$]

$\delta_P$ (d$_6$-acetone): −6.55 ppm

(E9) Poly[bis-(2,3-Dinitratopropan-1-oxy)phosphazene](PZ21)

A similar procedure as described for (E1) was followed, using poly[bis-((2,2-dimethyl-[1,3]-dioxolan-4-yl)-methoxy)polyphosphazene]. The pure product was isolated as a pale yellow, tacky viscous liquid.

Yield=ca. 80-90%

$v_{max}$(neat)/cm$^{-1}$: 2908, 1629, 156, 1427, 1267, 1045, 993, 899, 826, 749, 699, 633

$\delta_H$ (d$_6$-acetone): 4.54 (b), 4.90 (bm), 5.10 (m) [H$_A$, H$_C$]; 5.78 (b) [H$_B$]

$\delta_C$ (d$_6$-acetone): 63.90 (b) [C$_C$]; 69.30 (b) [C$_A$]; 77.79 (b) [C$_B$].

$\delta_P$ (d$_6$-acetone): −6.35 ppm (b)

(E10) Poly[bis-(3,4-Dinitratobutan-1-oxy)phosphazene](PZ22)

A similar procedure as described for (E1) was followed, using poly[bis-((2,2-dimethyl-[1,3]-dioxolan-4-yl)-ethoxy)polyphosphazene]. The pure product was isolated as a colourless, tacky viscous liquid.

Yield=ca. 80-90%

$v_{max}$(neat)/cm$^{-1}$: 2905, 1627, 1428, 1267, 1041, 977, 832, 750, 692, 635

$\delta_H$ (d$_6$-acetone): 2.31 ppm (b) [H$_C$]; 4.25 (b) [H$_D$]; 4.76 (m), 5.07 (m) [H$_A$, H$_{A'}$]; 5.68 (b) [H$_B$].

$\delta_C$ (d$_6$-acetone): 62.09 (s) [C$_D$]; 71.89 (s) [C$_A$]; 77.28 (s) [C$_B$]; [C$_C$ resonance likely to be obscured by d$_6$-acetone]

$\delta_P$ (d$_6$-acetone): −8.41 ppm

Azide Functionalised Polyphosphazenes

(F) Synthesis of Precursors

(F1) Synthesis of 6-Azidohexan-1-ol (Method 1)

To a stirred solution of 1-chloro-6-hydroxyhexane (0.20 g, 1.47 mmol) in anhydrous DMF (5 ml), was added sodium azide (0.14 g, 2.15 mmol) as a suspension and 15-crown-5 (2 drops via pipette), under an inert gas atmosphere. The reaction mixture was heated to 110° C. for 2 hours. After cooling to ambient temperature, water (10 ml) was added, resulting in a pale yellow solution. This was extracted with ethyl acetate (2×25 ml), followed by extraction of the combined ethyl acetate washings with saturated, aqueous sodium chloride solution (2×25 ml) and water (2×25 ml). The organic layer was then dried over anhydrous MgSO$_4$, filtered and solvent removed in vacuo, yielding the product as a colourless liquid.
Yield=0.16 g, 76%.

(Method 2)

Sodium azide and sodium iodide were added to a stirred solution of 1-chloro-6-hydroxyhexane in DMSO. A similar procedure to Method 1 was then followed.

Yield=0.18 g, 86%.

$v_{max}$(neat)/cm$^{-1}$: 3337, 2936, 2862, 2097, 1459, 1350, 1285, 1261, 1056

$\delta_H$(CDCl$_3$): 1.20-1.40 ppm (2H, m) & 1.40-1.60 (4H, m) [H$_2$, H$_3$, H$_4$, H$_5$]; 2.39 (1H, bs) [OH]; 3.21 (2H, m) [H$_6$]; 3.55 (2H, m) [H$_1$].

$\delta_C$ (CDCl$_3$): 25.37 ppm & 26.56 [C$_3$, C$_4$]; 28.83 [C$_2$]; 32.53 [C$_5$]; 51.41 [C$_1$]; 62.56 [C$_6$].

(F2) Synthesis of 3-Azido-propan-1-ol

A similar procedure as described for F1 was followed, using 1-chloro-3-hydroxypropane. The product was isolated as a pale yellow liquid.

$v_{max}$ (neat)/cm$^{-1}$: 3334, 2944, 2881, 2089, 1662, 1455, 1343, 1257, 1045, 955, 901

$\delta_H$ (d$_6$-acetone): 1.75 ppm (p) [H$_2$]; 3.42 (t) [H$_3$]; 3.62 (m), 3.77 (m) [OH, H$_1$].

$\delta_C$ (d$_6$-acetone): 31.80 ppm [C$_2$]; 48.16 [C$_3$]; 54.46 [C$_1$].

(F3) Synthesis of 5,6-Diazido-hexan-1-ol (i) Hex-5-enyl-1-acetate

To an anhydrous solution of hex-5-en-1-ol (15.0 g, 0.15 mol) in dichloromethane (250 ml) was added acetyl chloride (11.3 ml, 0.20 mol). Triethylamine (20.8 ml, 0.15 ml) was then added and the reaction mixture was stirred at room temperature (18 h) followed by the addition of water (50 ml). The organic layer was separated, the aqueous layer extracted with dichloromethane (2×50 ml) and the combined organic extracts were washed with saturated brine solution (3×100 ml). The organic layer was finally washed with water (3×100 ml) and dried over anhydrous magnesium sulphate. On removal of the drying agent by filtration under gravity, the solvent was removed in vacuo to afford hex-5-enyl-1-acetate as a colourless oil, in near quantitative yield (21.0 g, 99%).

$\delta_H$ (CDCl$_3$): 1.32 (2H, m) [H$_3$]; 1.53 (2H, m) [H$_4$]; 1.94-1.97 (5H, m) [CH$_3$C=O, H$_2$], 3.94 (2H, t, J=6.4 Hz) [H$_1$]; 4.88 (2H, m) [H$_6$]; 5.68 (1H, m) [H$_5$].

$\delta_C$ (CDCl$_3$): 20.89 [CH$_3$C=O]; 25.17 [C$_3$]; 28.02 [C$_4$]; 33.28 [C$_2$]; 64.31 [C$_1$]; 114.78 [C$_6$]; 138.25 [C$_5$]; 171.01 [C=O].

(ii) 5-Oxiranyl-hexyl-1-acetate

To an anhydrous solution of hex-5-enyl-1-acetate (8.00 g, 56.3 mmol) in dichloromethane (250 ml) was added m-chloroperoxybenzoic acid (14.9 g, 56.3 mmol, 75 wt. % in water) at 0° C. The reaction mixture was then stirred at room temperature, in air (18 h), followed by the cautious addition of saturated sodium hydrogen carbonate solution (100 ml). Once the insoluble precipitate had dissolved the organic layer was separated. The aqueous layer was then extracted with dichloromethane (2×50 ml) and the combined organic extracts were washed with saturated sodium hydrogen carbonate solution (3×100 ml). The organic layer was then washed with saturated brine solution (3×100 ml), water (3×100 ml) and finally dried over anhydrous magnesium sulfate. On removal of the drying agent by filtration under gravity, the solvent was removed in vacuo to afford 5-oxiranyl-hexyl-1-acetate as a colourless oil in near quantitative yield (8.60 g, 97%).

$\delta_H$ (CDCl$_3$): 1.46-1.60 (6H, m) [H$_4$, H$_3$, H$_2$]; 2.01 (3H) [CO$_2$Me]; 2.40 (1H, m) [HH6]; 2.73 (1H, m) [HH$_6$]; 2.87 (1H, m) [H$_5$]; 4.03 (2H, t, J 6.4 Hz) [H$_1$].

$\delta_C$ (CDCl$_3$): 21.04 CH$_3$C=O]; 22.55 [C$_3$]; 28.42 [C$_4$]; 32.10 [C$_2$]; 47.13 [C$_6$]; 52.27 [C$_5$]; 64.34 [C$_1$]; 171.43 [C=O].

(iii) 5,6-Dihydroxy-hexyl-1-acetate

To a solution of 5-oxiranyl-hexyl-1-acetate (8.00 g, 50.6 mmol), in aqueous ether (100 ml, 1:1 v/v), was added concentrated hydrochloric acid (5.00 ml). The reaction mixture was stirred at room temperature, in air (3 h), followed by the cautious addition of saturated sodium hydrogen carbonate solution (100 ml) and the organic layer separated. The aqueous layer was then extracted with dichloromethane (2×50 ml) and the combined organic extracts were washed with saturated hydrogen carbonate solution (3×50 ml). The organic layer was then washed with saturated brine solution (3×100 ml), water (3×50 ml) and finally dried over anhydrous magnesium sulfate. On removal of the drying agent, the solvent was removed in vacuo to afford the 5,6-dihydroxy-hexyl-1-acetate as a pale yellow oil in near quantitative yield (8.90 g, 99+%).

$\delta_H$ (CDCl$_3$): 1.50-1.54 (6H, m) [H$_2$, H$_3$, H$_4$]; 2.02 (3H, s) [CO$_2$Me]; 3.45 (1H, m) [HH$_6$]; 3.58 (1H, m) [HH$_6$]; 3.78 (1H, m) [H$_5$]; 4.06 (2H, J 6.4 Hz) [H$_1$]; 5.71 (2H, bs) [OH].

$\delta_C$ (CDCl$_3$): 21.08 [CH$_3$C═O]; 22.10 [C$_3$]; 28.51 [C$_4$]; 33.78 [C$_2$]; 50.36 [C$_6$]; 64.39 [C$_1$]; 71.36 [C$_5$]; 171.20 [C═O].

(iv) 5,6-Dimethanesulfonyloxy-hexyl-1-acetate

To a solution of 5,6-dihydroxy-hexyl-1-acetate (1.00 g, 5.68 mmol) in anhydrous dichloromethane (10 ml) was added methanesulfonyl chloride (1.94 ml, 25.0 mmol). The reaction mixture was cooled to 0° C., triethylamine (2.77 ml, 20.0 mmol) was then cautiously added dropwise and the reaction mixture was allowed to warm to room temperature with stirring (18 h). Upon the addition of water (10 ml), the organic layer was separated and the aqueous layer was extracted with dichloromethane (2×10 ml). The combined organic extracts were washed with saturated hydrogen carbonate solution (3×10 ml). The organic layer was then washed with saturated brine solution (3×10 ml) and water (3×10 ml) and finally dried over anhydrous magnesium sulfate. On removal of the drying agent, the solvent was removed in vacuo to afford 5,6-dimethanesulfonyloxy-hexyl-1-acetate as a yellow oil (1.79 g, 95%).

$\delta_H$ (CDCl$_3$): 1.61 (6H, m) [H$_2$, H$_3$, H$_4$]; 1.97, (3H, s) [CO$_2$Me]; 3.64-3.67 (6H, 2xs) [SO$_2$Me]; 3.99-4.01 (3H, m) [H$_1$, HH$_6$]; 4.05 (1H, m) [HH$_6$]; 4.78 (1H, m) [H$_5$].

$\delta_C$ (CDCl$_3$): 21.07 CH$_3$C═O]; 21.39 [C$_3$]; 28.04 [C$_4$]; 32.23 [C$_2$]; 45.60 [2×SO$_2$Me]; 52.69 [C$_6$]; 63.95 [C$_1$]; 81.04 [C$_5$]; 171.24 [C═O].

(v) 5,6-Diazido-hexyl-1-acetate

To a solution of 5,6-dimethanesulfonyloxy-hexyl-1-acetate (0.25 g, 0.75 mmol) in anhydrous dimethylformamide (10 ml) was added sodium azide (0.17 g, 2.5 mmol). The reaction mixture was then stirred and heated to 90° C. (18 h). On cooling, water was added to the reaction mixture and the crude product extracted into ethyl acetate (3×10 ml). The combined organic extracts were washed with saturated brine solution (4×50 ml), water (3×25 ml) and finally dried over anhydrous magnesium sulfate. On removal of the drying agent, the solvent was removed in vacuo to afford 5,6-diazido-hexyl-1-acetate as an orange oil, in near quantitative yield (0.16 g, 94%).

$v_{max}$ (neat)/cm$^{-1}$: 1245 (w), 1736 (m, C═O), 2102 (s, N$_3$).

$\delta_H$ (CDCl$_3$): 1.51-1.53 (H, m) [H$_2$, H$_3$, H$_4$]; 1.99 (3H, s) [CO$_2$Me]; 3.31 (2H, m) [H$_6$]; 3.40 (1H, m) [H$_5$]; 4.02 (2H, t, J 6.4 Hz) [H$_1$].

$\delta_C$ (CDCl$_3$): 21.04 [CH$_3$C═O]; 22.53 [C$_3$]; 28.36 [C$_4$]; 31.47 [C$_2$]; 54.86 [C$_6$]; 61.93 [C$_5$]; 64.02 [C$_1$]; 171.17 [C═O].

(vi) 5,6-Diazido-hexan-1-ol

To a solution of 5,6-diazido-hexyl-1-acetate (0.16 g, 0.70 mmol) in methanol (10 ml) was added potassium carbonate (0.83 g, 6.00 mmol). The reaction mixture was stirred at room temperature, in air (18 h), followed by the addition of water (20 ml). The crude product was then extracted into ethyl acetate (3×10 ml). The combined organic extracts were washed with saturated brine solution (3×10 ml) and water (3×10 ml) and finally dried over anhydrous magnesium sulfate. On removal of the drying agent, the solvent was removed in vacuo to afford 5,6-diazido-hexan-1-ol as a orange oil, in near quantitative yield (0.12 g, 99%).

$v_{max}$ (neat)/cm$^{-1}$:
$\delta_H$ (CDCl$_3$): 1.44 (6H, m) [H$_2$, H$_3$, H$_4$]; 2.40 (1H, bs) [OH]; 3.27 (2H, m) [H$_6$]; 3.34 (1H, m) [H$_5$]; 3.58 (2H, t, J 5.9 Hz) [H$_1$].

$\delta_C$ (CDCl$_3$): 20.35 [C$_3$]; 31.63 and 32.29 [C$_4$, C$_2$]; 54.87 [C$_6$]; 62.09 [C$_5$]; 62.47 [C$_1$].

(G) Synthesis of Energetic Polymers (PZ15, 16, 23, 24)

(G1) General method for the synthesis of Trifluoroethoxy/6-Azidohexan-1-oxy Polyphosphazene (PZ15)

Poly[(bis-trifluoroethoxy)phosphazene] (1 g, 4.12 mmol as a solution in THF, ca. 10 ml) was added to a stirred suspension of sodium 6-azidohexan-1-oxide in anhydrous THF [prepared via reaction of alcohol with equimolar amount of NaH in a similar fashion as described in Method C; quantitative conversion] and the reaction mixture heated to reflux for 18 hours, under an inert gas atmosphere. Upon cooling to ambient temperature, the THF was reduced and a concentrated solution/suspension of the crude product was added to water dropwise, with stirring. The aqueous mixture was then acidified using HCl (to pH 5-6), resulting in precipitation of all the polymeric product. The aqueous solution was decanted and the polymer washed with water, before redissolving in THF (or acetone) and repeating the precipitation process. The polymer was then dissolved in dichloromethane and dried over anhydrous MgSO$_4$. After filtration and removal of solvent in vacuo, the product was dissolved in a minimum quantity of acetone and precipitated into hexane. The hexane was decanted and the product dried in vacuo (precipitation into hexane was repeated until the product was pure, via $^1$H NMR). The polymeric product was isolated as a pale yellow viscous liquid.

Yield=ca. 60-90%

(Alternately one may follow the work up procedure as detailed in method D1).

$v_{max}$ (neat)/cm$^{-1}$: 2941, 2865, 2099 (N$_3$ stretch), 1457, 1419, 1284, 1169, 1092, 1057, 964, 870, 557

$\delta_H$ (d$_6$-acetone): 1.46 (b), 1.64 (b) [H$_2$, H$_3$, H$_4$, H$_5$]; 3.35 (b) [H$_6$]; 4.04 (b) [H$_1$]; 4.46 (b) [OCH$_2$CF$_3$].

$\delta_C$ (d$_6$-acetone): 25.21 (b) & 26.37 (b) [C$_3$, C$_4$]; 30.01 (b) [C$_2$]; 51.16 (s) [C$_6$]; 62.90 (b) [OCH$_2$CF$_3$]; 67.11 (b) [C$_1$]; 123.66 (bq, $^1J_{C-F}$=278 Hz) [OCH$_2$CF$_3$]. [C$_5$ resonance obscured by d$_6$-acetone signal]

$\delta_P$ (d$_6$-acetone): ca. −7.0 (very broad)

(G2) Synthesis of Trifluoroethoxy/5,6-Diazidohexan-1-oxy Polyphosphazene (PZ16)

A similar procedure as described for (G1) was followed, using poly[(bis-trifluoroethoxy)phosphazene] and sodium 5,6-diazidohexan-1-oxide.

Yield=ca. 60-90%

$v_{max}$(neat)/cm$^{-1}$: 2950, 2095 (N$_3$ stretch), 1418, 1241, 1160, 1078, 961, 866, 655, 623

$\delta_H$ (d$_6$-acetone): 1.58 (b), 1.72 (b) [H$_2$, H$_3$, H$_4$]; 3.43-3.61 (bm) [H$_5$, H$_6$]; 4.09 (b) [H$_1$]; 4.49 (b) [OCH$_2$CF$_3$].

$\delta_C$ (d$_6$-acetone): 22.13 (b) [C$_3$]; 30.01 (b) [C$_2$ or C$_4$]; 54.66 (s) [C$_6$]; 62.05 (s) [C$_5$]; 62.82 (bm) [OCH$_2$CF$_3$]; ca. 66.50 (b) [C$_1$]; 123.47 (bq, $^1J_{C-F}$=278 Hz) [OCH$_2$CF$_3$][remaining resonance (C$_B$ or C$_D$) obscured by d$_6$-acetone signal]

$\delta_P$ (d$_6$-acetone): ca. −7.0 (very broad)

(G3) Poly[bis-(3-Azidopropan-1-oxy)phosphazene (PZ23)

A solution of poly(dichlorophosphazene) (2.0 g, 17.24 mmol) in THF (20 ml) was added to a stirred suspension of the Na salt of 3-azidopropan-1-ol (51.72 mmol) in THF (50 ml). The mixture was heated to reflux for 18 hours. Upon cooling to ambient temperature, the THF was reduced and a concentrated solution/suspension of the crude product was added to water dropwise, with stirring. The aqueous mixture was then acidified (to ca. pH 5-6), resulting in precipitation of the polymeric product. The aqueous solution was decanted and the polymer redissolved in dichloromethane (ca 200 ml). The organic solution was then dried over anhydrous MgSO$_4$. After filtration and removal of solvent in vacuo, the product was dissolved in a minimum quantity of acetone and precipitated into hexane (ca 100 ml). The hexane was decanted and the product dried in vacuo (precipitation into hexane was repeated until the product was pure, as indicated by $^1$H NMR Spectroscopy). Recovered Yield=3.17 g, 75%

$\nu_{max}$(neat)/cm$^{-1}$: 2955, 2089, 1456, 1235, 1034, 977, 909, 836, 749

$\delta_H$ (d$_6$-acetone): 1.96 (b), [H$_2$]; 3.52 (b) [H$_3$]; 4.12 (b) [H$_1$]
$\delta_C$ (d$_6$-acetone): 29.80 ppm [C$_2$]; 48.12 [C$_3$]; 62.98 [C$_1$]
$\delta_P$ (d$_6$-acetone): −1.46 (bm), −6.68 (s)

(G4) Poly[bis-(6-Azidohexan-1-oxy)phosphazene](PZ24)

A similar procedure as described for (G3) was followed, using the Na salt of 6-azidohexanol. The product was isolated as pale yellow viscous liquid. The polymeric product was isolated as a pale yellow, tacky, highly viscous liquid.

Recovered yield=4.47 g, 79%

$\nu_{max}$ (neat)/cm$^{-1}$: 2934, 2859, 2088, 1455, 1238, 991, 865, 726, 665

$\delta_H$ (d$_6$-acetone): 1.48 (bm), 1.65 (bm) [H$_2$, H$_3$, H$_4$, H$_5$]; 3.37 (bm) [H$_6$]; 4.02 (b) [H$_1$].

$\delta_C$ (d$_6$-acetone): 25.76 (b) & 26.74 (b) [C$_3$, C$_4$]; 30.66 (b) [C$_2$]; 51.30 (s) [C$_6$]; 65.41 (b) [C$_1$]

[C$_5$ resonance obscured by d$_6$-acetone signal].

$\delta_P$ (d$_6$-acetone): −7.36 (s)

EXAMPLE 2

Variation of Side-Group Stoichiometry

The extent of substitution of the alkoxide (and hence final loading of nitrate ester groups along the backbone) was varied by modification of the reaction conditions. This is illustrated in the following examples. The extent of energetic side group precursor substitution was determined by integration of $^1$H NMR spectroscopy signals. The degree of substitution is assumed not to change during nitration, thus, the values quoted will apply also to their nitrated derivatives.

Nitrate Ester Polymer Precursors (PZ1-PZ5)-Synthesised Via poly[(bis-trifluoroethoxy)phosphazene]

The extent of nitrate ester substitution may be increased by either of the following: (1) increasing the ratio of substitutable alkoxide to poly[(bis-trifluoroethoxy)phosphazene], or (2) increasing the length of the reaction time and (3) using a sodium aloxide salt as opposed to a lithium salt. Table 2 below indicates the effect of these variables on energetic side group precursor substitution

TABLE 2

Effect of alkoxide to polymer ratio, alkoxide cation and reaction time on percentage energetic precursor side groups for nitrate ester polymer precursors PZ1-PZ5.

| Sample | % Energetic precursor side-groups | Alkoxide:Polymer ratio | Li/Na salt | Reaction time |
|---|---|---|---|---|
| PZ1 | 16 | 2:1 | Li | 18 hr reflux |
| PZ1 | 36 | 1:1 | Na | 1 hr 15 min reflux |
| PZ1 | 46 | 1:1 | Na | 3 hr 45 min reflux |
| PZ1 | 62 | 2.2:1 | Na | 18 hr reflux |
| PZ1 | 72 | 2.2:1 | Na | 23 hr reflux |
| PZ2 | 6 | 0.5:1 | Li | 18 hr reflux |
| PZ2 | 17 | 1:1 | Li | 18 hr reflux |
| PZ2 | 22 | 3:1 | Li | 18 hr reflux |
| PZ2 | 28 | 5:1 | Li | 18 hr reflux |
| PZ2 | 52 | 2.2:1 | Na | 18 hr reflux |
| PZ2 | 68 | 5:1 | Na | 18 hr reflux |
| PZ3 | 9 | 0.5:1 | Li | 18 hr reflux |
| PZ3 | 24 | 1:1 | Li | 18 hr reflux |
| PZ3 | 41 | 5:1 | Li | 18 hr reflux |
| PZ3 | 51 | 3:1 | Na | 6 hr reflux |
| PZ3 | 77 | 5:1 | Na | 18 hr reflux |
| PZ4 | 11 | 3:1 | Na | 4 hr reflux |
| PZ4 | 26 | 3.3:1 | Li | 18 hr reflux |
| PZ4 | 72 | 5.5:1 | Na | 18 hr reflux |
| PZ5 | 16 | 0.4:1 | Na | 18 hr reflux |
| PZ5 | 22 | 0.5:1 | Na | 18 hr reflux |
| PZ5 | 48 | 0.8:1 | Na | 18 hr reflux |
| PZ5 | 52 | 1.2:1 | Na | 18 hr reflux |
| PZ5 | 72 | 2:1 | Na | 18 hr reflux |

Nitrate Ester Polymer Precursors (PZ6-PZ7)-Synthesised Via poly(dichlorophosphazene)

The extent of nitrate ester substitution may be increased by either of the following: (1) increasing the ratio of substitutable alkoxide to poly(dichlorophosphazene) in Step 1 (see Table 3), (2) increasing the length of reaction time for Step 1 and (3) increasing the temperature of reaction of Step 1. It is intuitive that changing the alkali metal cation associated with the alkoxide in Step 1 will also affect the degree of substitution.

TABLE 3

Effect of alkoxide to polymer ratio, alkoxide cation and reaction time on percentage energetic precursor side groups for nitrate ester polymer precursors PZ6-PZ7.

| Sample | % Energetic precursor side-groups | Step 1* (alkoxide:polymer ratio) | Step 2+ (alkoxide:polymer ratio) |
|---|---|---|---|
| PZ6 | 65 | 1.5:1 (3 hrs, reflux) | 2:1 (18 hrs, reflux) |
| PZ7 | 28 | 1:1 (2 hrs, ambient) | 2.5:1 (18 hrs, reflux) |

*alkoxide = Na salt of (2,2-dimethyl-[1,3]-dioxolan-4-yl)-methanol
+alkoxide = Na salt of 1H,1H-perfluoroalcohol Azide Polymers (PZ15-PZ16)

The extent of substitution of azide functionalised side groups onto the polymer backbone can be increased by increasing the ratio of substitutable alkoxide to polymer (this is indicated in Table 4). The skilled man will appreciate that the degree of substitution can also be modified according to the reaction time, temperature and nature of cation. The extent of energetic side group substitution was determined by integration of $^1$H NMR signals.

TABLE 4

Effect of alkoxide to polymer ratio on percentage energetic side groups for the azide substituted polymers.

| Sample polymer | Reactant ratio* (Na alkoxide:polymer) | % Trifluoroethoxy side-groups | % Energetic side groups |
|---|---|---|---|
| PZ15 (1a) | 1:1 | 71 | 29 |
| PZ15 (1b) | 2:1 | 54 | 46 |
| PZ15 (1c) | 5:1 | 45 | 55 |
| PZ15 (1d) | 1c + 2:1 | 35 | 65 |
| PZ16 (2a) | 1:1 | 80 | 20 |
| PZ16 (2b) | 2a + 1:1 | 74 | 26 |
| PZ16 (2c) | 2a + 2:1 | 71 | 29 |
| PZ16 (2d) | 4.5:1 | 56 | 44 |

*All reactions stirred under reflux for 18 hrs. + indicates the use of a two stage reaction to ensure the reaction goes to completion.

EXAMPLE 3

Variation of Physical Properties

Physical properties associated with polyphosphazenes of Formula A and Formula B can be modified by varying one or more of the following: (a) the degree of substitution of energetic side-groups (b) the length of the carbon chain of the energetic side-group, (c) the type of energetic functionality incorporated into the energetic side-group and (d) the number of energetic functional groups attached to the energetic side-group and (e) modification of the fluoroalkoxy/fluoroalkoxy ether side groups.

Figure 28:
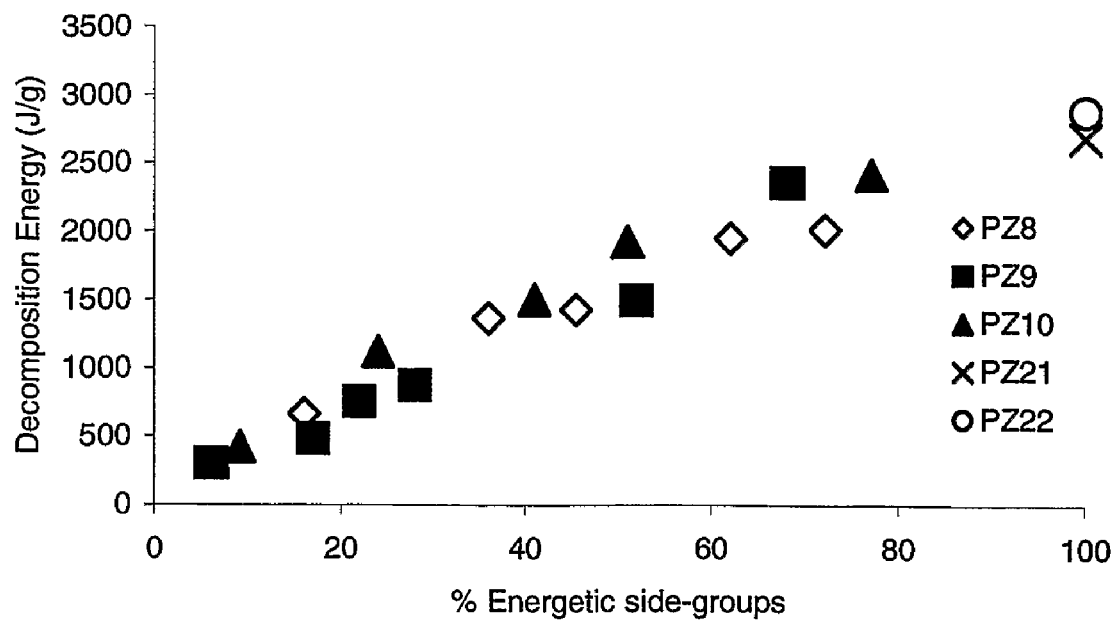
Figure 28:
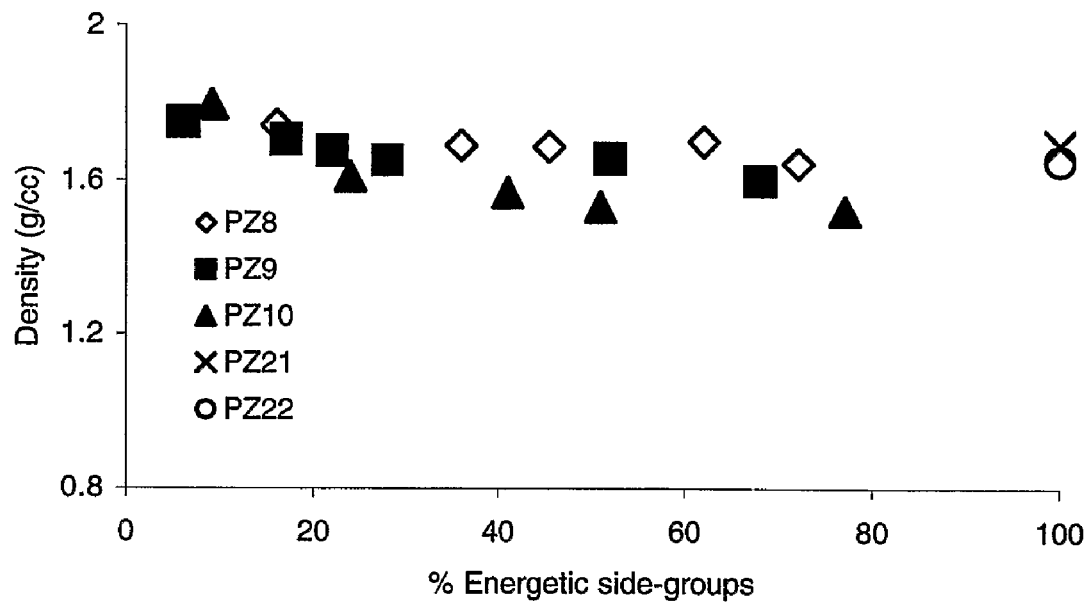
Figure 29:
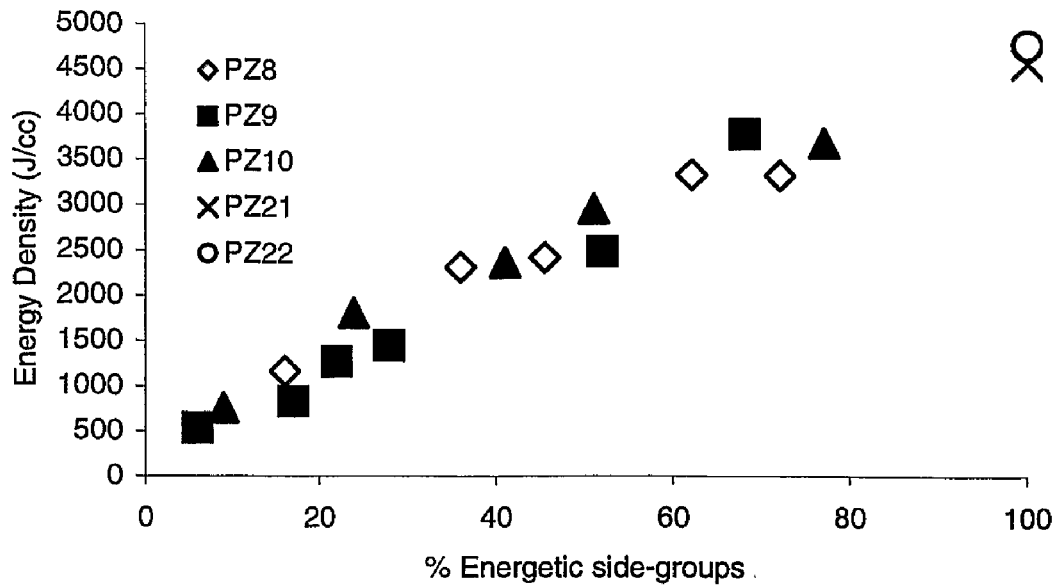
Figure 29:
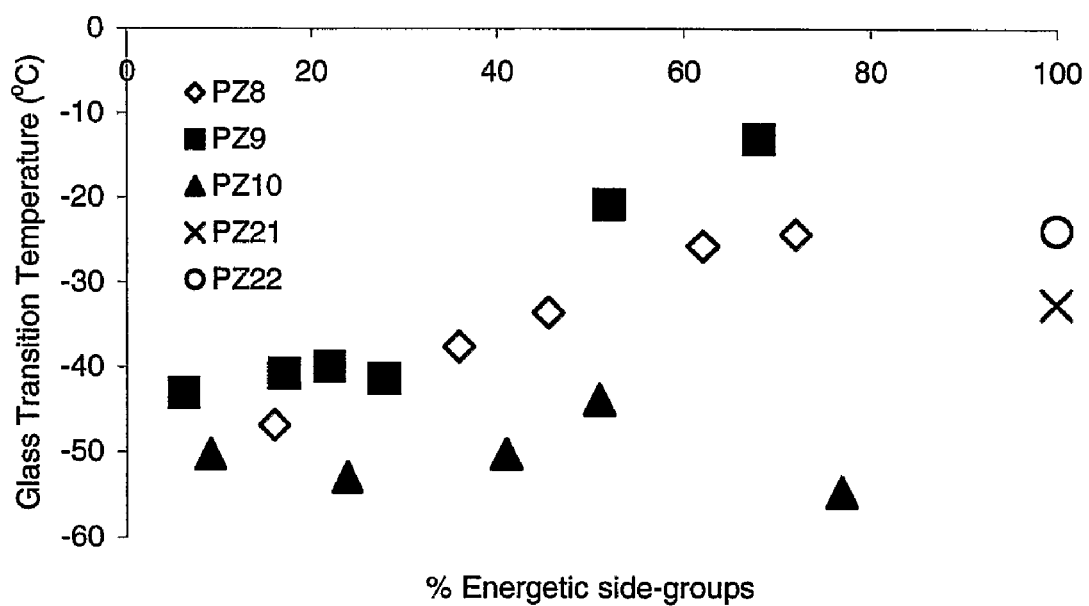
Figure 30:
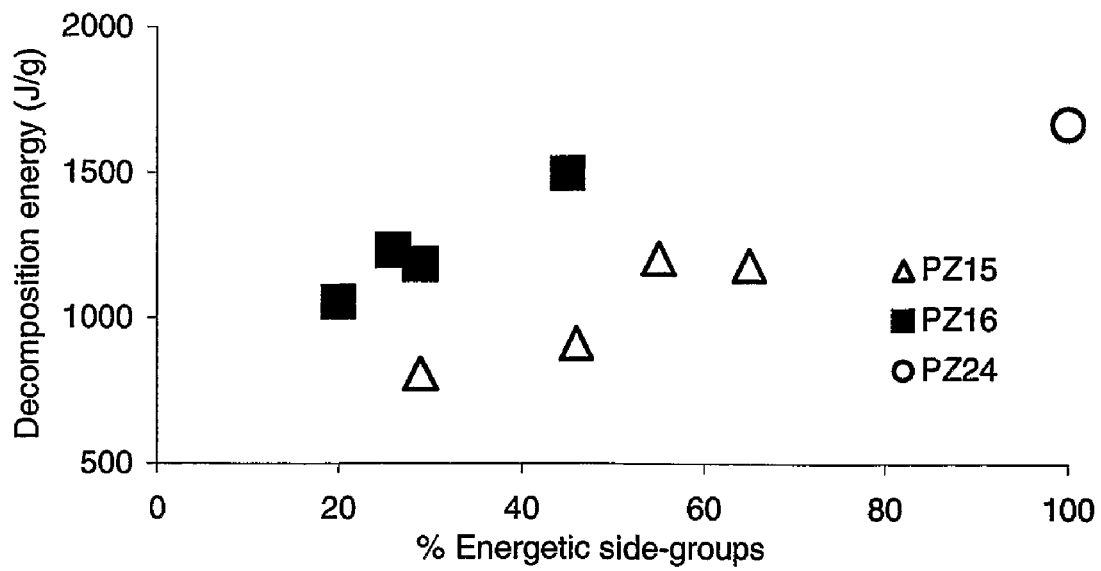
FIG. 30 shows two graphs demonstrating the effect of percentage side groups on decomposition energy (Graph 5) and density (Graph 6) for PZ15-16 and PZ24.
Figure 30:
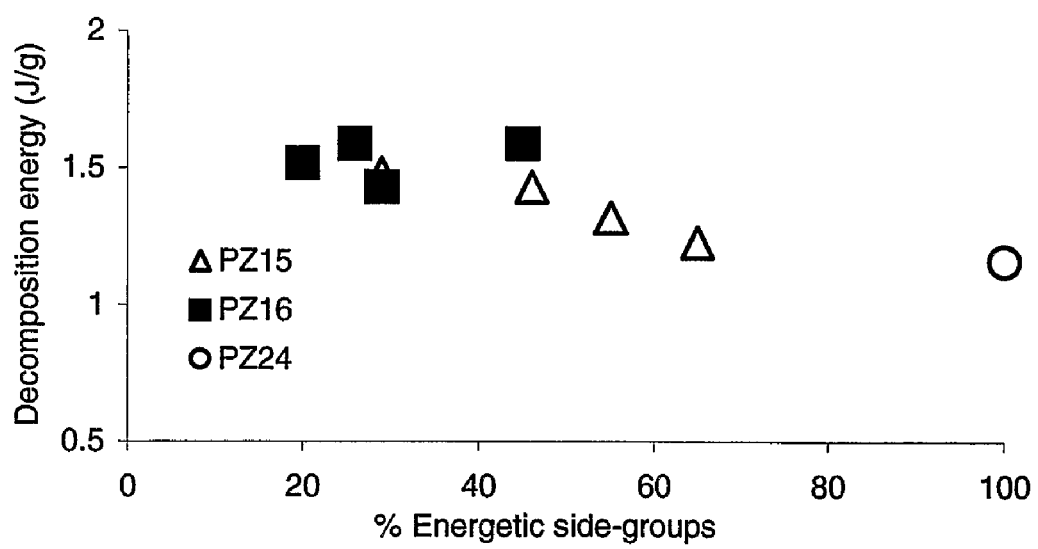
Figure 31:
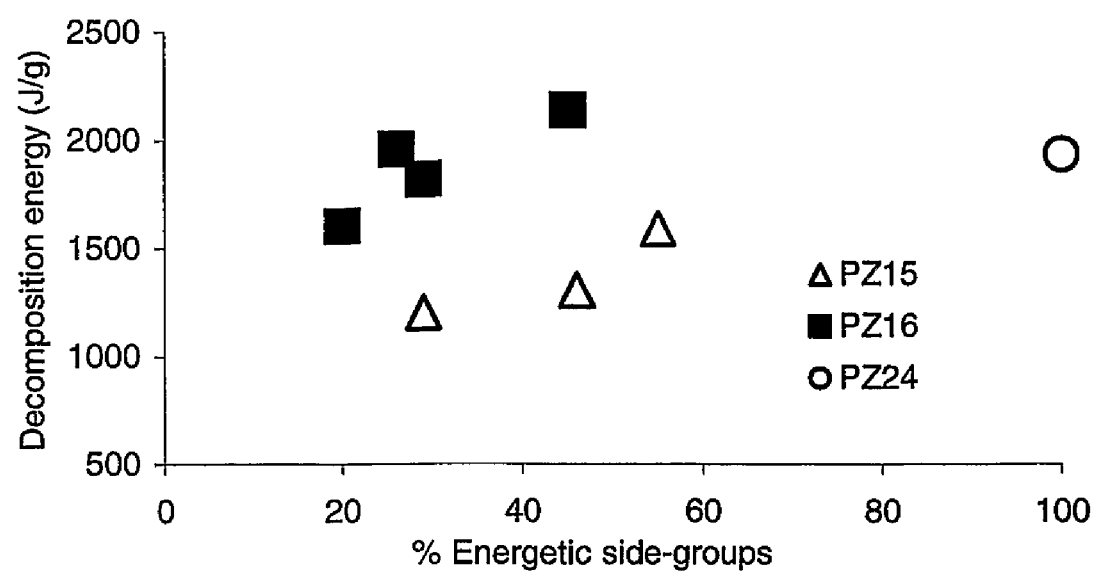
FIG. 31 shows one graph demonstrating the effect of percentage side groups on energy density (Graph 7) for PZ15-16 and PZ24.

This is illustrated for some nitrate ester (Graphs 1-4) and azide (Graphs 5-7) functionalised polyphosphazenes of Formula A and Formula B below. Graphs 1-2 are shown in FIG. 28, graphs 3-4 are shown in FIG. 29, graphs 5 to 6 are shown in FIG. 30 and graph 7 is shown in FIG. 31. The homopolymers PZ21 and PZ22 (Formula B) are the 100% substituted derivatives of PZ8 and PZ9 (Formula A) respectively, therefore these points are included on graphs 1-4. Similarly, PZ24 is the 100% substituted derivative of PZ15 and, therefore is included on graphs 5-7. All available physical characterisation data for PZ1-5, 8-16, 20-24 can be found in tabulated form in Appendix A.

Graph 1 (see FIG. 28) illustrates the effect of percentage energetic side groups on decomposition energy for PZ8-10, 21-22.

Graph 2 (see FIG. 28) illustrates the effect of percentage energetic side groups on density for PZ8-10, 21-22.

Graph 3 (see FIG. 29) illustrates the effect of percentage energetic side groups on energy density for PZ8-10, 21-22.

Graph 4 (see FIG. 29) illustrates the effect of percentage energetic side groups on glass transition temperature for PZ8-10, 21-22.

Graph 5 (see FIG. 30) illustrates the effect of percentage energetic side groups on decomposition energy for PZ15-16, 24.

Graph 6 (see FIG. 30) illustrates the effect of percentage energetic side groups on density for PZ15-16, 24.

Graph 7 (see FIG. 31) illustrates the effect of percentage energetic side groups on energy density for PZ15-16, 24.

Figure 32:
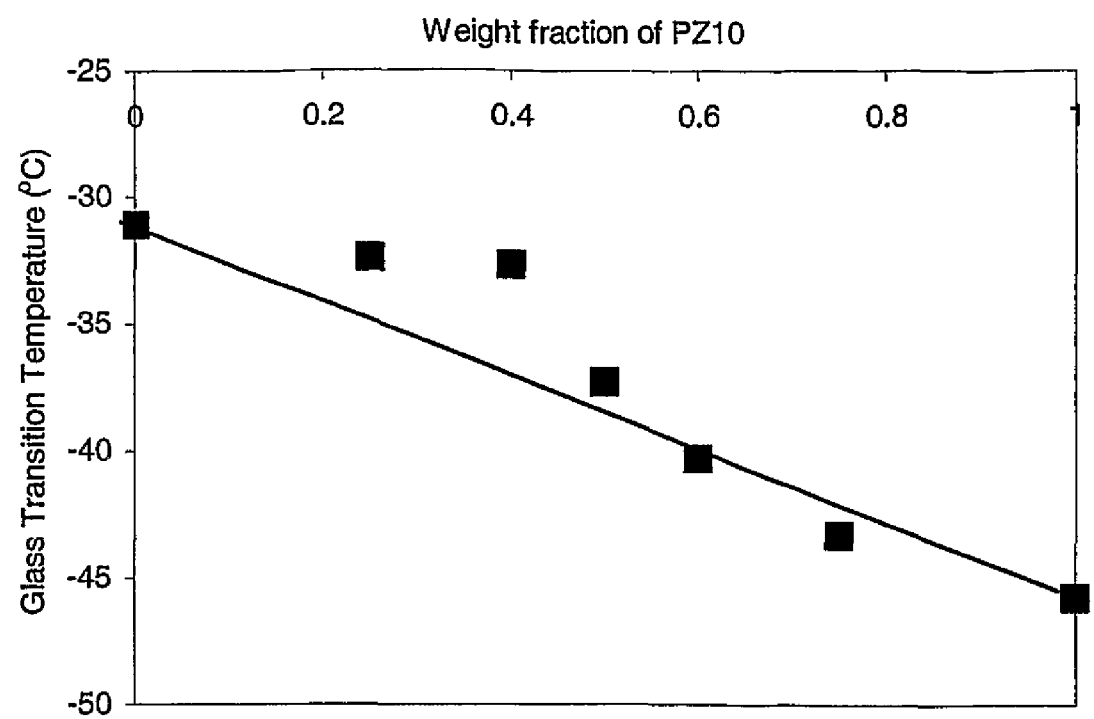
FIG. 32 shows a graph demonstrating variation of $T_g$ with weight fraction of PolyGLYN and PZ10

Graph 8 (see FIG. 32) illustrates the effect of weight fraction of PZ10 on glass transition temperature for PZ10.

EXAMPLE 4

Modification of $T_g$ Using More than One Alkoxide Substituent

Table 5 summarises the $T_g$ data obtained for three mixed substitutent polyphosphazenes of Formula A (Samples 1-3) containing both 2,3-Dinitratopropan-1-oxy ($C_3$—$ONO_2$ in Table 5) and 5,6-Dinitratohexan-1-oxy ($C_6$—$ONO_2$) side-groups (as well as trifluoroethoxy (TFE)). These data demonstrate that by comparison with graph 4 $T_g$ can be modified by incorporating more than one non-trifluoroethoxy substituent.

TABLE 5

Variation of Tg with multiple substitution of nitrate ester side groups.

| | Side-Group Stoichiometry* | | | $T_g$ of | $T_g$ of | |
|---|---|---|---|---|---|---|
| Sample | $C_3$—$ONO_2$ (a/%) | $C_6$—$ONO_2$ (b/%) | TFE (%) | product ($T_g^1$/° C.) | (a + b)% PZ8 ($T_g^2$/° C.)** | ($T_g^1$ − $T_g^2$) (° C.) |
| 1 | 14 | 37 | 49 | −42 | −32 | −10 |
| 2 | 27 | 42 | 31 | −30 | −24 | −6 |
| 3 | 49 | 24 | 27 | −32 | −23 | −9 |

*Calculated via integration of $^1$H NMR spectrum of inert precursor.
**Determined from trend line using data in Graph 4 for PZ8.

Synthesis of 1: (1) Reaction of 3:1:1 ratio of sodium 2,2-dimethyl-[1,3]-dioxolan-4-yl)-butan-1-oxide: sodium 2,2-dimethyl-[1,3]-dioxolan-4-yl)-methoxide: poly[(bis-trifluoroethoxy)phosphazene] in refluxing THF for 18 hours, according to method D1, followed by (2) nitration using 95% nitric acid according to method E1.

Synthesis of 2: (1) Reaction of a 1:1 ratio of sodium 2,2-dimethyl-[1,3]-dioxolan-4-yl)-methoxide: poly[(bis-trifluoroethoxy)phosphazene] in refluxing THF for 18 hours, according to method D1, followed by (2) reaction of this product with a 4:1 excess of sodium 2,2-dimethyl-[1,3]-dioxolan-4-yl)-butoxide in refluxing THF for 18 hours according to D1, followed by (3) nitration using 95% nitric acid according to method E1.

Synthesis of 3: (1) Reaction of a 2:1 ratio of sodium 2,2-dimethyl-[1,3]-dioxolan-4-yl)-methoxide: poly[(bis-trifluoroethoxy)phosphazene] in refluxing THF for 4 hours, according to method D1, followed by (2) reaction of this product with a 4:1 excess of sodium 2,2-dimethyl-[1,3]-dioxolan-4-yl)-butoxide in refluxing THF for 18 hours according to D1, followed by (3) nitration using 95% nitric acid according to method E1.

EXAMPLE 5

Formulation of Energetic Polyphosphazenes of Formula A with High Energy Crystalline Molecules 1. Formulation with Organic Fillers The binder properties of the polyphosphazenes revealed in the present invention have been demonstrated in relation to organic fillers by using the following crystalline energetic materials: HNS (2,2',4,4',6,6'-hexanitrostilbene, HMX (1,3,5,7-tetranitro-1,3,5,7-tetraazacyclooctane), TATB (1,3,5-triamino-2,4,6-trinitrobenzene) and FOX-7 (1,1-diamino-2,2-dinitroethylene). Such energetic materials may be employed both as high explosives and (particularly HMX) as propellant ingredients. To date, various combinations of PZ8 (18/68% nitrate ester side-groups), PZ10 (17/70% nitrate ester) and PZ15 (60% azide) have been examined. Compositions containing 1, 5 and 10% binder loading have been prepared, using a solvent paste mixing process. These polymers generated free flowing but cohesive moulding powders, which pressed to form robust pellets.

Physical and explosive hazard data for a number of these formulations are presented in Table 6. These data demonstrate good compatibility between the polyphosphazenes and the various crystalline energetic materials, as indicated by no colour changes (up to 100° C.), no significant reduction in the decomposition onset temperatures of the energetic fillers and acceptable small-scale hazard data. F of I data for the samples similarly demonstrated satisfactory hazard characteristics. Scanning electron micrographs suggest that good crystal coverage is being achieved by the polyphosphazene binders and densities up to 98% TMD have been measured for the product pellets, which were prepared using a basic die press without vacuum.

General Method for Preparation of Moulding Powders/Pressed Pellets

A solution of the polyphosphazene binder material (ca. 6-10% w/v in THF) was added to the powdered crystalline energetic ingredient (ca. 3-5 g) in a nickel crucible according to the required composition. The resulting slurry was stirred (using a bone spatula) at ambient temperature whilst the majority of solvent evaporated, generating a thick paste. The crucible was then placed in an oven at 40° C. for up to 30 minutes to remove the final traces of solvent. The resulting moulding powder was a hard, granular, free-flowing solid. Pellets were prepared in a 10.6 mm diameter steel die using 0.6-0.8 g of moulding powder per pellet. Pressing was performed for 5 minutes per sample, using a pressure of 2 tons.

2. Formulation with Inorganic Fillers

The binder properties of the polyphosphazenes revealed in the present invention have been further established in relation to a number of typical inorganic fillers used in enhanced blast explosive, pyrotechnic and propellant formulations. Thus, ammonium perchlorate (AP), ammonium nitrate (AN), magnesium powder and aluminium powder have each been formulated with PZ10 (70% nitrato substitution) and PZ15 (60% azido substitution). A similar mixing procedure was adopted to that used for the organic fillers (above). Optionally acetone was employed as the process solvent instead of THF. Details of the formulations and their hazard/ignition characteristics are given in Table 7. The prime objective of these experiments was to demonstrate chemical compatibility with the solids and the ability of polyphosphazenes to effectively coat and adhere to the solids, thereby making them suitable for use as binders. Once coated the moulding powder was a cohesive granular material which could be readily compacted into a coherent solid.

Whilst results of ignition tests are also shown, there has been no attempt to optimise the formulations for combustion. Thus, in absence of an oxidant such as ammonium perchlorate, it is not surprising that aluminium/polyphosphazene mixtures do not readily combust and similarly, the ammonium nitrate systems will require significant modification before they become readily combustible. However, having demonstrated the chemical compatibility of these individual filler materials with polyphosphazenes and the ability of these polymers to coherently bind the individual fillers (high explosives, oxidants and metals) it is reasonable to assume that multiple selections of these materials may be used together with polyphosphazenes (and possibly other materials) in order to optimise the desired properties of a given formulation as an explosive, propellant or pyrotechnic.

TABLE 6

Physical and explosive hazard data for various polyphosphazene formulations using organic fillers.

| Crystalline Energetic Ingredient (Filler) | Binder (% energetic side-groups) | Filler:Binder ratio | Mallet[1] impact (no. of fires) | Mallet[1] friction (no. of fires) | Colour Change (@100° C.) | DSC onset of Filler decomp./° C. | Density of pressed pellet (g/cc) | Langlie Figure of Insensitivenesss (F of I) |
|---|---|---|---|---|---|---|---|---|
| Fox-7 | PZ10 (70) | 90:10 | 0/10 | 0/10 | None | 269 | 1.7013 | 73.9 |
| Fox-7 | PZ15 (60) | 90:10 | 0/10 | 0/10 | None | 263 | 1.6477 | 80.0 |
| HMX | PZ8 (18) | 90:10 | 0/10 | 0/10 | None | — | 1.8166 | 64.0 |
| HMX | PZ10 (17) | 90:10 | 1/10 | 0/10 | None | 278 | 1.8055 | 72.1 |
| HMX | PZ8 (68) | 90:10 | 1/10 | 1/10 | None | 277 | — | 61.3 |
| HNS | PZ10 (17) | 99:1 | 0/10 | 0/10 | None | 319 | 1.6889 | 106.0 |
| HNS | PZ10 (17) | 95:5 | 0/10 | 0/10 | None | 318 | 1.6329 | 73.9 |
| HNS | PZ8 (68) | 99:1 | 0/10 | 0/10 | None | — | — | 67.1 |
| HNS | PZ10 (70) | 99:1 | 0/10 | 0/10 | None | — | — | 77.6 |
| TATB | PZ10 (70) | 95:5 | 0/10 | 0/10 | None | 370 | 1.8436 | 88.1 |
| TATB | PZ10 (70) | 90:10 | 0/10 | 0/10 | None | 370 | 1.7925 | 72.6 |
| TATB | PZ10 (17) | 95:5 | 0/10 | 0/10 | None | 373 | 1.8809 | 139 |
| TATB | PZ15 (60) | 95:5 | 0/10 | 0/10 | None | — | 1.7151 | 83.9 |
| TATB | PZ8 (18) | 90:10 | 0/10 | 0/10 | None | 371 | — | — |

[1]Small scale mallet tests refer to steel on steel

TABLE 7

Physical and explosive hazard data for various polyphosphazene formulations using inorganic fillers.

| Filler | Binder (% energetic side-groups) | Filler:Binder ratio | Mallet[1] impact (no. of fires) | Mallet[1] friction (no. of fires) | Colour Change (30 min @100° C.) | DSC (onset of decomp./° C.) | Flame Test |
|---|---|---|---|---|---|---|---|
| AP | PZ10 (70) | 75:25 | 2/10 | 0/10 | None | 192 | Burns smoothly but fiercely, with hissing sound |
| AN | PZ10 (70) | 75:25 | 0/10 | 0/10 | None | 168 | Liquified, blackened to char, no ignition |
| Mg | PZ10 (70) | 75:25 | 0/10 | 0/10 | None | 189 | Bright white flash, rapid burn |
| Al | PZ10 (70) | 75:25 | 0/10 | 0/10 | None | 188 | Charred, did not ignite |
| AP | PZ15 (60) | 75:25 | 1/10 | 1/10 | None | 240 | Smooth burn, white flame |
| AN | PZ15 (60) | 75:25 | 0/10 | 0/10 | None | — | Liquified, blacked, no ignition |
| Mg | PZ15 (60) | 75:25 | 0/10 | 0/10 | None | — | Bright white flash, rapid burn |
| Al | PZ15 (60) | 75:25 | 0/10 | 0/10 | None | 219 | Charred, did not ignite |
| AP | polyGLYN | 75:25 | 1/10 | 3/10 | None | 196 | Yellow flame, bright sparks ejected |
| Mg | polyGLYN | 75:25 | 0/10 | 0/10 | None | 189 | Bright white flash, rapid burn |

[1]Small scale mallet tests refer to steel on steel

EXAMPLE 6

Co-Binder Systems of Energetic Polyphosphazenes with polyGLYN and polyNIMMO: Miscibility and Curing Miscibility Studies At present, the pure energetic polyphosphazenes generated herein cannot be directly cured via a chemical cross-linking process, although as demonstrated above, they can be used as effective formulation binders, using a solvent paste process. However, it has been demonstrated that some of these polyphosphazenes are miscible with other energetic polymers (e.g. polyNIMMO, polyGLYN) which can themselves be cross-linked using standard isocyanate technology. It is thus possible to generate a chemically cured system comprising a mixture of polyphosphazene with these binders (i.e. by using the polyphosphazenes as co-binders). The miscibility of polyGLYN and polyphosphazenes has been demonstrated by the observation of a single $T_g$ for the blended mixture. Thus, several mixtures of a nitrate ester functionalised polyphosphazene (70% C6-nitrato, PZ10) with polyGLYN were prepared in varying ratios, as summarised in Table 8, and glass transition temperatures measured using DSC. The Table demonstrates that use of a polyphosphazene as a co-binder with polyGLYN has the benefit of producing a mixed binder possessing a lower $T_g$ than that of polyGLYN alone.

TABLE 8

Variation of $T_g$ with weight fraction of PolyGLYN and PZ10.

| Sample No. | Weight fraction of PolyGLYN | Weight fraction of PZ10 | $T_g$ (° C.) |
|---|---|---|---|
| 1 | 100 | 0 | −31.1 |
| 2 | 75 | 25 | −32.4 |
| 3 | 60 | 40 | −32.7 |
| 4 | 50 | 50 | −37.3 |
| 5 | 40 | 60 | −40.3 |
| 6 | 25 | 75 | −43.3 |
| 7 | 0 | 100 | −45.8 |

$T_g$ data for the mixtures as well as the individual components are supplied in the Table. These data reveal only one $T_g$ for each mixture, which in general falls between the values of the individual components. This is illustrated graphically in Graph 8 and demonstrates that the two materials are, in fact, miscible. The transitions observed for the mixtures deviate somewhat from the 'ideal' based on a weight average value of the composition's pure components (i.e. the line in Graph 8). Such deviations, in general, are caused by interactions between the two polymers (such as hydrogen bonding) and are commonly observed for polymer blends.

Curing Studies

Several mixtures of PZ10 (70% energetic side-groups) with both polyGLYN and polyNIMMO have been prepared and cured. These include 50:50 and 40:60 mixtures of PZ10:polyGLYN and PZ10:polyNIMMO. The polymers were dissolved in a minimal quantity of THF, as an aid to achieving homogeneous mixing; the solvent was then evaporated under atmospheric pressure. The mixed binder was redissolved in acetone and isopherone diisocyanate (IPDI, 1.1 molar equivalent with respect to the specified hydroxyl functionality of the hydroxyl terminated polymer) and dibutyltindilaurate catalyst (1000 ppm with respect to hydroxyl functionalised polymer) were added. The blended polymers were then cured for 2-6 days at 60° C. to form soft, high tack, extensible rubbers.

APPENDIX A

Physical Characterisation Data for PZ1-5, 8-16, 20-24

Inert Polyphosphazene Precursors PZ1-5

| Sample | % Energetic precursor side-groups | GPC data [No. of repeat units] ($M_p$/Da) | Density (g/cc) | $T_g$ (° C.) |
|---|---|---|---|---|
| PZ1 | 16 | — | — | −41.3 |
| PZ1 | 36 | — | — | −32.1 |
| PZ1 | 46 | — | — | −22.4 |
| PZ1 | 62 | — | — | −23.3 |
| PZ1 | 72 | — | — | −20.8 |
| PZ2 | 6 | — | 1.69 | −44.3 |
| PZ2 | 17 | — | 1.62 | −41.5 |
| PZ2 | 22 | — | 1.59 | −41.9 |
| PZ2 | 28 | — | 1.51 | −41.5 |
| PZ2 | 52 | — | 1.62 | — |
| PZ2 | 68 | — | 1.33 | — |
| PZ3 | 9 | 12080 [46] | 1.67 | −44.5 |
| PZ3 | 24 | 6610 [22] | 1.63 | −50.8 |
| PZ3 | 41 | 7950 [23] | 1.36 | −51.0 |
| PZ3 | 51 | 13500 [37] | 1.31 | −51.5 |

| Sample | % Energetic precursor side-groups | GPC data [No. of repeat units] ($M_p$/Da) | Density (g/cc) | $T_g$ (° C.) |
|---|---|---|---|---|
| PZ3 | 77 | 8270 [19] | 1.47 | −54.9 |
| PZ4 | 11 | — | — | −26.2 |
| PZ4 | 26 | — | — | −33.5 |
| PZ4 | 72 | — | — | — |
| PZ5 | 16 | — | — | −21.5 |
| PZ5 | 22 | — | — | — |
| PZ5 | 48 | — | — | −12.2 |
| PZ5 | 52 | — | — | +0.7 |
| PZ5 | 72 | — | — | +0.5 |

Energetic Mixed Substituent Polymers of Formula A

Trifluoroethoxy/2,3-Dinitratopropan-1-oxy Polyphosphazene (PZ8)

| % Energetic side-groups | Decomposition energy (J/g) (DSC) | Onset of Decomposition (° C.) | Density (g/cm³) | $T_g$ (° C.) | GPC Peak molecular weight (Da) |
|---|---|---|---|---|---|
| 16 | 667 | 163.1 | 1.74 | −46.8 | 6660, 2850 |
| 36 | 1367 | 165.5 | 1.69 | −37.5 | 7420, 1130 |
| 46 | 1429 | 163.4 | 1.69 | −33.5 | 7660, 1650 |
| 62 | 1954 | 167.9 | 1.70 | −25.7 | 4960, 1260 |
| 72 | 2020 | 166.3 | 1.64 | −24.3 | 4790, 1400 |
| 32* | 1889 | 163.2 | 1.68 | −30.9 | 7020 |

*Synthesised via polymerisation of hexachlorocyclotriphosphazene

Trifluoroethoxy/3,4-Dinitratobutan-1-oxy Polyphosphazene (PZ9)

| % Energetic side-groups | Decomposition energy (J/g) (DSC) | Onset of Decomposition (° C.) | Density (g/cm³) | $T_g$ (° C.) | GPC Peak molecular weight (Da)* |
|---|---|---|---|---|---|
| 6 | 301 | 171.6 | 1.75 | −43.0 | 8020, 2170 |
| 17 | 488 | 180.6 | 1.70 | −40.7 | 7000, 1230 |
| 22 | 758 | 178.9 | 1.68 | −39.9 | 2420 |
| 28 | 877 | 180.3 | 1.65 | −41.3 | 6250, 1190 |
| 52 | 1500 | 164.1 | 1.66 | −20.8 | 1120 |
| 68 | 2366 | 172.6 | 1.60 | −13.0 | 1680 |

*Major GPC peaks in bold

Trifluoroethoxy/5,6-Dinitratohexan-1-oxy Polyphosphazene (PZ10)

| % Energetic side-groups | Decomposition energy (J/g) (DSC) | Onset of Decomposition (° C.) | Density (g/cm³) | $T_g$ (° C.) | GPC Peak molecular weight (Da)* |
|---|---|---|---|---|---|
| 9 | 423 | 181.8 | 1.79 | −50.2 | 12820, 2430 |
| 24 | 1123 | 184.9 | 1.61 | −52.9 | 2710, 1720 |
| 41 | 1506 | 184.1 | 1.57 | −50.2 | 8150, 2140 |
| 51 | 1927 | 186.8 | 1.53 | −43.8 | 12773, 5012, 3080 |
| 77 | 2425 | 185.9 | 1.52 | −54.6 | 9000, 3625 |

*Major GPC peaks in bold

Trifluoroethoxy/2-Nitratoethoxy Polyphosphazene
(PZ11)

| % Energetic side-groups | Decomposition energy (J/g) (DSC) | Onset of Decomposition (° C.) | Density (g/cm³) | $T_g$ (° C.) | GPC Peak molecular weight (Da) |
|---|---|---|---|---|---|
| 11 | 337 | 174.2 | 1.73 | −47.9 | 3050 |
| 26.5 | 912 | 184.8 | 1.71 | −60.9 | 3560, 1950 |
| 74 | 1936 | 177.1 | 1.61 | −35.6 | |

Trifluoroethoxy/2-Methyl-3-nitrooxy-2-nitrooxymethyl-propan-1-oxy Polyphosphazene (PZ12)

| % Energetic side-groups | Decomposition energy (J/g) (DSC) | Onset of Decomposition (° C.) | Density (g/cm³) | $T_g$ (° C.) | GPC Peak molecular weight (Da) |
|---|---|---|---|---|---|
| 11 | — | >130 | — | −43.7 | — |
| 47 | 1760 | — | — | −25.5 | — |
| 51 | — | >130 | — | −10.8 | — |
| 59 | 2037 | — | 1.55 | −6.5 | — |

1H,1H-Perfluoropropan-1-oxy/2,3-Dinitratopropan-1-oxy Polyphosphazene (PZ13)

| % Energetic side-groups | Decomposition energy (J/g) (DSC) | Onset of Decomposition (° C.) | Density (g/cm³) | $T_g$ (° C.) | GPC Peak molecular weight (Da) |
|---|---|---|---|---|---|
| 65 | 1913 | 160.1 | 1.61 | −31.6 | 6570 |

1H,1H-Perfluoropentan-1-oxy/2,3-Dinitratopropan-1-oxy Polyphosphazene (PZ14)

| % Energetic side-groups | Decomposition energy (J/g) (DSC) | Onset of Decomposition (° C.) | Density (g/cm³) | $T_g$ (° C.) | GPC Peak molecular weight (Da) |
|---|---|---|---|---|---|
| 28 | 961 | 155.0 | 1.80 | −35.6 | 8850 |

Trifluoroethoxy/6-Azidohexan-1-oxy Polyphosphazene (PZ15)

| % Energetic side-groups | Decomposition energy (J/g) (DSC) | Onset of Decomposition (° C.) | Density (g/cm³) | GPC Peak molecular weight (Da) [No. of repeat units] | Polydispersity |
|---|---|---|---|---|---|
| 29 | 810 | 212 | 1.48 | 3460 [13] | — |
| 46 | 910 | 212 | 1.46 | — | — |
| 55 | 1205 | 218 | 1.32 | 6570 [23] | 1.31 |
| 65 | 1185 | 211 | 1.23 | 11600 [39] | 1.53 |

Trifluoroethoxy/5,6-Diazidohexan-1-oxy Polyphosphazene (PZ16)

| % Energetic side-groups | Decomposition energy (J/g) (DSC) | Onset of Decomposition (° C.) | Density (g/cm³) | GPC Peak molecular weight (Da) [No. of repeat units] | Poly-dispersity |
|---|---|---|---|---|---|
| 20 | 1060 | 200 | 1.52 | 3090 [11] | — |
| 26 | 1230 | 194 | 1.59 | 2820 [10] | — |
| 29 | 1190 | 193 | 1.59 | 3000 [10] | — |
| 44 | 1500 | 189 | 1.43 | 6320 [20] | 1.53 |

Energetic Homopolymers of Formula B (PZ20-PZ24)

| Polymer | Decomposition energy (J/g) (DSC) | Onset of Decomposition (° C.) | Density (g/cm³) | $T_g$ (° C.) | GPC Peak molecular weight (Da) |
|---|---|---|---|---|---|
| PZ20 | 2540 | 162.0 | 1.60 | −44.6 | 7890 |
| PZ21 | 2690 | 170.6 | 1.69 | −32.5 | — |
| PZ22 | 2880 | 180.6 | 1.65 | −23.8 | 14,570 |
| PZ23 | 1825 | 213.7 | 1.35 | −73.4 | 5360 |
| PZ24 | 1665 | 216.9 | 1.16 | −99.5 | 4440 |

Molecular Weight Determination for PZ1-24
Nitrate Ester Functionalised Polyphosphazenes of Formula A and Formula B and their Precursors The peak molecular weight ($M_p$) data for PZ3, measured using GPC, correspond to ca. 20-50 repeat units, although the overall distribution is much wider. These figures apply generally to PZ1-PZ5. However, it should be noted that these GPC determined molecular weights are not absolute values, but polystyrene equivalent masses. Thus, whilst the quoted GPC figures characterise the products, they should not be taken as an accurate indication of the absolute polymer chain lengths.

MALDI MS (Matrix Assisted Laser Desorption Ionisation Mass Spectrometry) data recorded for the trifluoroethoxy substituted homopolymer precursor (data not available for the substituted polyphosphazenes) indicates a peak molecular weight of ca. 4000 Da, corresponding to approximately 16 repeat units and a distribution ranging from around 7-50 units. These data are absolute molecular weights and are thought to give a more accurate determination of the chain lengths at the lower mass end. Assuming chain degradation does not occur during the alkoxide substitution step these values can be applied to PZ1-5. However, MALDI is unlikely to adequately detect higher molecular weight fractions due to problems with the volatilisation of large molecules.

In some cases the available GPC data for energetic polyphosphazenes PZ8-11 indicate what are believed to be unrealistically low molecular weights (ie significantly lower than PZ1-4 precursor polymers—implying chain degradation during nitration). This effect is thought to be an analytical anomaly due to limitations of the GPC method and the choice of eluant solvent. The following evidence supports this assertion: —
(1) MALDI MS data recorded for pristine poly(bis-trifluoroethoxy)phosphazene and the same material after exposure to 95% nitric acid (nitration medium used for syntheses of PZ8-PZ12 show no significant differences in molecular weight distribution (hence indicating that chain scission is not occurring).

(2) In contrast with the results obtained when using THF as eluent, GPC data obtained for PZ10 showed no shift to lower molecular weight, as compared with its precursor PZ3, if acetone was used as eluant.

Azide functionalised polyphosphazenes of Formula A and Formula B:

Peak molecular weight data indicate polymer chain lengths of ca. 10-20 repeat units, therefore the distribution is likely to range from ca. 5 repeat units to 50 based on the available polydispersity data. However, the same limitations in the GPC data discussed for PZ1-5 above apply to PZ15-16.

The invention claimed is:
1. A method of binding explosive, propellant or pyrotechnic ingredients consisting of adding a solution of a high energy polyphosphazene binder comprising random mixed substituent poly(phosphazene) compounds of Formula A comprising of a combination of n units having one or more of the structures (i) to (iii) but not exclusively (i):

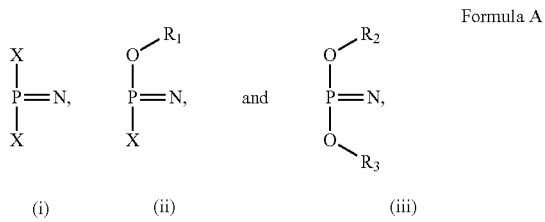

Formula A and wherein:
$R_1$, $R_2$ and $R_3$ are alkyl, alkyl ether or carbohydrate based side chains which contain energetic functionalities comprising nitro, nitramine, nitrate ester or azide functionalities
X=a C1 to C20 fluoroalkoxy group, or a C1 to C20 fluoroalkoxy ether
$3 \leq n \leq 10000$
to explosive, propellant or pyrotechnic ingredients.

2. The method according to claim 1 wherein:
R$^1$ is C$_{1-18}$(alkyl)CH(ONO$_2$)CH2(ONO$_2$); C$_{1-18}$(alkyl)CH(N$_3$)CH$_2$(N$_3$); C$_{1-19}$(alkyl)CH$_2$(ONO$_2$); C$_{1-19}$(alkyl)CH$_2$(N$_3$); CH$_2$C(CH$_3$)(CH$_2$ONO$_2$)$_2$, R$^2$ is C$_{1-18}$(alkyl)CH(ONO$_2$)CH$_2$(ONO$_2$); C$_{1-18}$(alkyl)CH(N$_3$)CH$_2$(N$_3$);
C$_{1-19}$(alkyl)CH$_2$(ONO$_2$); C$_{1-19}$ (alkyl)CH$_2$(N$_3$); CH$_2$C(CH$_3$)(CH$_2$ONO$_2$)$_2$, R$^3$ Is C$_{1-18}$(alkyl)CH(ONO$_2$)CH$_2$(ONO$_2$); C$_{1-18}$(alkyl)CH(N$_3$)CH$_2$(N$_3$); C$_{1-19}$(alkyl)CH$_2$(ONO$_2$); C$_{1-19}$ (alkyl)CH$_2$(N$_3$); CH$_2$C(CH$_3$)(CH$_2$ONO$_2$)$_2$, X=OCH$_2$CF$_3$; OCH$_2$CF$_2$CF$_3$; OCH$_2$(CF$_2$)$_3$CF$_3$,
$5 \leq n \leq 300$.

3. Random mixed substituent poly(phosphazene)s according to claim 1 selected from the group consisting of trifluoroethoxy/2,3-dinitratopropan-1-oxy polyphosphazene (PZ8), trifluoroethoxy/3,4-dinitratobutan-1-oxy polyphosphazene (PZ9), trifluoroethoxy/5,6-dinitratohexan-1-oxy polyphosphazene (PZ10), trifluoroethoxy/2-nitratoethoxy polyphosphazene (PZ11), trifluoroethoxy/2-methyl-3-nitrooxy-2-nitrooxymethyl-propan-1-oxy polyphosphazene (PZ12), 1H,1H-perfluoropropan-1-oxy/2,3-dinitratopropan-1-oxy polyphosphazene (PZ13), 1H,1H-perfluoropentan-1-oxy/2,3-dinitratopropan-1-oxy polyphosphazene (PZ14), trifluoroethoxy/6-azidohexan-1-oxy polyphosphazene (PZ15), and trifluoroethoxy/5,6-diazidohexan-1-oxy polyphosphazene (PZ16).

* * * * *